(12) United States Patent
Fein et al.

(10) Patent No.: US 9,141,188 B2
(45) Date of Patent: *Sep. 22, 2015

(54) PRESENTING AN AUGMENTED VIEW IN RESPONSE TO ACQUISITION OF DATA INFERRING USER ACTIVITY

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/672,575

(22) Filed: Nov. 8, 2012

(65) Prior Publication Data

US 2014/0098127 A1    Apr. 10, 2014

Related U.S. Application Data

(63) Continuation-in-part of application No. 13/648,012, filed on Oct. 9, 2012, now Pat. No. 8,941,689, which is a continuation of application No. 13/646,147, filed on Oct. 5, 2012, now Pat. No. 8,928,695.

(51) Int. Cl.
*G06F 3/01* (2006.01)
*G06F 3/00* (2006.01)
*G06T 19/00* (2011.01)

(52) U.S. Cl.
CPC ............... *G06F 3/011* (2013.01); *G06F 3/005* (2013.01); *G06T 19/006* (2013.01)

(58) Field of Classification Search
CPC ....... G06T 19/006; G06T 19/00; G06F 3/011; G06F 3/012; G06F 3/0304
USPC ................................... 345/629–633; 715/757
See application file for complete search history.

(56) References Cited

U.S. PATENT DOCUMENTS 6,625,299 B1    9/2003 Meisner et al.
6,774,898 B1    8/2004 Katayama et al.
(Continued)

FOREIGN PATENT DOCUMENTS

EP              1117074 A2    7/2001
KR      10-2012-0066552 A    6/2012
WO       WO 2012/108721 A2    8/2012

OTHER PUBLICATIONS

PCT International Search Report; International App. No. PCT/US2014/025579; Jul. 29, 2014; pp. 1-4.

(Continued)

*Primary Examiner* — Todd Buttram

(57) ABSTRACT

Computationally implemented methods and systems include obtaining visual data of an actual view of a scene from a real environment, determining whether activity-inferring data that infers at least initial occurrence of one or more user activities associated with the scene from the real environment have at least been acquired, and presenting, in response at least in part to determining that the activity-inferring data have at least been acquired, an augmented view of the scene from the real environment, the augmented view including one or more augmentations that have been included into the augmented view based, at least in part, on the activity-inferring data. In addition to the foregoing, other aspects are described in the claims, drawings, and text.

41 Claims, 32 Drawing Sheets

Aug View 60j

(56) References Cited

U.S. PATENT DOCUMENTS

| | | | |
|---|---|---|---|
| 6,891,563 B2 | 5/2005 | Schofield et al. | |
| 7,119,829 B2 | 10/2006 | Leonard et al. | |
| 7,690,975 B2 | 4/2010 | Watanabe et al. | |
| 8,116,526 B2 | 2/2012 | Sroka et al. | |
| 8,184,070 B1 | 5/2012 | Taubman | |
| 8,188,880 B1 | 5/2012 | Chi et al. | |
| 8,203,605 B1 | 6/2012 | Starner | |
| 8,204,073 B1 | 6/2012 | Gailloux et al. | |
| 8,402,356 B2 | 3/2013 | Martinez et al. | |
| 8,751,948 B2* | 6/2014 | Wetzer et al. | 715/769 |
| 2001/0030654 A1 | 10/2001 | Iki | |
| 2002/0044152 A1 | 4/2002 | Abbott, III et al. | |
| 2002/0144259 A1 | 10/2002 | Gutta et al. | |
| 2003/0037068 A1 | 2/2003 | Thomas et al. | |
| 2003/0210832 A1 | 11/2003 | Benton | |
| 2004/0113885 A1 | 6/2004 | Genc et al. | |
| 2005/0206583 A1 | 9/2005 | Lemelson et al. | |
| 2008/0071559 A1 | 3/2008 | Arrasvuori | |
| 2008/0253737 A1 | 10/2008 | Kimura et al. | |
| 2008/0270947 A1 | 10/2008 | Elber et al. | |
| 2009/0049004 A1 | 2/2009 | Nurminen et al. | |
| 2009/0167787 A1 | 7/2009 | Bathiche et al. | |
| 2009/0182499 A1 | 7/2009 | Bravo | |
| 2009/0237328 A1* | 9/2009 | Gyorfi et al. | 345/9 |
| 2009/0300535 A1 | 12/2009 | Skourup et al. | |
| 2009/0322671 A1 | 12/2009 | Scott et al. | |
| 2010/0104185 A1 | 4/2010 | Johnson et al. | |
| 2010/0164990 A1 | 7/2010 | Van Doorn | |
| 2010/0208033 A1 | 8/2010 | Edge et al. | |
| 2010/0214284 A1 | 8/2010 | Rieffel et al. | |
| 2010/0226535 A1 | 9/2010 | Kimchi et al. | |
| 2010/0238161 A1 | 9/2010 | Varga et al. | |
| 2010/0295921 A1 | 11/2010 | Guthrie et al. | |
| 2010/0328344 A1 | 12/2010 | Mattila et al. | |
| 2011/0055049 A1 | 3/2011 | Harper et al. | |
| 2011/0074658 A1 | 3/2011 | Sato | |
| 2011/0134108 A1 | 6/2011 | Hertenstein | |
| 2011/0141254 A1 | 6/2011 | Roebke et al. | |
| 2011/0164163 A1 | 7/2011 | Bilbrey et al. | |
| 2011/0214082 A1 | 9/2011 | Osterhout et al. | |
| 2011/0227820 A1 | 9/2011 | Haddick et al. | |
| 2011/0231781 A1* | 9/2011 | Betzler et al. | 715/757 |
| 2011/0238751 A1 | 9/2011 | Belimpasakis et al. | |
| 2011/0242134 A1* | 10/2011 | Miller et al. | 345/633 |
| 2011/0292220 A1 | 12/2011 | Georgis et al. | |
| 2012/0025975 A1 | 2/2012 | Richey et al. | |
| 2012/0038669 A1 | 2/2012 | Lee et al. | |
| 2012/0062596 A1 | 3/2012 | Bedi et al. | |
| 2012/0105473 A1 | 5/2012 | Bar-Zeev et al. | |
| 2012/0105475 A1 | 5/2012 | Tseng | |
| 2012/0113092 A1 | 5/2012 | Bar-Zeev et al. | |
| 2012/0113140 A1 | 5/2012 | Hilliges et al. | |
| 2012/0113274 A1 | 5/2012 | Adhikari et al. | |
| 2012/0116920 A1 | 5/2012 | Adhikari et al. | |
| 2012/0120101 A1 | 5/2012 | Adhikari et al. | |
| 2012/0120113 A1 | 5/2012 | Hueso | |
| 2012/0133650 A1 | 5/2012 | Lee | |
| 2012/0147328 A1 | 6/2012 | Yahav | |
| 2012/0154638 A1 | 6/2012 | Chou | |
| 2012/0166435 A1 | 6/2012 | Graham et al. | |
| 2012/0176410 A1 | 7/2012 | Meier et al. | |
| 2012/0194549 A1 | 8/2012 | Osterhout et al. | |
| 2012/0198339 A1* | 8/2012 | Williams et al. | 715/727 |
| 2012/0206323 A1 | 8/2012 | Osterhout et al. | |
| 2012/0223966 A1 | 9/2012 | Lim | |
| 2012/0244907 A1 | 9/2012 | Athsani et al. | |
| 2012/0246027 A1 | 9/2012 | Martin | |
| 2012/0249416 A1 | 10/2012 | Maciocci et al. | |
| 2012/0249588 A1 | 10/2012 | Tison et al. | |
| 2012/0249591 A1 | 10/2012 | Maciocci et al. | |
| 2012/0268491 A1 | 10/2012 | Sugden et al. | |
| 2012/0269494 A1 | 10/2012 | Satyanarayana et al. | |
| 2012/0293548 A1 | 11/2012 | Perez et al. | |
| 2012/0299962 A1 | 11/2012 | White et al. | |
| 2012/0304111 A1 | 11/2012 | Queru | |
| 2012/0306920 A1 | 12/2012 | Bathiche et al. | |
| 2012/0327119 A1 | 12/2012 | Woo et al. | |
| 2012/0329432 A1 | 12/2012 | Gupta et al. | |
| 2013/0044128 A1* | 2/2013 | Liu et al. | 345/633 |
| 2013/0050258 A1 | 2/2013 | Liu et al. | |
| 2013/0054622 A1 | 2/2013 | Karmarkar et al. | |
| 2013/0057577 A1 | 3/2013 | Jeong | |
| 2013/0076788 A1* | 3/2013 | Ben Zvi | 345/633 |
| 2013/0083003 A1* | 4/2013 | Perez et al. | 345/419 |
| 2013/0083009 A1* | 4/2013 | Geisner et al. | 345/419 |
| 2013/0085345 A1* | 4/2013 | Geisner et al. | 600/300 |
| 2013/0125027 A1 | 5/2013 | Abovitz | |
| 2013/0147836 A1* | 6/2013 | Small et al. | 345/633 |
| 2013/0162632 A1 | 6/2013 | Varga et al. | |
| 2013/0194164 A1 | 8/2013 | Sugden et al. | |
| 2013/0218721 A1 | 8/2013 | Borhan et al. | |
| 2013/0278631 A1 | 10/2013 | Border et al. | |
| 2013/0326583 A1 | 12/2013 | Freihold et al. | |
| 2013/0342571 A1* | 12/2013 | Kinnebrew et al. | 345/633 |
| 2014/0002357 A1* | 1/2014 | Pombo et al. | 345/158 |
| 2014/0063055 A1 | 3/2014 | Osterhout et al. | |
| 2014/0092130 A1* | 4/2014 | Anderson et al. | 345/632 |
| 2014/0237366 A1 | 8/2014 | Poulos et al. | |

OTHER PUBLICATIONS

PCT International Search Report; International App. No. PCT/US2014/016022; Jun. 6, 2014; pp. 1-3.

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; Jul. 17, 2014; pp. 1-4.

PCT International Search Report; International App. No. PCT/US2014/025604; Jul. 11, 2014; pp. 1-3.

PCT International Search Report; International App. No. PCT/US2014/025669; Jul. 9, 2014; pp. 1-3.

Doobybrain; "GE's Augmented Reality Demo"; YouTube; uploaded Feb. 4, 2009; pp. 1-2; located at: http://www.youtube.com/watch?v-00FGtH5nkxM.

Inbar, Ori; "Top 10 Augmented Reality Demos That Will Revolutionize Video Games"; Games Alfresco; posted on Mar. 3, 2008, printed on Sep. 27, 2012; pp. 1-19; located at: http://gamesalfresco.com/2008/03/03/top-10-augmented-reality-demos-that-will-revolutionize-video-games/.

"Qualcomm Augmented Reality Sample Apps"; Qualcomm; bearing a date of May 18, 2011, printed on Sep. 27, 2012; pp. 1-2; Qualcomm Incorporated; located at: http://www.qualcomm.com/media/videos/qualcomm-augmented-reality-sample-apps?search=augmented%20reality&channel=11.

Shinymedia; "DEMO: World's First Augmented Reality Glasses-Vuzix Wrap 920 AR"; YouTube; uploaded Oct. 27, 2010; pp. 1-2; located at: http://www.youtube.com/watch?v=xfiZQW0k2Ro.

Taoistflyer; "Google Glasses (How It Works)"; YouTube; uploaded Apr. 7, 2012; pp. 1-2; located at: http://www.youtube.com/watch?v=Nc4ox89bofk&feature=related.

Total Immersion Home Page; bearing a date of 2012, printed on Sep. 27, 2012; pp. 1-2; Total Immersion; located at: http://www.t-immersion.com/.

Toucharcade; "Augmented Reality Demo"; YouTube; uploaded Mar. 26, 2009; pp. 1-2; located at: http://www.youtube.corn/watch?v=QoZRHLmUKtM.

Vuzix-View the Future Today Home Page; bearing a date of Sep. 18, 2012, printed on Sep. 27, 2012; p. 1; Vuzix; located at: http://www.vuzix.com/home/.

* cited by examiner

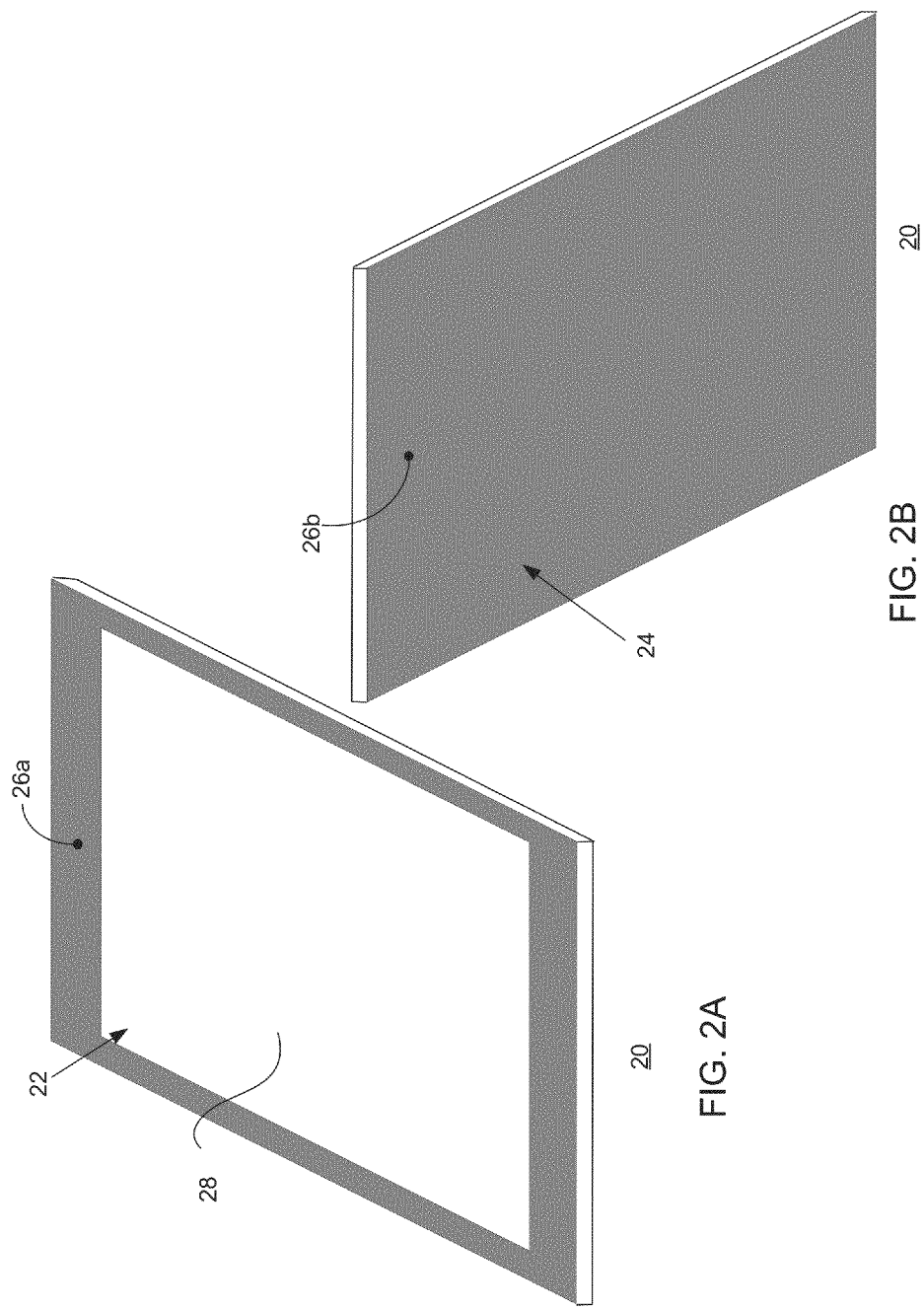

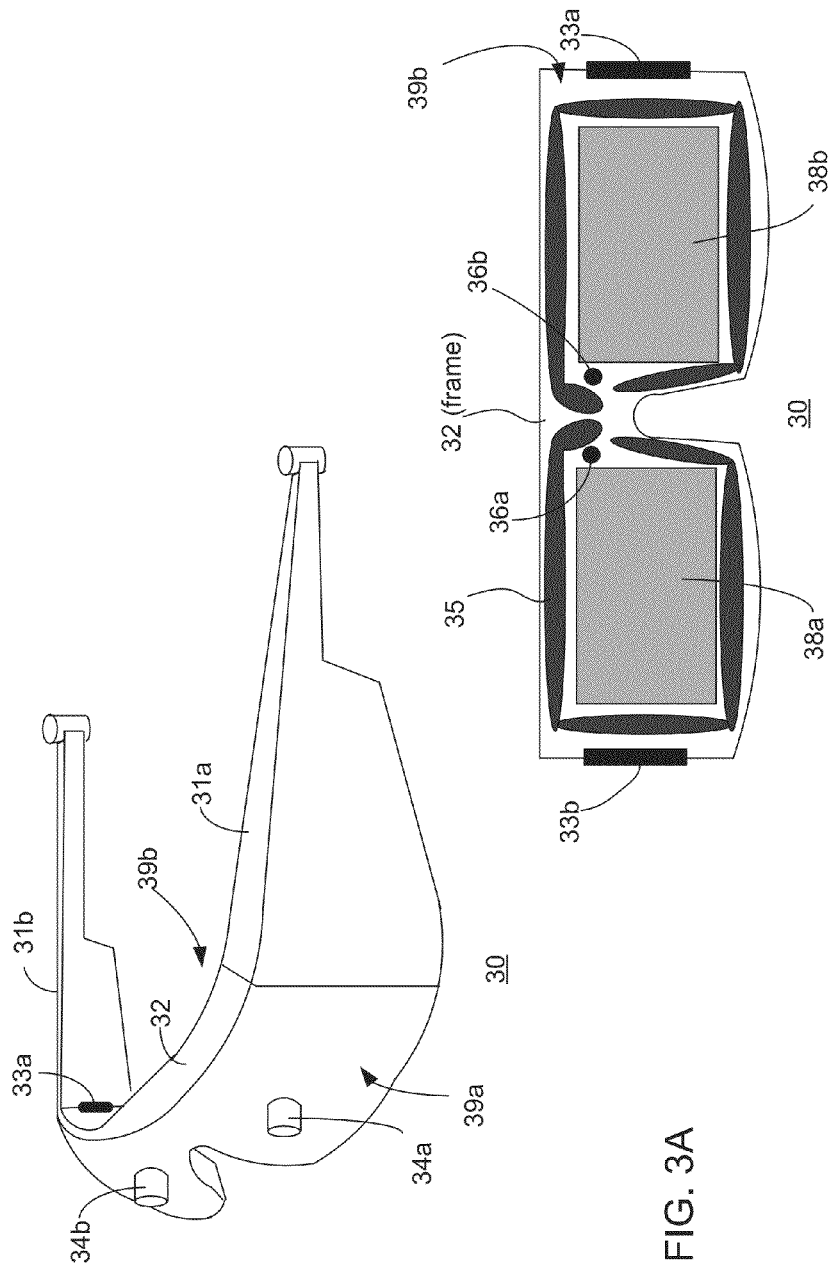

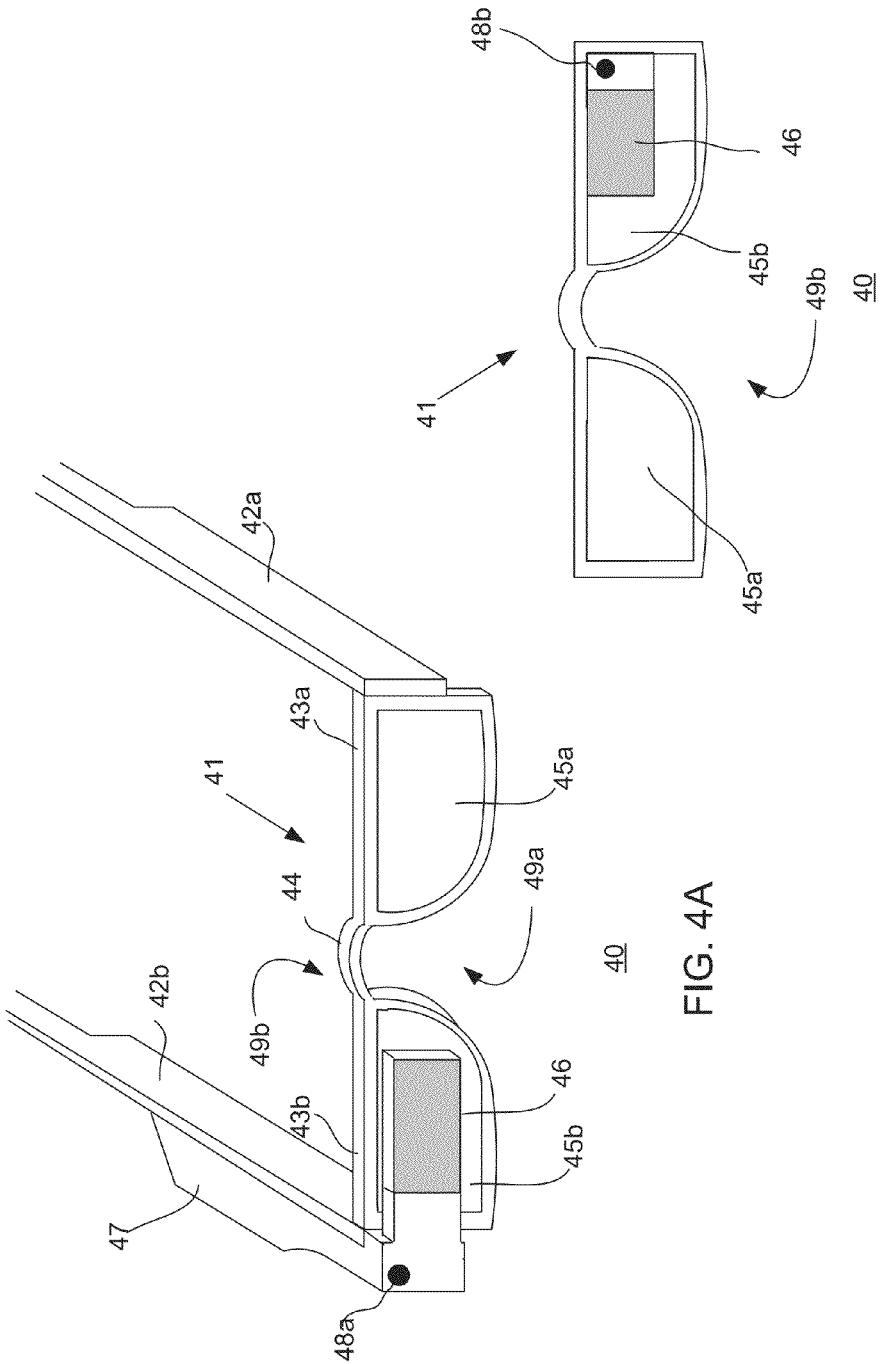

Actual View 60a

Aug View 60b

Aug View 60c

Aug View 60d

Actual View 60e

Aug View 60f

Aug View 60g

Actual View 60h

Aug View 60i

Aug View 60j

Aug View 60k

Actual View 60m

Aug View 60n

Aug View 60p

Actual View 60q

Aug. View 60r

Aug View 60s

Actual View 60t

Aug View 60u

Actual View 60v

Aug View 60w

PRESENTING AN AUGMENTED VIEW IN RESPONSE TO ACQUISITION OF DATA INFERRING USER ACTIVITY

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 9, Oct., 2012, which is currently co-pending or is an application of which a currently co-pending application is entitled to the benefit of the filing date, and which is a continuation of U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming GENE FEIN; ROYCE A. LEVIEN; RICHARD T. LORD; ROBERT W. LORD; MARK A. MALAMUD; JOHN D. RINALDO, JR.; CLARENCE T. TEGREENE as inventors, filed 5, Oct., 2012.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application,* USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes but is not limited to obtaining visual data of an actual view of a scene from a real environment, determining whether activity-inferring data that infers at least initial occurrence of one or more user activities associated with the scene from the real environment have at least been acquired, and presenting, in response at least in part to determining that the activity-inferring data have at least been acquired, an augmented view of the scene from the real environment, the augmented view including one or more augmentations that have been included into the augmented view based, at least in part, on the activity-inferring data. In some implementations, at least one of the obtaining, determining, or presenting being performed by a machine, article of manufacture, or composition of matter. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for obtaining visual data of an actual view of a scene from a real environment, means for determining whether activity-inferring data that infers at least initial occurrence of one or more user activities associated with the scene from the real environment have at least been acquired, and means for presenting, in response at least in part to determining that the activity-inferring data have at least been acquired, an augmented view of the scene from the real environment, the augmented view including one or more augmentations that have been included into the augmented view based, at least in part, on the activity-inferring data. In addition to the foregoing, other system aspects are described in the claims, drawings, and text forming a part of the disclosure set forth herein.

In one or more various aspects, a system includes, but is not limited to, circuitry for obtaining visual data of an actual view of a scene from a real environment, circuitry for determining whether activity-inferring data that infers at least initial occurrence of one or more user activities associated with the scene from the real environment have at least been acquired, and circuitry for presenting, in response at least in part to determining that the activity-inferring data have at least been acquired, an augmented view of the scene from the real environment, the augmented view including one or more augmentations that have been included into the augmented view based, at least in part, on the activity-inferring data. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, obtaining visual data of an actual view of a scene from a real environment, determining whether activity-inferring data that infers at least initial occurrence of one or more user activities associated with the scene from the real environment have at least been acquired, and presenting, in response at least in part to determining that the activity-inferring data have at least been acquired, an augmented view of the scene from the real environment, the augmented view including one or more augmentations that have been included into the augmented view based, at least in part, on the activity-inferring data. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 2A and 2B show the front and back views of an augmented reality (AR) device that is in the form of a tablet computer 20.

FIGS. 3A and 3B show different views of an augmented reality (AR) device that is in the form of a goggle 30.

FIGS. 4A and 4B show different views of an augmented reality (AR) device that is in the form of a goggle 40.

DETAILED DESCRIPTION

Figures 1A, 1B:
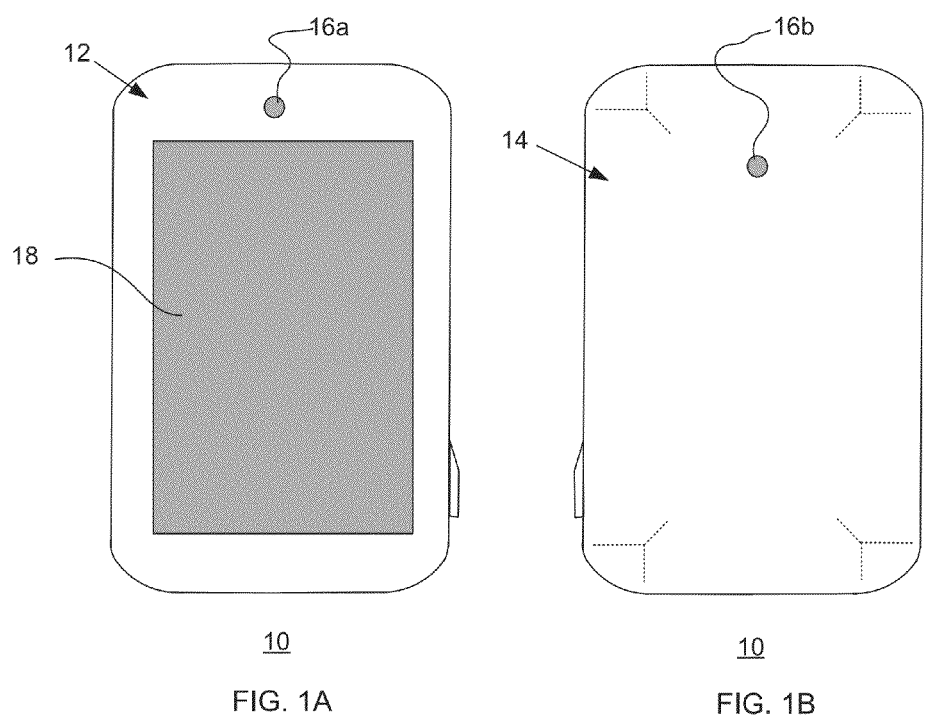
FIGS. 1A and 1B show the front and back views of an augmented reality (AR) device that is in the form of a smartphone 10.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

The evolution of personal computing technology over the past 40 years has been simply breathtaking, evolving from clunky large personal desktop computing devices with poor resolution television monitors and limited functionality to sleek and powerful mobile computing devices such as tablet computers and smartphones. As the personal computing technology continues to evolve a number of promising and exciting new technologies have emerged that are rapidly being developed for widespread personal use. One of the most promising new technologies is Augmented Reality (or simply "AR").

Wikipedia™ defines Augmented Reality as "a live, direct or indirect, view of a physical, real-world environment whose elements are augmented by computer-generated sensory input such as sound, video, graphics or GPS data." In order to facilitate understanding of the various concepts, processes, and systems to be discussed herein, certain basic terms and phrases will now be introduced and elucidated. For example, in the following the terms "augmentation," "augmented view," "actual view," "scene from a real environment," or variations thereof, are repeatedly recited. For purposes of the following, the phrase "scene from a real environment" will be in reference to an actual or true (visual) scene from an actual physical environment (as opposed to a virtual environment or world) in the proximate vicinity of an AR system and/or the user of the AR system (herein "AR device user"). For purposes of the following description, the phrase "actual view" is in reference to a true or unmodified (or substantially true or unmodified) view of a scene from the real environment. The phrase "augmented view," in contrast, is in reference to a view of an actual scene from the real environment that has been augmented (e.g., modified) and that may be presented (e.g., displayed or transmitted) through an AR system. An "augmentation" is any modification, revision, or addition that may be included in an augmented view of a scene from the real environment and that may not be present in the actual view of the scene from the real environment.

There are at least two types of computing devices that can be used to implement AR technology: "specifically-designed" AR systems and "nonspecifically-designed" AR systems. Nonspecifically-designed AR systems are general purpose computing systems or devices that can be configured to implement AR functionalities by executing, for example, AR software applications. Examples of such devices include, for example, personal mobile computing/communication devices such as tablet computers and smartphones. In contrast, specifically-designed AR systems are systems or devices that have been specifically designed to implement AR functionalities. Specifically-designed AR systems may come in a variety of forms but are most commonly in the form of a head-mounted display (HMD) such as in the form of eyeglasses, goggles, helmet, and so forth. These devices are sometimes referred to as "wearable computing devices." Typically these wearable computing devices will include one or more features that allows the user to wear the device on his/or her head (e.g., a coupling device for coupling the AR device to a user's head). Such features include, for example, a strap, a pair of earpieces or temple pieces (e.g., the parts of goggles or glasses that are attached to the frame of, for example, a glasses and that extend out to the ears of the user holding the eyeglasses frame to the face of the user—see example 42a or 42b of FIG. 4A, or in the case of a helmet the helmet structure itself). Alternatively, a wearable computing device may be made wearable by having a feature (e.g., one or more clips or hooks) that allows it to be attached or clipped onto the frame of a pair glasses or goggles thus allowing the AR device to be coupled to the user's head.

All of these devices (e.g., specifically-designed AR systems and nonspecifically-designed AR systems) will usually have certain common components including one or more cameras (e.g., digital, web, and/or HD cameras), one or more displays (e.g., LCD displays or see-through displays), and logic for processing data generated by the one or more cameras and/or for generating and merging computer generated data or images with actual views or images of scenes from real world environment to generate augmented views of the scenes of the real world environment. Although most if not all current AR systems will contain these same basic components (e.g., camera, display, etc.), they can, however, take on a wide range of form factors as briefly described above (e.g., tablet computer, goggles, and so forth).

FIGS. 1A and 1B, 2A and 2B, 3A and 3B, and 4A and 4B illustrate some of the form factors that current AR devices can take on. For example, FIG. 1A depicts the front-side 12 (e.g., the side of a personal computing/communication device that a display is located or disposed on), respectively, of a non-specifically-designed AR system that is in the form of a smartphone 10 and that can be configured or designed to implement one or more AR functionalities. FIG. 1B shows the backside 14 (e.g., the side of a personal computing/communication device that is opposite of the front-side 12 personal computing/communication device) of the exemplary smartphone 10 of FIG. 1A. The exemplary smartphone 10 may include a display 18, such as a touchscreen or liquid crystal display (LCD), on the front-side 12 of the smartphone 10. The smartphone 10 of FIGS. 1A and 1B is also depicted as having lens 16a for a forward-facing camera on the front-side 12 and lens 16b for a rear-facing camera on the back-side 14 of the smartphone 10. When employed to provide one or more augmented views of one or more scenes of real world environments, the display 18 may be used in order to display the augmented views. In some cases, the forward-facing camera associated with lens 16a may be used in order to track the gaze or focus of one or more eyes of a user. The rear-facing camera that is associated with lens 16b, on the other hand, may be used to capture (e.g., sense and/or record) actual scenes of real world environments in order to generate augmented views of those actual scenes. The generated augmented views may then be displayed through display 18.

FIGS. 2A and 2B illustrates the front-side 22 (e.g., the side of a personal computing/communication device that a display is located or disposed on) and the backside 24 (e.g., the side of the computing/communication device that is opposite of the front-side of the computing/communication device), respectively, of a nonspecifically-designed AR system that is in the form of a tablet computer 20 and that can be configured or designed to implement one or more AR functionalities. In FIGS. 2A and 2B, the tablet computer 20 is depicted as having a display 28, such as a touchscreen, on the front-side 22 of the tablet computer 20. The tablet computer 20 is also depicted as having lens 26a for a forward-facing camera on the front-side 22 and lens 26b for a rear-facing camera on the back-side 24 of the tablet computer 20.

In some cases, the forward-facing camera associated with lens 26a may be used in order to track the gaze or focus of one or more eyes of a user. The rear-facing camera associated with lens 26b on the back-side 24 of the tablet computer 20 may be used to capture (e.g., sense and/or record) actual scenes of real world environments in order to generate augmented views of those actual scenes. Note that in some cases, a single camera may be coupled to both lens 26a and lens 26b, thus the single camera can act as both a forward-facing and rear-facing camera. The generated augmented views may then be displayed through display 28. References to "real environment" or "real world environment" herein may be in reference to true or actual physical environments rather than to a virtual environment or virtual world.

FIGS. 3A and 3B illustrate a specifically-designed AR system in the form of video goggles 30 that can implement one or more AR functionalities. In particular, FIG. 3A illustrates a perspective view of the video goggle 30, which includes, among other things, a frame piece 32, a left temple 31a, and a right temple 31b. Disposed on the front-side 39a of the frame piece 32 are two forwarding looking lenses 34a and 34b for a pair of corresponding forward-looking cameras for capturing (e.g., recording, scanning, sensing, etc.) actual scenes of real world environments in order to generate augmented views of those actual scenes. FIG. 3B illustrates a view of the backside 39b of the frame piece 32 of the exemplary video goggles 30 of FIG. 3A. The backside 39b of the frame piece 32 is depicted as including a left display 38a and a right display 38b, a rim 35 surrounding the left display 38a and the right display 38b, a left lens 36a for a left camera and a right lens 36b for a right camera, and a left hinge 33b and a right hinge 33a. The rim 35 that may surround the left display 38a and the right display 38b may be a soft, semi-soft, or hard rim that in some cases may act as a cushion, as well as a barrier to prevent excess light from entering a user's field of view (thus allowing the user to better view the left and right displays 38a and 38b).

The forward-looking cameras associated with the forward-looking lens 34a and 34b may be used to capture (e.g., sense and/or record) actual scenes of real world environments in order to generate augmented views of those actual scenes. These augmented views that are generated may then be displayed through displays 38a and 38b. Note that in alternative implementations, the video goggle 30 may only employ a single forward-looking lens for a single forward-looking camera rather than employing two forward-looking lenses 34a and 34b for two forward-looking cameras as illustrated in FIG. 3A. In such implementations, the single forward-looking lens may be disposed at the mid-point or bridge part of the frame piece 32 above where a user's nose would be positioned. The output associated with the corresponding single forward-looking camera would then be displayed through both displays 38a and 38b.

The video goggles 30 may also include inward-looking lenses 36a and 36b as depicted in FIG. 3B for two inward-looking cameras (not shown) on the backside 39b of the frame piece 32 and disposed between the displays 38a and 38b and rim 35. The inward-looking cameras may be employed in order to track the movements as well as the gaze and focus of one or more eyes of a user. Note that alternatively, the video goggles 30 may include fewer or more inward-looking cameras and inward-looking lenses. Further, there is no requirement that a corresponding camera is needed for each inward-looking lens as it may be possible to employ, for example, a single camera for viewing through multiple lenses.

The frame piece 32, the left temple 31a, and the right temple 31b may house various electronics that are designed for, for example, processing data provided by the various cameras (e.g., forward-looking as well as backward looking cameras), and for generating augmented views of scenes from real world environment that may be displayed through displays 38a and 38b. The types of electronics that may be included with the video goggles 30 may include, for example, the same or similar types of electronics (e.g., microprocessors, controllers, network interface card, memory, etc.) that are often found in mobile computing/communication devices such as the smartphone 10 or the tablet computer 20 described earlier. The left temple 31a and the right temple 31b are features that allow the AR system to be worn on a user's head.

Turning now to FIGS. 4A and 4B, which illustrate a specifically-designed AR system that is in the form of electronic glasses 40 that can implement one or more AR functionalities. In particular, FIG. 4A illustrates a perspective view of the electronic glasses 40, which includes, among other things, a frame piece 41 (which further includes a left rim piece 43a, a right rim piece 43b, and a bridge 44), a left temple 42a, a right temple 42b, a left lens 45a, a right lens 45b, a see-through display 46, and electronics housing 47. The frame piece 41 having a front-side 49a and a backside 49b opposite of the front-side 49a. Disposed at the end of the electronics housing 47 is a forward-looking lens 48a for a corresponding forward-looking camera for capturing (e.g., recording, scanning, sensing, etc.) actual scenes of real world environments in order to generate augmented views of those actual scenes. In some alternative implementations, the forward-looking lens 48a may be alternatively located at bridge 44 of the frame piece 41 or at some other location. Note that the left lens 45a and the right lens 45b are optional and are not necessary for implementing AR functionalities.

In FIG. 4A, the see-through display 46 is depicted as covering only a portion of the right lens 45b and being depicted as being attached to the end of the electronics housing 47. Thus, the see-through display 46 may be used to display and overlay computer generated data and/or images onto portions of views of actual scenes of the real world environment that a user might see through right lens 45b. Note again that since the see-through display 46 covers only a portion of the right lens 45b, only a portion of the view that a user may see through the right lens 45b may be augmented (e.g., modified). In some other alternative implementations, the see-through display 46 may alternatively cover the entire right lens 45b so that the entire view of the user through the right lens 45b may be augmented if needed. Although the electronic glasses 40 in FIGS. 4A and 4B is depicted as having only one see-through display 46 over the right lens 45b, in alternative implementations, a second see-through display may be disposed over the left lens 45a. The left temple 42a and the right temple 42b are features that allow the AR system to be worn on a user's head.

FIG. 4B depicts a view of the backside 49b of the frame piece 41 of the electronic glasses 40 depicted in FIG. 4A. In FIG. 4B, the see-through display 46 can be seen through the clear right lens 45b. Further illustrated in FIG. 4B is an inward-looking lens 48b that can be seen through the clear right lens 45b and which is for a corresponding inward-looking camera. As illustrated the inward-looking lens 48b is disposed on the electronics housing 47 near the see-through display 46. The inward-looking cameras may be employed in order to track the movements as well as the gaze and focus of the right eye of a user. The placement of the inward-looking lens 48b is a design choice and may be located elsewhere so long as it has a view to the right eye of a user. In alternative implementations, a second inward-looking lens for a second inward-looking camera may be included in order to track and monitor the movements as well as the gaze and focus of the left eye of the user. In the exemplary electronic glasses 40 illustrated in FIG. 4A, all of the major components are depicted as being located on the right-side of the electronic glasses 40. Alternatively, these components (e.g., electronic housing 47, see-through display 46, and so forth) may be alternatively or additionally located on the left-side of the electronic glasses 40.

The electronics housing 47 may house various electronics including electronics that are designed for, for example, processing data provided by the various cameras (e.g., forward-looking as well as backward looking cameras), and for generating augmented views of scenes from real world environment that may be displayed through see-through display 46. The types of electronics that may be included with the electronic glasses 40 may include, for example, the types of electronics (e.g., microprocessors, controllers, network interface card, memory, camera, battery, etc.) that are often found in mobile computing/communication devices such as the smartphone 10 or the tablet computer 20 described earlier.

In some cases, the electronic housing 47 (and its contents including one or more cameras) and the see-through display 46 may be a separate unit that can be clipped onto a prescription or non-prescription eyeglasses. In such an embodiment, the electronic housing 47 may include one or more features (e.g. one or more clips, magnets, straps, and so forth) that allows the housing to be worn by a user by allowing the electronic housing 47 to be attached to a pair of eye-glasses or goggles.

There are many types of augmentations that can be provided through AR systems including, for example, augmentations in the form of text that is added to an augmented view, an augmentation in the form of 2 or 3-dimensional item (which may or may not be an animated item that moves) that is added to an augmented view, and/or an augmentation that simply modifies, emphasizes, deletes, or de-emphasizes an existing real world item (e.g., intensity of light, color of a car, removal of undesirable elements in the corresponding real field of view such as rubbish on the ground, etc.) in the augmented view.

One type of augmentation that many currently available AR systems can include into an augmented view of an actual scene of the real environment are vision-based augmentations that depend, for their existence in the augmented view, on the presence of a visual cue in the actual view of a scene from the real environment. That is, in many currently available AR systems, an augmentation will be included into an augmented view only when a visual cue is detected in the actual view of a scene from the real environment. In some cases, the visual cue that may be the basis for the inclusion of the augmentation in the augmented view may be a visual marker (e.g., a recognizable symbol or pattern such as the face of a dollar bill) that may have been purposefully placed in an actual scene of the real environment in order to prompt an AR system to insert a particular augmentation into the augmented view of the actual scene of the real environment. In other cases, the visual cue may be a recognizable or identifiable visual pattern (e.g., a human face) that may be recognized using image feature analysis (e.g., image tracking such as Parallel Tracking).

There are, of course, other types of augmentations that currently available systems can provide or have been proposed that depend, for their existence in an augmented view, on factors other than visual cues in the actual views of scenes of the real environment. For example, in some current AR systems, an augmentation can be provided that could depend, for its existence in the augmented view, on the location and/or orientation of the AR system that is presenting (e.g., displaying and/or transmitting) the augmented view. Several currently available AR systems are designed to insert one or more augmentations into an augmented view based on the location of the AR system and/or which direction is the AR system "facing" (e.g., east, west, north, up, down, etc.).

In accordance with various embodiments, computationally implemented methods, systems, circuitry, articles of manufacture, and computer program products are described herein that are designed to, among other things, presenting, in response at least in part to determining that activity-inferring data that infers at least initial occurrence of one or more user activities associated with a scene from the real environment have at least been acquired, an augmented view of the scene from the real environment, the augmented view including one or more augmentations that have been included into the augmented view based, at least in part, on the activity-inferring data. From another perspective, the computationally implemented methods, systems, circuitry, articles of manufacture, and computer program products may be designed to present an augmented view of a scene from the real environment based on determining whether data that indicates or suggests a particular user activity has been acquired More particularly, the computationally implemented methods, systems, circuitry, articles of manufacture, and computer program products may be designed to, among other things, obtaining visual data of an actual view of a scene from a real environment, determining whether activity-inferring data that infers at least initial occurrence of one or more user activities associated with the scene from the real environment have at least been acquired, and presenting, in response at least in part to determining that the activity-inferring data have at least been acquired, an augmented view of the scene from the real environment, the augmented view including one or more augmentations that have been included into the augmented view based, at least in part, on the activity-inferring data. That is, and as will be further described herein, there are many types of augmentations providing many types of information that could possibly be provided by the computationally implemented methods, systems, circuitry, articles of manufacture, and computer program. However, the specific type or types of augmentations (e.g., an augmentation providing time/date information, an augmentation providing user physiological information, an augmentation providing environmental information, a functional augmentation such as a calculator, and so forth) that may be presented through an augmented view of a scene from the real environment may be based on the type of user activity or activities that can be inferred to be associated with the scene from the real environment. In some cases, such inference can be made when a determination is made that "activity-inferring" data has been acquired or received that when processed infers at least initial execution or occurrence of the user activity or activities. As will be further described herein, the activity-inferring data that may be the basis for the one or more augmentations that may be included in an augmented view of a scene from the real environment may comprise of visual data (e.g., data as provided by one or more cameras) that indicate the presence of multiple visual cues in the actual view of the scene from the real environment, or data provided from multiple sources including from one or more cameras and one or more other sources (e.g., other types of sensors such as audio sensors and/or data provided by third parties).

Note that if only visual data is available for determining occurrence of a particular user activity, than such data in most cases will preferably indicate multiple visual cues (rather than a single visual cue). For example, if an AR user wearing an AR device is at a beach, the mere visual detection of the beach or ocean will not accurately determine whether the AR user is at the beach to sunbath, to play beach volleyball, or to go fishing. Thus, in many instances, it would require visually recognizing multiple items in the scene (e.g., beach, bare stomach, volleyball, etc.) in order to accurately determine user activity. Alternatively, data provided by multiple sources may be useful in determining or inferring user activities. For example, data provided through social networking channels or through a personal information manager (PIM) application such as Microsoft Office can provide very useful information in determining user activities.

Figure 7A:
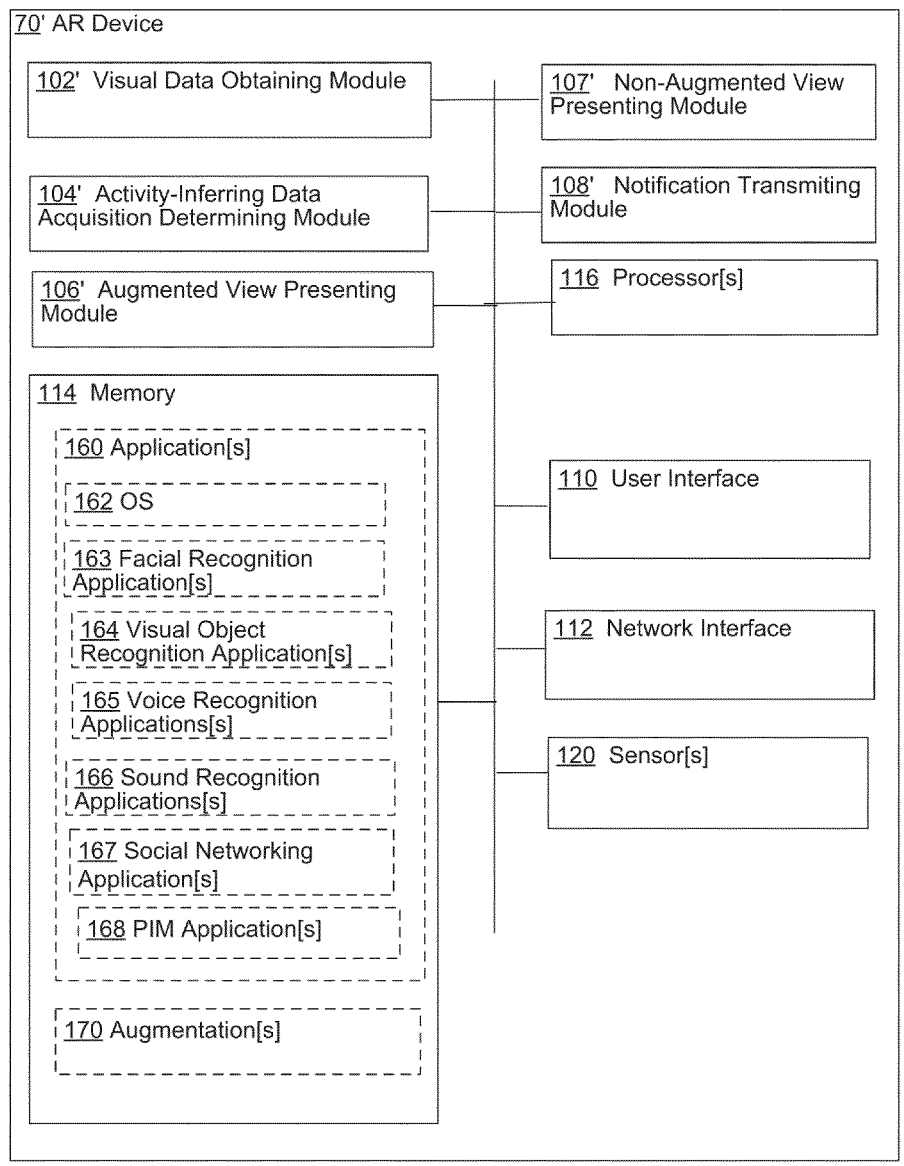
FIG. 7A shows a block diagram of particular implementation of an AR device 70'.
Figure 7B:
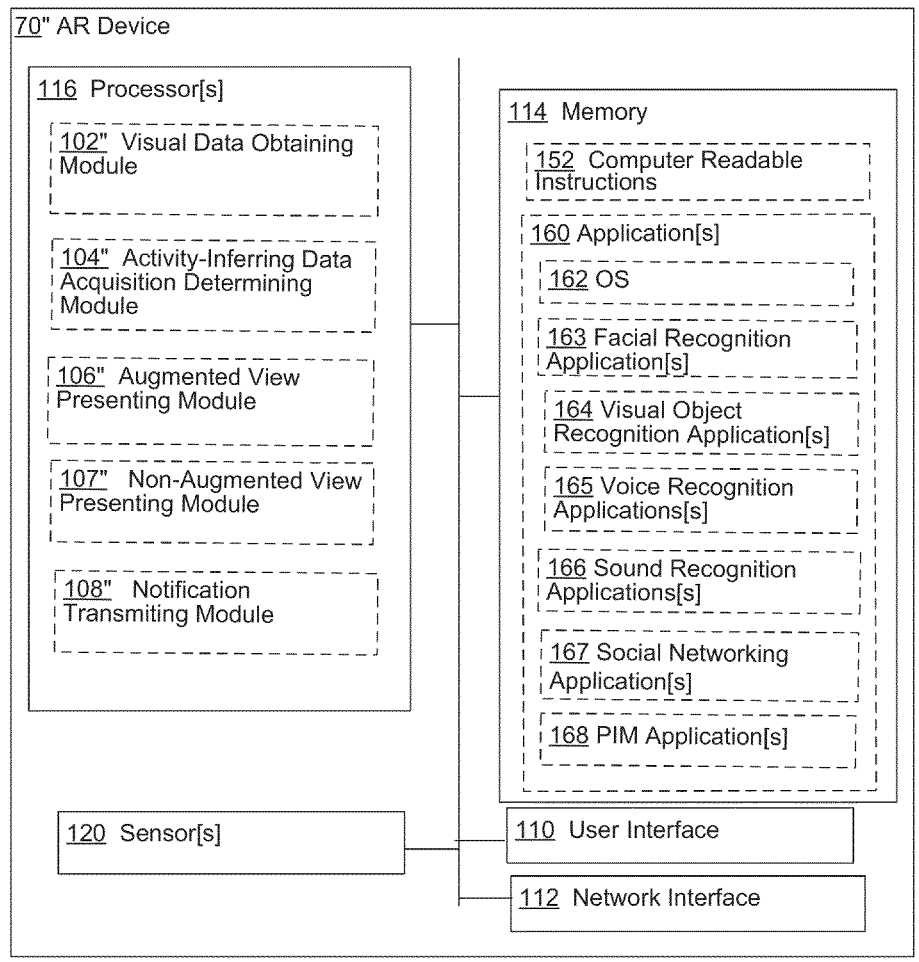
FIG. 7B shows a block diagram of yet another implementation of an AR device 70".

In various embodiments, the methods, systems, circuitry, articles of manufacture, and computer program products in accordance with various embodiments may be implemented by the AR device 70* of FIG. 7A or 7B. Note that for purposes of the following, "*" represents a wildcard. Thus, references in the following to the AR device 70* of FIG. 7A or 7B may be in reference to the AR device 70' of FIG. 7A or to the AR device 70'' of FIG. 7B. Note further that the AR device 70* of FIG. 7A or 7B may have a variety of form factors including any one of the form factors illustrated in FIGS. 1A, 1B, 2A, 2B, 3A, 3B, 4A, and 4B.

Figure 5A:
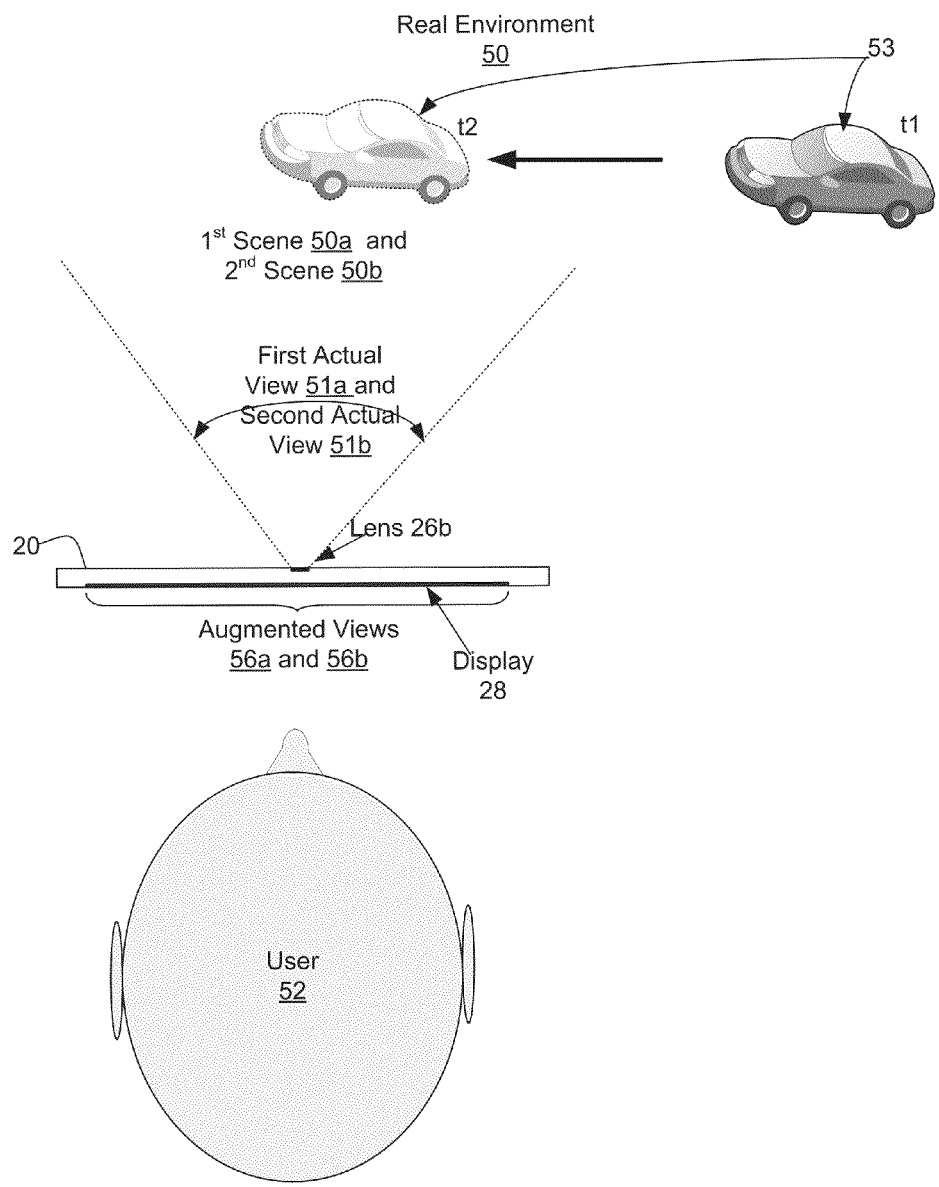
FIG. 5A shows a user 52 using the tablet computer 20 of FIGS. 2A and 2B in order to view two different scenes in the real environment 50 at two different points or increments in time.
Figure 5B:
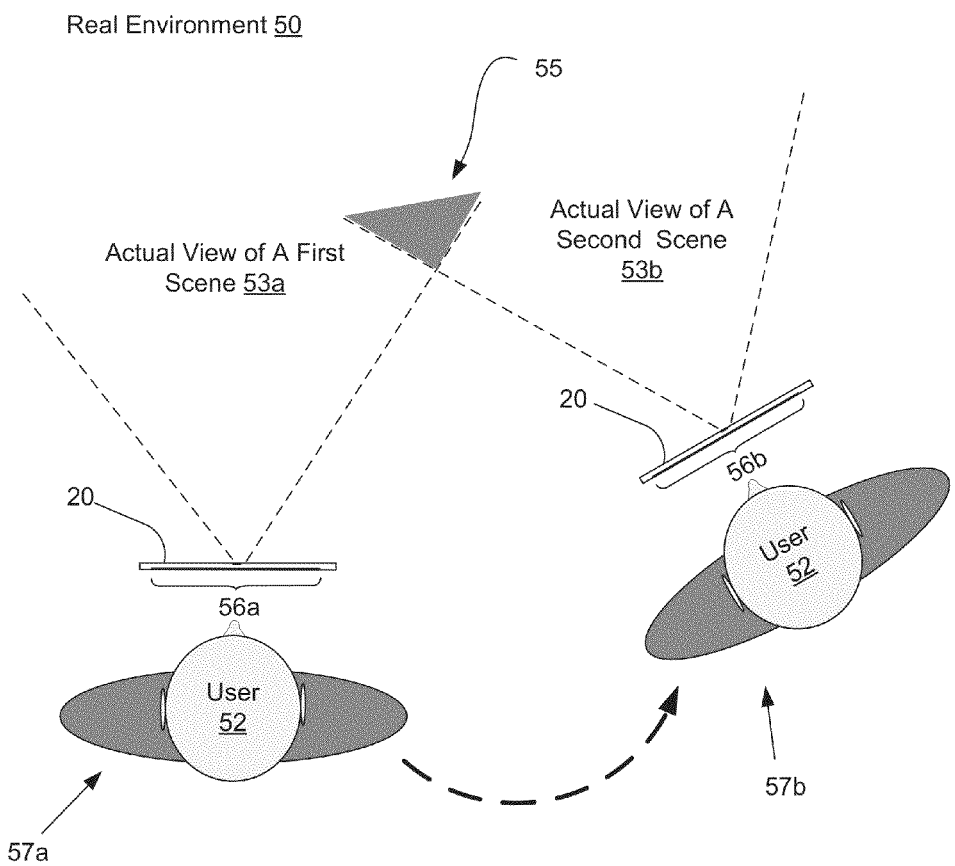
FIGS. 5B and 5C show the user 52 of FIG. 5A moving in space and using the tablet computer 20 to view different scenes from the real environment 50.
Figure 5C:
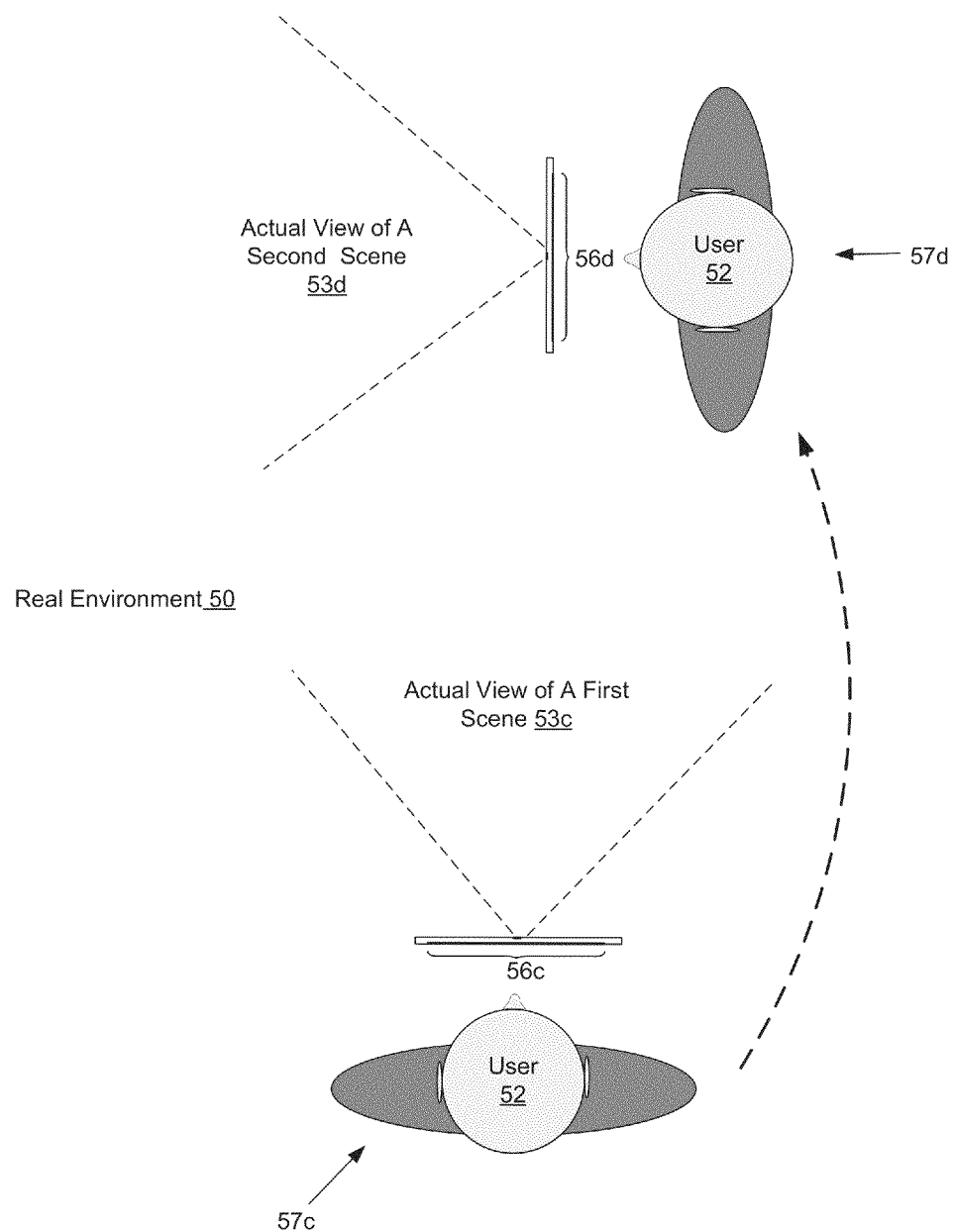

In order to further facilitate understanding of the various operations, processes, and systems to be described herein, certain concepts and terms will now be introduced with references to FIGS. 5A, 5B, and 5C. In particular, FIG. 5A is a top-down view of an AR user 52 (herein simply "user 52") using an AR device 70* that is in the form of a tablet computer 20 illustrated in FIGS. 2A and 2B at two different points or increments in time. Note that although the AR device illustrated here is in the form of a tablet computer 20, the concepts to be introduced here as well as in FIGS. 5B and 5C will apply to other AR devices having other form factors (e.g., smartphone, video goggles, electronic goggles, and so forth).

Returning now to FIG. 5A which shows user 52 viewing a first augmented view 56a of a first (actual) scene 50a from the real environment 50 surrounding the AR device (e.g., tablet computer 20) and the AR device user 52 at a first point or increment in time (t1). A first actual view 51a of the first scene 50a of the real environment 50 may be captured by a camera through lens 26b at the first point or increment in time (t1), and the augmented view 56a of the first scene 50a of the real environment 50 being presented through a display 28 of the tablet computer 20. Note that a car 53 is illustrated as being present in the real environment 50 and is depicted as moving towards the line of sight (e.g., actual view 51—field of view) of the tablet computer 20.

At a second point or increment in time (t2), the tablet computer 20 may capture a second actual view 51b of a second scene 50b from the real environment 50 that includes the car 53 in the second actual view 51b of the second scene 50b. Based on the captured second actual view 51b of the second scene 50b, the tablet computer 20 may generate a second augmented view 56b. Thus, a scene from the real environment is not only location dependent but is also time dependent. Note that for purposes of the following, the first actual view 51a of the first scene 50a completely "overlaps" the second actual view 51b of the second scene 50b since both are views of the same location but at different points or increments in time.

Referring to FIG. 5B, which shows the views of the AR device user 52 through an AR device (e.g., the tablet computer 20 of FIGS. 2A and 2B) as the user 52 moves from a first location 57a to a second location 57b in the real environment 50. In the first location 57a, the AR device (e.g., the tablet computer 20) of the user 52 may capture the actual view of a first scene 53a of the real environment 50 using, for example, an optical or visual sensor such as a camera that may be included with the AR device (e.g., tablet computer 20). In FIG. 5B, the user 52 along with the AR device (e.g., tablet computer 20) is depicted as moving to a second location 57b. At the first location 57a the AR device (e.g., tablet computer 20) captures the actual view of a first scene 53a from the real environment 50. Based, at least in part, on the actual view of the first scene 53a, the AR device (e.g., tablet computer 20) may present an augmented view 56a to the user 52 via a display (e.g. the display 28 of the tablet computer 20) of the AR device. In the second location 57b, the AR device (e.g., tablet computer 20) captures the actual view of a second scene 53b from the real environment 50. Based, at least in part, on the actual view of the second scene 53b, the AR device (e.g., tablet computer) an augmented view 56b may be presented to the user 52 via a display (e.g. the display 28 of the tablet computer 20) of the AR device. Note that in the example illustrated in FIG. 5B, the actual view of the first scene 53a and the actual view of the second scene 53b at least partially overlaps (see, for example, overlap 55).

Although not illustrated in FIG. 5B, in some cases, the actual view of the first scene 53a may at least partially overlap with the actual view of the second scene 53b when, for example, the actual view of the first scene 53a overlaps completely with the actual view of the second scene 53b. This may occur when, for example, a user of the AR device 70 stays stationary in one spatial location and using the AR device looks towards the same scene in the real environment for a period of time, and where the actual view of the same scene changes due to changes in natural lighting (e.g., from daylight to dusk) and/or from the entrance or departure of one or more objects (e.g., a passing truck or a person) in the scene.

Turning now to FIG. 5C, which shows the views of the AR device user 52 through an AR device (e.g., the tablet computer 20) as the user 52 moves from a first location 57c to a second location 57d in the real environment 50. In the first location 57c the AR device (e.g., the tablet computer 20) of the user 52 may capture the actual view of a first scene 53c of the real environment 50 using, for example an optical or visual sensor such as a camera that may be included with the AR device (e.g., tablet computer 20). In FIG. 5C, the user 52 along with the AR device (e.g., tablet computer 20) is depicted as moving to a second location 57d. At the first location 57c the AR device (e.g., tablet computer 20) may capture the actual view of a first scene 53c from the real environment 50 using, for example, a camera. Based, at least in part, on the actual view of the first scene 53c, the AR device (e.g., tablet computer 20) may present an augmented view 56c to the user 52 via a display (e.g. the display 28 of the tablet computer 20) of the AR device. In the second location 57d, the AR device (e.g., tablet computer 20) captures the actual view of a second scene 53d from the real environment 50. Based, at least in part, on the actual view of the second scene 53d, the AR device (e.g., tablet computer 20) may present an augmented view 56d that may be presented to the user 52 via a display (e.g. the display 28 of the tablet computer 20) of the AR device. Note that unlike the example illustrated in FIG. 5B, in the example illustrated in FIG. 5C, the actual view of the first scene 53c and the actual view of the second scene 53d do not overlap. That is, no part of the actual view of the first scene 53c can be seen in the actual view of the second scene 53d.

Turning now to FIGS. 6A, 6B, 6C, 6D, 6E, 6F, 6G, 6H, 6I, 6J, 6K, 6M, 6N, 6P, 6Q, 6R, 6S, 6T, 6U, 6V, and 6W that illustrate exemplary actual views and augmented views of various scenes from the real environment that may be provided by the computationally implemented methods, systems, circuitry, articles of manufacture, and computer program products in accordance with various embodiments. The exemplary actual views and the exemplary augmented views illustrated in these figures are provided in order to facilitate understanding of various concepts that will be described in connection with the various operations and processes to be discussed herein. Note that in various embodiments at least the augmented views (e.g., augmented views 60b, 60c, 60d, 60f, 60g, 60i, 60j, 60k, 60n, 60p, 60r, 60s, 60u, and 60w) illustrated in FIGS. 6B, 6C, 6D, 6F, 6G, 6I, 6J, 6K, 6N, 6P, 6R, 6S, 6U, and 6W may be presented by the AR device 70* (e.g., AR device 70' or AR device 70") of FIG. 7A or 7B.

Figure 6A:
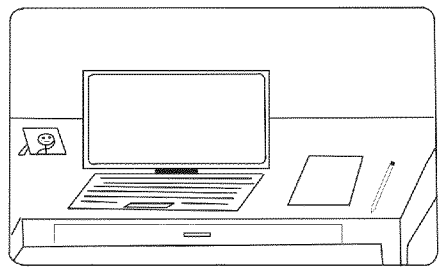
FIGS. 6A, 6B, 6C, 6D, 6E, 6F, 6G, 6H, 6I, 6J, 6K, 6M, 6N, 6P, 6Q, 6R, 6S, 6T, 6U, 6V, and 6W show exemplary actual and augmented views of various scenes from the real environment.

Referring particularly now to FIG. 6A, which illustrates an actual view 60a of a scene from the real environment. In this case, the actual scene is an actual "office" scene that includes a computer, a notebook, and a pen on top of a desk. The actual view 60a may be captured by, for example a camera of an AR device 70* (e.g., AR device 70' of FIG. 7A or AR device 70" of FIG. 7B) and may, in some cases, be displayed through the display (e.g., display 28 of an AR device 70*. In this actual view 60a, no augmentation has been included in the actual view 60a of the actual office scene.

Figure 6B:
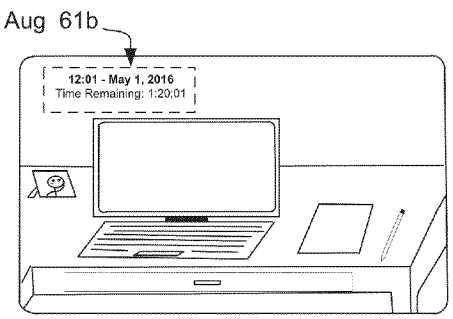

FIG. 6B illustrates an exemplary augmented view 60b of the actual view 60a illustrated in FIG. 6A. Included in the augmented view 60b is an augmentation 61b. The augmentation 61b included in the augmented view 60b may be inserted into a pre-selected location (e.g., top left corner, which may have been selected based on one or more visual cues) of the augmented view 60b. In this example, the augmentation 61b being a time augmentation that provides time information. The exemplary augmentation 61b may, for its inclusion into the augmented view 60b, be based on the presence of multiple visual cues in the actual view 60a (e.g., a determination that the actual view 60a includes multiple items that when found in combination in the same actual view 60a, suggests or infers that a user is working at his office), or based on multiple indicators from multiple sources (e.g., visual data, global positioning system (GPS) data, and data provided by a personal information manager (PIM) application such as Microsoft Outlook) that when processed suggests or infers that the user is working at his office. Note that the persistent augmentation 61b depicted in FIG. 6B is not formatted in the form of a mechanical object (e.g., a wall clock, a digital desk clock, a wristwatch). Instead, the time augmentation 61b is presented in the form of plain text. However, in alternative implementations, the time augmentation 61b may be presented in the form of a mechanical object, such as a desk clock or a wristwatch for example, and placed in a particular location (e.g., superimposed on top of the desk or on the wriest of the user in the augmented view 60b in order to blend into the augmented view 60b). Further note that the persistent augmentation 61b is, at least content-wise, dynamic. That is, since the current time is continuously changing, the time that is presented through the persistent augmentation 61 will evolve over time. The selection of the type of augmentation 61b to be presented in the augmented view 60b in this case as well as in the following examples to be described herein with respect to FIGS. 6A, 6B, 6C, 6D, 6E, 6F, 6G, 6H, 6I, 6J, 6K, 6M, 6N, 6P, 6Q, 6R, 6S, 6T, 6U, 6V, and 6W may be based on activity-inferring data that may have been acquired or received via one or more sensors (e.g., one or more cameras, microphones, GPS, accelerometers, and so forth) and one or more communication portals (e.g., wireless and/or wired network interfaces).

Figure 6C:
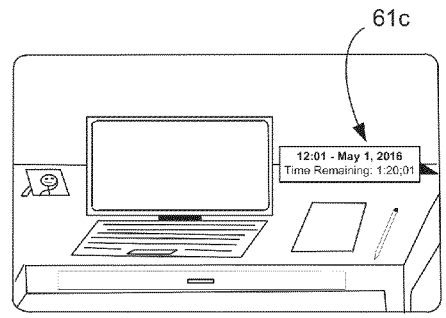

FIG. 6C illustrates another augmented view 60c of the same actual view 60a of FIG. 6A. The augmented view 60c includes an augmentation 61c that provides the same time information as the augmentation 61b of FIG. 6B except that rather being simple text, the augmentation 61c is in the form of a digital desk clock that is placed on top of the desk. The particular placement of the augmentation 61c in the augmented view 60c may be based on one or more visual cues (e.g., the desk and the computer monitor) found in the actual view 60a of the scene from the real environment.

Figure 6D:
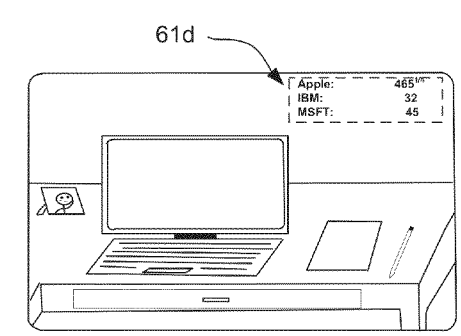

Turning now to FIG. 6D, which illustrates how other types of augmentations providing other types of information may be presented through an augmented view 60d. In particular, FIG. 6D illustrates an augmented view 60d of the actual view 60a illustrated in FIG. 6A. Augmented view 60d includes an augmentation 61d that provides business/market information in the form of stock market prices.

Figure 6E:
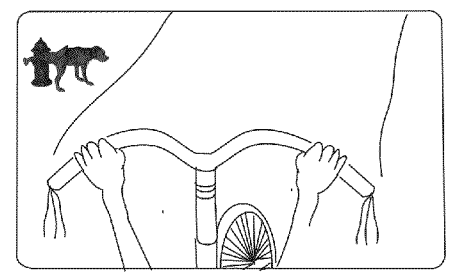

FIG. 6E illustrates an actual view 60e of a street or a path scene from the perspective of a rider of a bicycle (e.g., a rider wearing a wearable AR device). In some implementations, an inference may be made that the scene captured by the actual view 60e is associated with a user riding or peddling a bicycle based, at least in part, on activity-inferring data that may indicate multiple cues (e.g., multiple visual cues found in the actual view 60e and/or one or more cues found in data provided by other non-optical/non-visual sources, e.g., audio data, data provided by a social networking channels, GPS data, accelerometer, and so forth) that suggests one or more user activities.

Figure 6F:
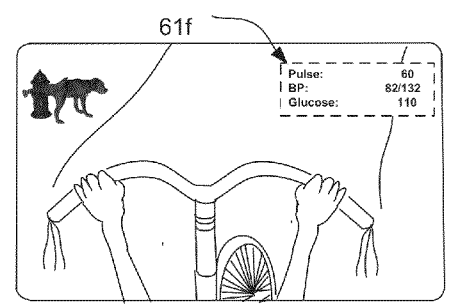

Turning now to FIG. 6F, which shows an augmented view 60f of the actual view 60e of the street or path scene of FIG. 6E. The augmented view 60f includes an augmentation 61f that provides user physiological information (e.g., pulse rate, blood pressure, blood glucose level, and so froth). In some cases, the augmentation 61f may have been selected for presentation in the augmented view 60f as a result determining that activity-inferring data that infers at least initial execution or occurrence of a particular user activity (e.g., riding a bicycle) have been acquired.

Figure 6G:
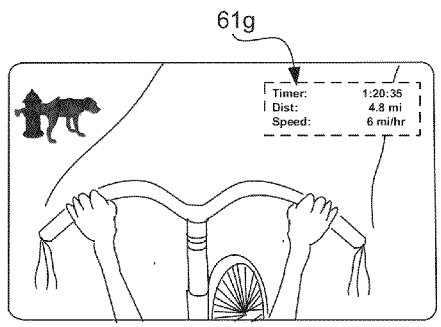

FIG. 6G illustrates yet another augmented view 60g of the actual view 60e of FIG. 6E. In particular, FIG. 6G shows the augmented view 60g having an augmentation 61g that provides user exercise metrics information (e.g., exercise time, distance traveled, speed bicycle, and so forth). Again in some implementations such augmentation 61g may have been selected for presentation in the augmented view 60g based on determining that activity-inferring data have been acquired that when processed infers one or more particular user activities.

Figure 6H:
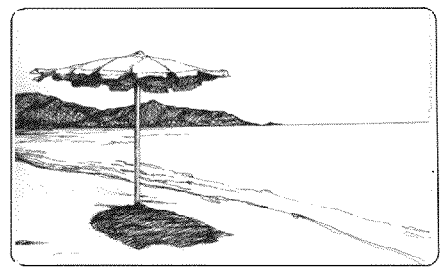

FIG. 6H illustrates an actual view 60h of a beach. In some implementations, an inference may be made that the beach scene captured by the actual view 60h is associated with a user sunbathing or relaxing on the beach or other beach-related activities based, at least in part, on multiple cues (e.g., multiple visual cues found in the actual view 60h and/or one or more cues found in data provided by other sources, e.g., audio data, data provided by a social networking application indicating user schedule or calendar, GPS data, and so forth) found in activity-inferring data that may have been acquired (e.g., received or obtained) from multiple sources (e.g., audio and/or optical sensors, third party sources such as cellular or data towers, and so forth).

Figure 6I:
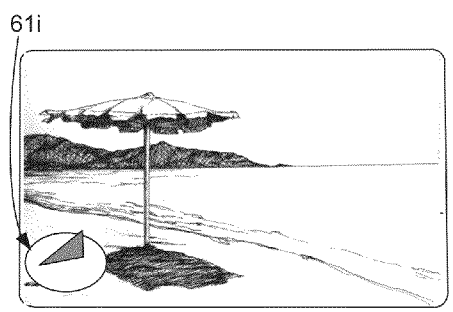

Turing now to FIG. 6I, which shows an augmented view 60i of the actual view 60h of FIG. 6H. As illustrated, the augmented view 60i includes an augmentation 61i in the form of a sundial that provides time information. In some cases, the augmentation 61i may have been selected for presentation in the augmented view 60i as a result determining that activity-inferring data that when processed infers at least initial execution or occurrence of a particular user activity (e.g., sunbathing) have been acquired.

Figure 6J:
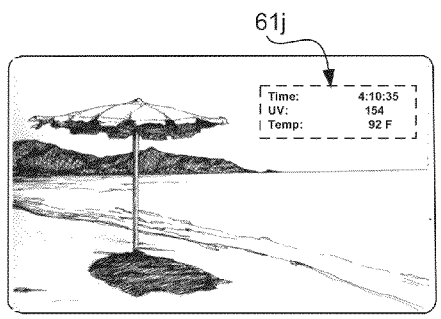

FIG. 6J illustrates yet another augmented view 60j of the actual view 60h of the beach scene of FIG. 6H. In this implementation, the augmented view 60j includes an augmentation 61j that provides certain environmental information rather than the time information provided by the augmentation 61i of FIG. 6I. Again, the augmentation 61j here may have been as result of determining that activity-inferring data that infers at least initial execution or occurrence of a particular user activity (e.g., strolling on the beach) have been acquired. Again, such activity-inferring data may be visual data that indicate multiple visual cues in the actual view 60h or various types of data that may have been acquired from multiple sources including visual data (e.g., data provided by one or more cameras) and one or more other types of data (e.g., audio data, data provided through a PIM application or through a social networking application, GPS data, and so forth).

Figure 6K:
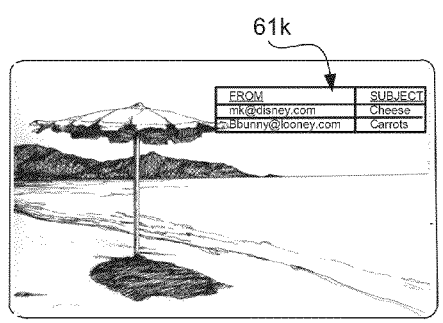

FIG. 6K illustrates still another augmented view 60k of the actual view 60h of the beach scene of FIG. 6H. In this implementation, the augmented view 60k provides current or latest electronic messaging information (e.g., reception of email messages, text messages, and/or instant messages). Again, the augmentation 61k here may have been as result of determining that activity-inferring data that infers at least initial execution or occurrence of a particular user activity (e.g., watching ocean waves breaking) have been acquired. Again, such activity-inferring data may be in a variety of forms including visual data that indicate multiple visual cues in the actual view 60h or various types of data that may have been acquired from multiple sources including visual data (e.g., data provided by one or more cameras) and one or more other types of data (e.g., audio data, data provided through a PIM application or through a social networking application, GPS data, and so forth).

Figure 6M:
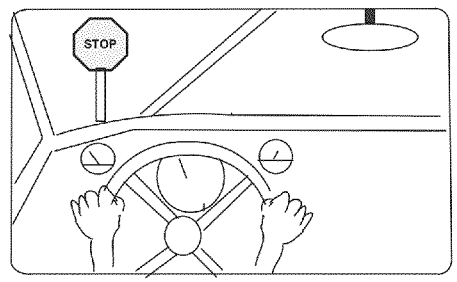

Referring now to FIG. 6M, which illustrates an actual view 60m of an interior of an automobile as perceived, for example, by a user (e.g., a user wearing a wearable AR device) driving the automobile. In some implementations, an inference may be made that the interior automobile scene captured by the actual view 60m is associated with a user operating an automobile based, at least in part, on multiple cues (e.g., multiple visual cues found in the actual view 60m and/or one or more cues found in data provided by other sources, e.g., audio data, data provided by a social networking application indicating user schedule or calendar, GPS data, and so forth) found in activity-inferring data that may have been acquired (e.g., received or obtained) from multiple sources (e.g., audio and/or optical sensors, third party sources such as cellular or data towers, and so forth)

Figure 6N:
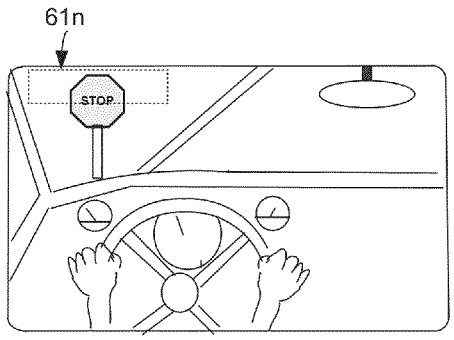

FIG. 6N illustrates an augmented view 60n of the actual view 60m of the automobile interior of FIG. 6M. As illustrated, the augmented view 60n includes an augmentation 61n that provides time information. Note that the time augmentation 61n (which is similar to the time augmentation 61b of FIG. 6B) is at least semi-transparent in order to prevent the "STOP" sign in the actual view 60m from being completely hidden in the augmented view 60n. Thus, in this implementation, the augmentation 61n has been modified to be semi-transparent based on a determination that a particular real world item (e.g., the "STOP" sign) is present at the location in the augmented view 60n where the augmentation 61n was to be placed.

Figure 6P:
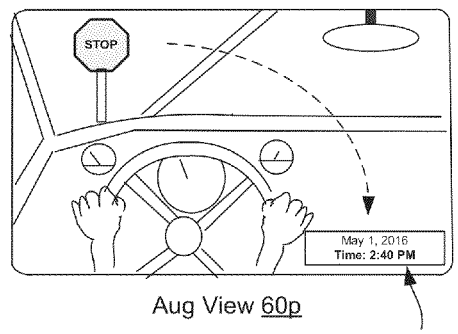

FIG. 6P illustrates another augmented view 60n of the actual view 60m of the automobile interior of FIG. 6M. As illustrated, the augmented view 60p includes an augmentation 61p that provides time information. Note that the time augmentation 61p (which is similar to the time augmentation 61b of FIG. 6B) has been relocated in the augmented view 60p in order to prevent the "STOP" sign in the actual view 60m from being completely hidden in the augmented view 60p. Thus, in this implementation, the augmentation 61p has been relocated based on a determination that a particular real world item (e.g., the "STOP" sign) is present at the location in the augmented view 60p where the augmentation 61p was to be placed.

Figure 6Q:
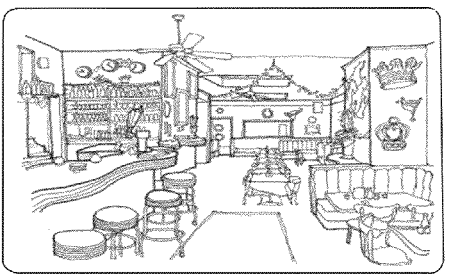

FIG. 6Q illustrates an actual view 60q of an interior restaurant scene. In some implementations, an inference may be made that the interior restaurant captured by the actual view 60q is associated with a dining or other restaurant-related activities based, at least in part, on multiple cues (e.g., multiple visual cues found in the actual view 60q and/or one or more cues found in data provided by other sources, e.g., audio data, data provided by a social networking application indicating user schedule or calendar, GPS data, and so forth) found in activity-inferring data that may have been acquired (e.g., received or obtained) from multiple sources (e.g., audio and/or optical sensors, third party sources such as cellular or data towers, and so forth).

Figure 6R:
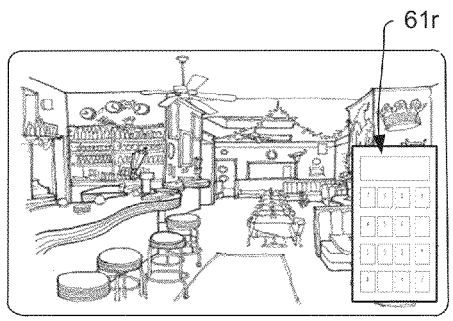

FIG. 6R illustrates an augmented view 60r of the actual view 60q of the restaurant interior of FIG. 6Q. As illustrated, the augmented view 60r includes a functional augmentation 61r in the form of a calculator. Note that the functional calculator augmentation 61r is a dynamic functional augmentation that may provide calculation functions. The calculator augmentation may be controlled using a variety of means including, for example, by voice command or by eye glaze or focus tracking. The augmentation 61r may have been as result of determining that activity-inferring data that infers at least initial execution or occurrence of a particular user activity (e.g., dining) have been acquired. Again, such activity-inferring data may be in a variety of forms including visual data that indicate multiple visual cues in the actual view 60q or various types of data that may have been acquired from multiple sources including visual data (e.g., data provided by one or more cameras) and one or more other types of data (e.g., audio data, data provided through a PIM application or through a social networking application, GPS data, and so forth).

Figure 6S:
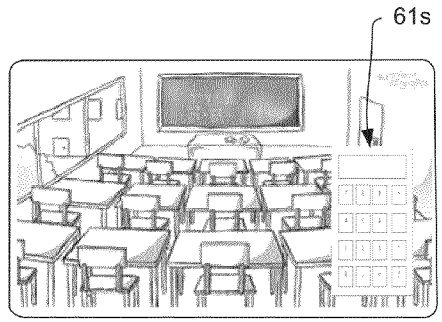
Figure 6T:
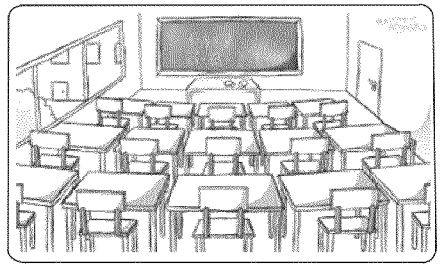

FIG. 6S illustrates an augmented view 60s of the actual view 60t of a classroom scene of FIG. 6T. In this implementation, the augmented view 60s includes an augmentation 61s that is a disabled functional augmentation (e.g., the disabled version of the calculator augmentation 61r of FIG. 6R. The augmentation 61s may have been as result of determining that activity-inferring data that infers at least initial execution or occurrence of a particular user activity (e.g., taking a test) have been acquired. Again, such activity-inferring data may be visual data that indicate multiple visual cues in the actual view 60t or various types of data that may have been acquired from multiple sources including visual data (e.g., data provided by one or more cameras) and one or more other types of data (e.g., data provided through a PIM application, a request or command transmitted by a third party such as a school administrator to shut off calculators, and so forth). Note that in some implementations, a functional augmentation 61s, such as the one illustrated in FIG. 6S, may be disabled by simply removing the functional augmentation 61s from the view to be presented (such as the actual view 60t illustrated in FIG. 6T illustrating an actual view 60t of a lecture hall or classroom).

Figure 6U:
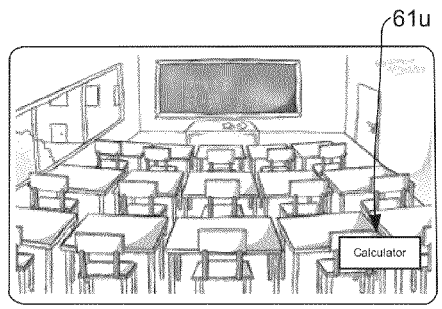

FIG. 6U illustrates yet another augmented view 6U of the actual view 60t of a classroom scene of FIG. 6T. In this implementation, the calculator augmentation 61r of FIG. 6R is disabled by replacing the calculator augmentation 61r with tab augmentation 61u. In some cases, the tab augmentation 61u may not be functional and may only indicate that a calculator augmentation has been removed. In other cases, the tab augmentation 61u may be functional allowing a user to re-insert or recall the calculator augmentation 61r if the user "clicks" (e.g., selecting by voice command or eye focus or gaze tracking) the tab augmentation 61u.

Figure 6V:
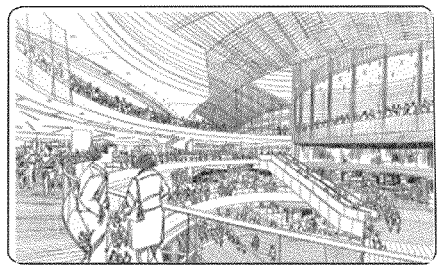
Figure 6W:
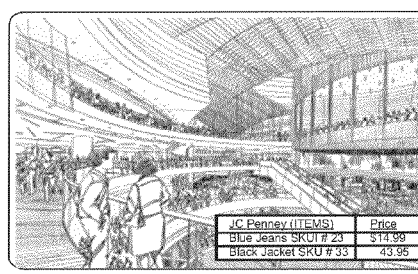

FIG. 6V illustrates an actual view 60v of a mall interior, while FIG. 6W illustrates an augmented view 60w of the actual view 60v of the mall interior of FIG. 6V. As illustrated, the augmented view 60w includes an augmentation 61w that provides retail information. In some cases, the augmentation 61w may have been selected for presentation in the augmented view 60w as a result determining that activity-inferring data that infers at least initial execution or occurrence of a particular user activity (e.g., shopping) have been acquired.

Referring now to FIGS. 7A and 7B, FIGS. 7A and 7B are two block diagrams representing two different implementations of an augmented reality (AR) device 70* that can execute the operations and processes to be described herein. In particular, and as will be further described herein, FIG. 7A illustrates an AR device 70' that is the "hardwired" or "hard" implementation of an AR device 70' that can implement the operations and processes to be described herein. The AR device 70' includes certain logic modules including a visual data obtaining module 102', an activity-inferring data acquisition determining module 104', an augmented view presenting module 106', a non-augmented view presenting module 107', and a notification transmitting module 108' that are implemented using purely hardware or circuitry components (e.g., application specific integrated circuit (or ASIC). In contrast, FIG. 7B illustrates an AR device 70" that is the "soft" implementation of the AR device 70' of FIG. 7A in which certain logic modules including a visual data obtaining module 102", an activity-inferring data acquisition determining module 104", an augmented view presenting module 106", a non-augmented view presenting module 107", and a notification transmitting module 108" are implemented using electronic circuitry (e.g., one or more processors including one or more microprocessors, controllers, etc.) executing one or more programming instructions (e.g., software).

The embodiments of the AR device 70* illustrated in FIGS. 7A and 7B are two extreme implementations of the AR device 70* in which all of the logic modules (e.g., the visual data obtaining module 102', the activity-inferring data acquisition determining module 104', the augmented view presenting module 106', the non-augmented view presenting module 107', and the notification transmitting module 108') are implemented using purely hardware solutions (e.g., circuitry such as ASIC) as illustrated in FIG. 7A or in which all of the logic modules (e.g., the visual data obtaining module 102", the activity-inferring data acquisition determining module 104", the augmented view presenting module 106", the non-augmented view presenting module 107", and the notification transmitting module 108") are implemented using software solutions (e.g., programmable instructions being executed by hardware such as one or more processors) as illustrated in FIG. 7B. Since, there are many ways of combining hardware, software, and/or firmware in order to implement the various logic modules (e.g., the visual data obtaining module 102*, the activity-inferring data acquisition determining module 104*, the augmented view presenting module 106*, the non-augmented view presenting module 107*, and the notification transmitting module 108*), only the two extreme implementations (e.g., the purely hardware solution as illustrated in FIG. 7A and the software solution of FIG. 7B) are illustrated here. It should be noted here that with respect to the "soft" implementation illustrated in FIG. 7B, hardware in the form of circuitry such as one or more processors 116 are still needed in order to execute the software. Further details related to the two implementations of AR device 70* illustrated in FIGS. 7A and 7B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 7A, which illustrates a block diagram of an AR device 70' that includes a visual data obtaining module 102', an activity-inferring data acquisition determining module 104', an augmented view presenting module 106', a non-augmented view presenting module 107', and a notification transmitting module 108', one or more processors 116 (e.g., one or more microprocessors), a memory 114 that may store one or more applications 160 (e.g., an operating system (OS) 162, one or more facial recognition applications 163, one or more visual object recognition applications 164 (e.g., for visually recognizing one or more items that are visible in a scene from the real physical environment), one or more voice recognition applications 165, one or more sound recognition applications 166 (e.g., an application for recognizing/identifying sounds other than voice such as the sound of a train passing or waves crashing along a shoreline), a one or more social networking applications 167 such as Twitter or Facebook, one or more personal information manager applications such as Microsoft Outlook, and so forth) and one or more augmentations 170, user interface 110 (e.g., a display, a mouse, a microphone, etc.), a network interface 112 (e.g., a network interface card or "NIC"), and/or one or more sensors 120. Although not depicted, the memory 114 may also include communication applications such as an email application and/or an instant messaging (IM) application.

In various embodiments, the visual data obtaining module 102' of FIG. 7A is a logic module that may be designed to, among other things, obtain visual data (e.g., visual data a captured by one or more cameras 870) of an actual view (e.g., actual view 60a, 60e, 60h, 60m, or 60q of FIG. 6A, 6E, 6H, 6M, or 6Q) of a scene (e.g., a beach scene, a work scene, a shopping/mall scene, and so forth) from a real environment.

In contrast, the activity-inferring data acquisition determining module 104' of FIG. 7A is a logic module that may be configured to determine whether activity-inferring data (e.g., visual data as captured by one or more cameras 870, audio data, data provided via social networking application, data provided through a PIM application, and so forth) that infers at least initial occurrence of one or more user activities (e.g., exercising, shopping, attending a social function, professional or employment activities, and so forth) associated with the scene from the real environment have at least been acquired (e.g., received).

Based at least on the activity-inferring data acquisition determining module 104' determining that the activity-inferring data has been acquired, the augmented view presenting module 106' of FIG. 7A may be designed to present an augmented view (e.g., augmented view 60b, 60c, 60d, 60f, 60g, 60i, 60j, 60k, 60n, 60p, 60r, 60s, 60u, or 60w of FIG. 6B, 6C, 6D, 6F, 6G, 6I, 6J, 6K, 6N, 6P, 6R, 6S, 6U, or 6W) of the scene from the real environment (e.g., a work environment scene, a beach scene, a shopping mall scene, and so forth), the augmented view including one or more augmentations (e.g., augmentations 61b, 61c, 61d, 61f, 61g, 61i, 61j, 61k, 61n, 61p, 61r, 61s, 61u, or 61w) that have been included into the augmented view (e.g., augmented view 60b, 60c, 60d, 60f, 60g, 60i, 60j, 60k, 60n, 60p, 60r, 60s, 60u, or 60w) based, at least in part, on the activity-inferring data.

Turning now to FIG. 7B, which illustrates a block diagram of another AR device 70" that can implement the operations and processes to be described herein. As indicated earlier, the AR device 70" in FIG. 7B is merely the "soft" version of the AR device 70' of FIG. 7A because the various logic modules: the visual data obtaining module 102", the activity-inferring data acquisition determining module 104", the augmented view presenting module 106", the non-augmented view presenting module 107", and the notification transmitting module 108" are implemented using software and one or more processors 116 (e.g., one or more microprocessors or controllers) executing the software (e.g., computer readable instructions 152) rather than being implemented using purely hardware (e.g., ASIC) as was the case in the AR device 70' of FIG. 7A. Thus, the visual data obtaining module 102", the activity-inferring data acquisition determining module 104", the augmented view presenting module 106", the non-augmented view presenting module 107", and the notification transmitting module 108" of FIG. 7B may be designed to execute the same functions as the visual data obtaining module 102', the activity-inferring data acquisition determining module 104', the augmented view presenting module 106', the non-augmented view presenting module 107', and the notification transmitting module 108' of FIG. 7A. The AR device 70", as illustrated in FIG. 7B, has other components (e.g., user interface 110, network interface 112, and so forth) that are the same or similar to the other components included in the AR device 70' of FIG. 7A. Note that in the embodiment of the AR device 70* illustrated in FIG. 7B, the visual data obtaining module 102" and the activity-inferring data acquisition determining module 104" may be implemented by the one or more processors 116 (or other types of circuitry such as field programmable gate arrays or FPGAs) executing one or more computer readable instructions 152 stored in memory 114.

In various embodiments, the memory 114 of the AR device 70' of FIG. 7A and the AR device 70' of FIG. 7B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 8A:
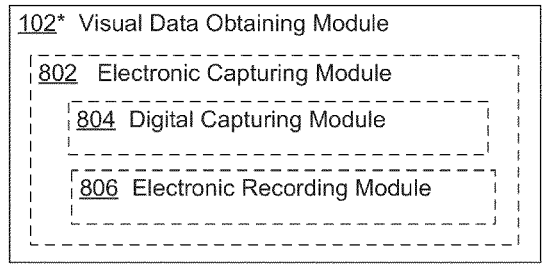
FIG. 8A shows another perspective of the visual data obtaining module 102* of FIGS. 7A and 7B (e.g., the visual data obtaining module 102' of FIG. 7A or the visual data obtaining module 102" of FIG. 7B) in accordance with various implementations.

Turning now to FIG. 8A illustrating a particular implementation of the visual data obtaining module 102* (e.g., the visual data obtaining module 102' or the visual data obtaining module 102") of FIGS. 7A and 7B. As illustrated, the visual data obtaining module 102* may include one or more sub-logic modules in various alternative implementations. For example, in various embodiments, the visual data obtaining module 102* may include an electronic capturing module 802, which may further include a digital capturing module 804 and/or an electronic recording module 806. Specific details related to the visual data obtaining module 102* as well as the above-described sub-modules of the visual data obtaining module 102* will be provided below with respect to the operations and processes to be described herein.

Figure 8B:
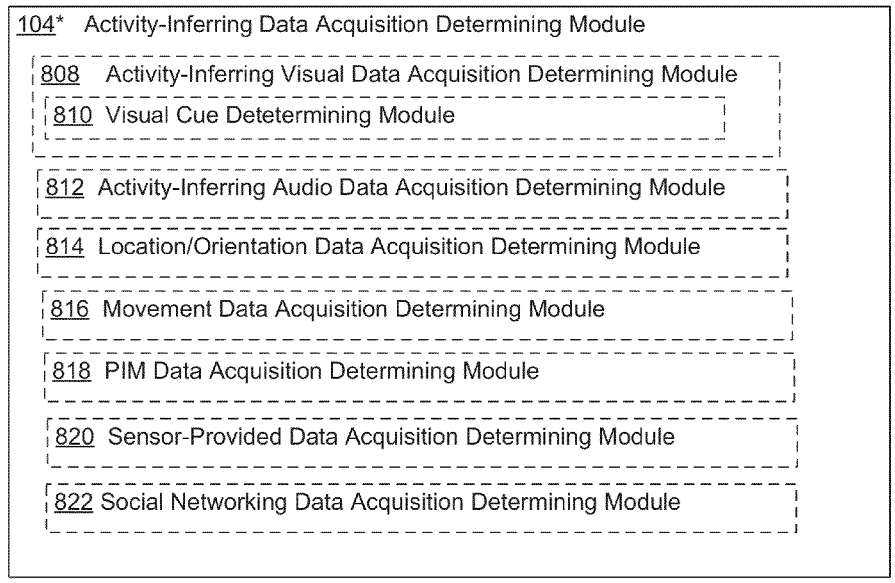
FIG. 8B shows the activity-inferring data acquisition determining module 104* of FIGS. 7A and 7B (e.g., the activity-inferring data acquisition determining module 104' of FIG. 7A or the activity-inferring data acquisition determining module 104" of FIG. 7B) in accordance with various implementations.

FIG. 8B illustrates a particular implementation of the activity-inferring data acquisition determining module 104* (e.g., the particular implementation of the activity-inferring data acquisition determining module 104' or the particular implementation of the activity-inferring data acquisition determining module 104") of FIG. 7A or 7B. As illustrated, the activity-inferring data acquisition determining module 104* may include one or more sub-logic modules in various alternative embodiments. For example, in various embodiments, the activity-inferring data acquisition determining module 104* may include an activity-inferring visual data acquisition determining module 808 (which may further include a visual cue determining module 810), an activity-inferring audio data acquisition determining module 812, a location/orientation data acquisition determining module 814, a movement data acquisition determining module 816, a personal information manager (PIM) data acquisition determining module 818, a sensor-provided data acquisition determining module 820, and/or a social networking data acquisition determining module 822. Specific details related to the activity-inferring data acquisition determining module 104* as well as the above-described sub-modules of the activity-inferring data acquisition determining module 104* will be provided below with respect to the operations and processes to be described herein.

Figure 8C:
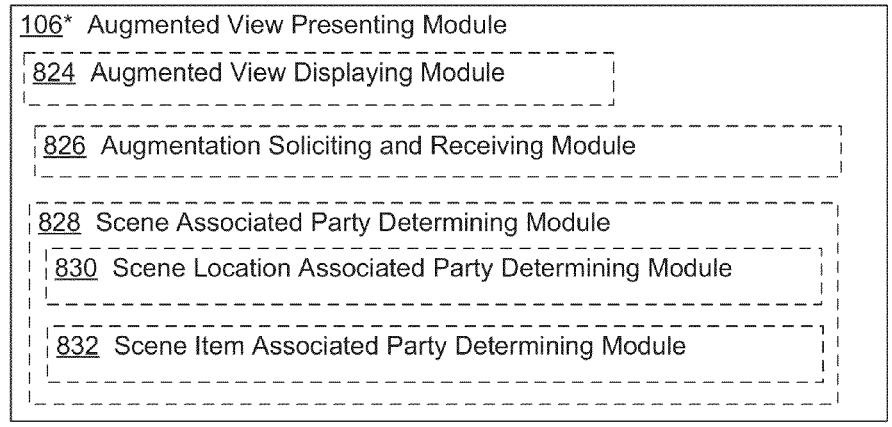
FIG. 8C shows the augmented view presenting module 106* of FIGS. 7A and 7B (e.g., the augmented view presenting module 106' of FIG. 7A or the augmented view presenting module 106" of FIG. 7B) in accordance with various implementations.

Referring now to FIG. 8C illustrating a particular implementation of the augmented view presenting module 106* (e.g., the augmented view presenting module 106' or the augmented view presenting module 106") of FIG. 7A or 7B. As illustrated, the augmented view presenting module 106* may include one or more sub-logic modules in various alternative embodiments. For example, in various embodiments, the augmented view presenting module 106* may include an augmented view displaying module 824, an augmentation soliciting and receiving module 826, and/or a scene associated party determining module 826 (which may further include a scene location associated party determining module 830 and/or a scene item associated party determining module 832). Specific details related to the augmented view presenting module 106* as well as the above-described sub-modules of the augmented view presenting module 106* will be provided below with respect to the operations and processes to be described herein.

Figure 8D:
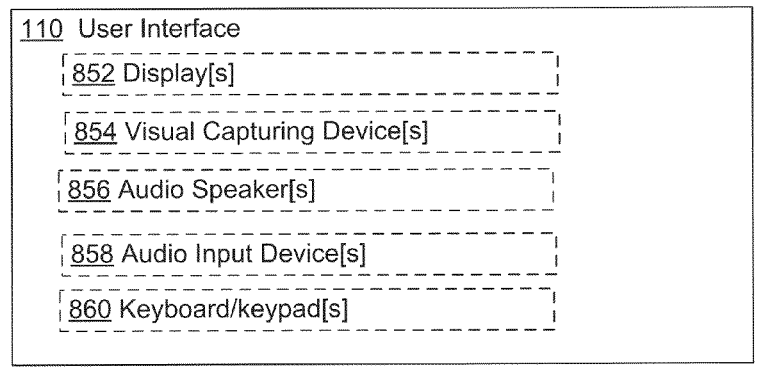
FIG. 8D shows another perspective of the user interface 110 of FIGS. 7A and 7B.

FIG. 8D illustrates the various types of user interface devices that may be part of the user interface 110 of the AR device 70* of FIG. 7A or 7B. In various embodiments, the user interface 110 may include one or more displays 852 (e.g., a touchscreen, a liquid crystal display (LCD), a see-through display, and/or other types of displays), one or more visual capturing devices 854 (e.g., one or more video or web cameras, digital cameras, and/or other types of cameras), one or more audio speakers 856, one or more audio input devices 858 (e.g., one or more microphones), and/or one or more keyboard/keypads 860. Although not depicted, other types of user interfaces may be included with the user interface 110 in various alternative embodiments including, for example, a mouse or other types of user input/output devices.

Figure 8E:
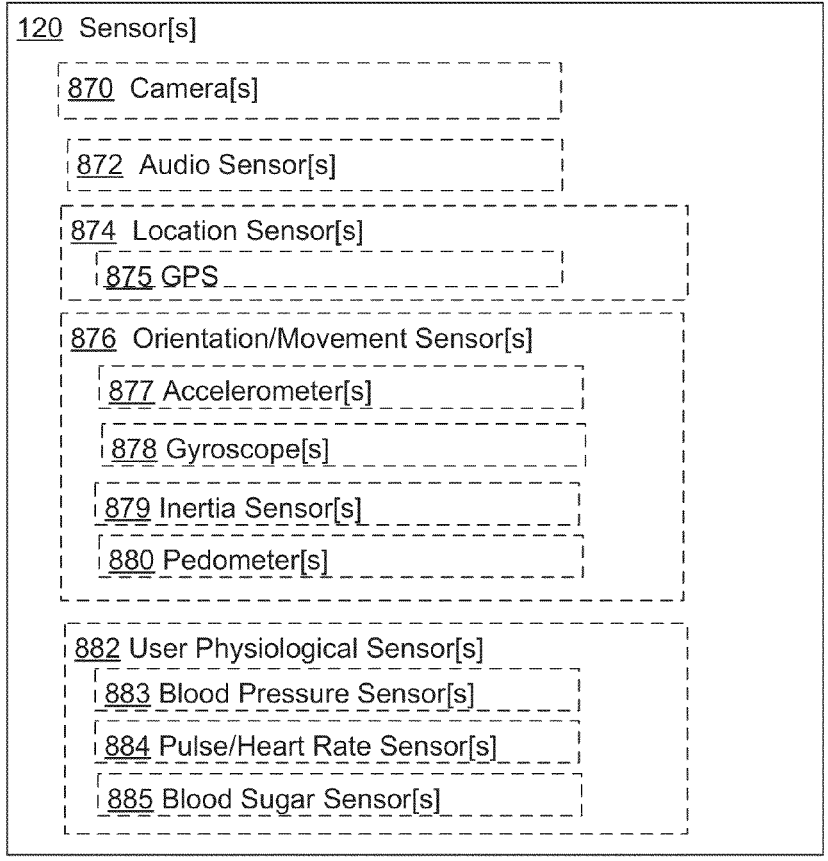
FIG. 8E shows another perspective of the one or more sensors 120 of FIGS. 7A and 7B.

FIG. 8E illustrates at least some of the various types of sensors 120 that may be included with the AR device 70* (e.g. the AR device 70' of FIG. 7A or the AR device 70" of FIG. 7B). As illustrated, the one or more sensors 120 that may be included with the AR device 70* may include one or more cameras 870 (note that the one or more cameras 870 may be the same as the one or more visual capturing devices 854 described above with respect to the user interface 110), one or more audio sensors 872 (see also audio input device[s] 858 described above), one or more location sensors 874 such as one or more global positioning systems (GPSs) 875, one or more orientation/movement sensors 876 (which may comprise one or more accelerometers 877, one or more gyroscopes 878, one or more inertia sensors 879, one or more pedometers 880), and/or one or more user physiological sensors 882 (e.g., one or more blood pressure sensors 883, one or more pulse/heart rate sensors 884, one or more blood sugar sensors 885). Note that with respect to the one or more location sensors 874, the one or more orientation/movement sensors 876, and/or one or more user physiological sensors 882, these sensor devices may include other types of sensors not depicted in FIG. 8C. For example the one or more location sensors 874 in some alternative implementations may include a location sensor that employs triangulation techniques and signals from cellular towers to determine location while the one or more user physiological sensors 882 may include in some alternative embodiments one or more galvanic skin sensors and/or other types of sensors.

Figure 9:
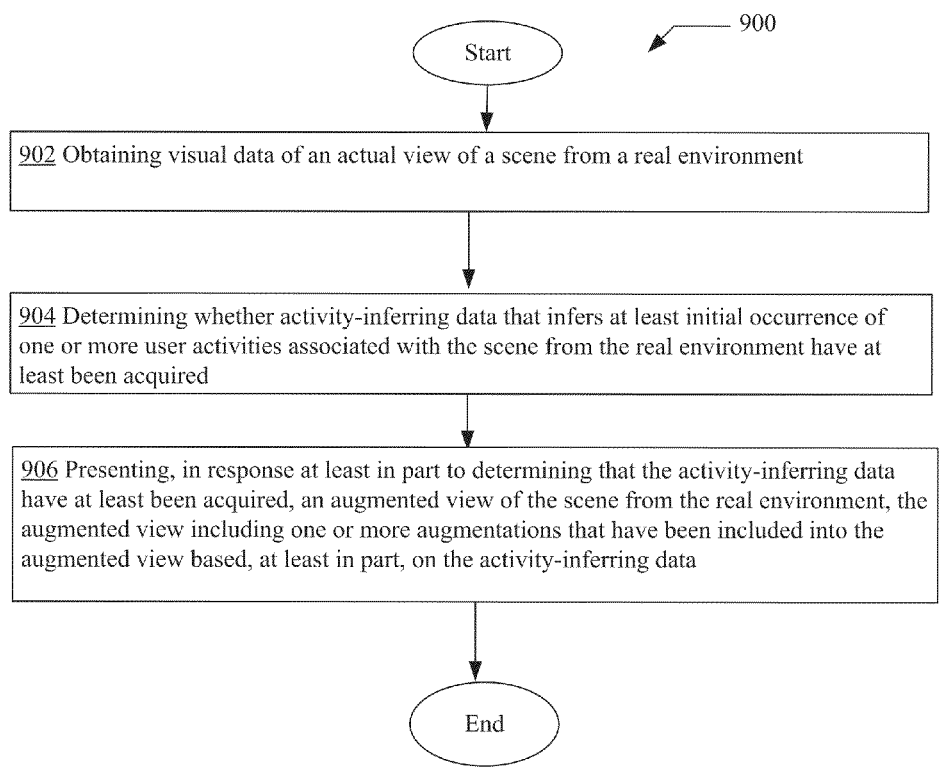
FIG. 9 is a high-level logic flowchart of a process, e.g., operational flow 900, according to some embodiments.

A more detailed discussion related to the AR device 70* (e.g., the AR device 70' of FIG. 7A or the AR device 70" of FIG. 7B) discussed above will now be provided with respect to the processes and operations to be described herein. FIG. 9 illustrates an operational flow 900 representing example operations for, among other things, presenting, in response at least in part to determining that activity-inferring data having been acquired that when processed infers one or more user activities associated with a scene from a real environment, an augmented view of the scene from the real environment that include one or more augmentations that have been included into the augmented view based, at least in part, on the activity-inferring data.

In FIG. 9 and in the following figures that include various examples of operational flows, discussions and explanations will be provided with respect to the AR device 70* described above and as illustrated in FIGS. 1A, 1B, 2A, 2B, 3A, 3B, 4A, 4B, 7A, 7B, 8A, 8B, 8C, 8D, and 8E, and/or with respect to other examples (e.g., as provided in FIGS. 5A, 5B, 5C, 6A, 6B, 6C, 6D, 6E, 6F, 6G, 6H, 6I, 6J, 6K, 6M, 6N, 6P, 6Q, 6R, 6S, 6T, 6U, 6V, and 6W) and contexts. However, it should be understood that the operational flows may be executed in a number of other environments and contexts, and/or in modified versions of FIGS. 1A, 1B, 2A, 2B, 3A, 3B, 4A, 4B, 5A, 5B, 5C, 6A, 6B, 6C, 6D, 6E, 6F, 6G, 6H, 6I, 6J, 6K, 6M, 6N, 6P, 6Q, 6R, 6S, 6T, 6U, 6V, and 6W, 7A, 7B, 8A, 8B, 8C, 8D, and 8E. Also, although the various operational flows are presented in the sequence(s) illustrated, it should be understood that the various operations may be performed in other orders other than those which are illustrated, or may be performed concurrently.

Further, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 9 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

More particularly, in FIG. 9 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated FIG. 9 as well as the other operations to be described herein may be performed by at least one of a machine, an article of manufacture, or a composition of matter.

In any event, after a start operation, the operational flow 900 of FIG. 9 may move to a visual data obtaining operation 902 for obtaining visual data of an actual view of a scene from a real environment. For instance, and as illustration, the visual data obtaining module 102* of FIG. 7A or 7B (e.g., the visual data obtaining module 102' of FIG. 7A or the visual data obtaining module 102" of FIG. 7B) obtaining visual data (e.g., electronic digital data or optical data) of an actual view 51 of a scene 50a or 50b (see FIG. 5A) from a real environment (e.g., the actual physical environment as opposed to a virtual world or environment).

As further illustrated in FIG. 9, operational flow 900 may also include an activity-inferring data acquisition determining operation 904 for determining whether activity-inferring data that infers at least initial occurrence of one or more user activities associated with the scene from the real environment have at least been acquired. For instance, the activity-inferring data acquisition determining module 104* (e.g., the activity-inferring data acquisition determining 104' of FIG. 7A or the activity-inferring data acquisition determining 104" of FIG. 7B) of the AR device 70* determining whether activity-inferring data that infers at least initial occurrence of one or more user activities (e.g., driving a car, shopping, exercising, and so forth) associated with the scene from the real environment have at least been acquired (e.g., determining whether data such as sensor or third party provided data that when processed infers at least the initial start of one or more user activities has been obtained).

In addition to the visual data obtaining operation 902 and the activity-inferring data acquisition determining operation 904, operational flow 900 may also include an augmented view presenting operation 906 for presenting, in response at least in part to determining that the activity-inferring data have at least been acquired, an augmented view of the scene from the real environment, the augmented view including one or more augmentations that have been included into the augmented view based, at least in part, on the activity-inferring data. For instance, the augmented view presenting module 106* of FIG. 7A or 7B presenting (e.g., displaying through a display monitor such as a touchscreen), in response at least in part to determining that the activity-inferring data have at least been acquired, an augmented view (e.g., the augmented view 60c, 60d, 60f, 60g, 60i, 60j, 60k, 60n, 60p, 60r, 60s, 60u, or 60w of FIG. 6C, 6D, 6F, 6G, 6I, 6J, 6K, 6N, 6P, 6R, 6S, 6U, or 6W) of the scene from the real environment, the augmented view including one or more augmentations (e.g., augmentation 61c, 61d, 61f, 61g, 61i, 61j, 61k, 61n, 61p, 61r, 61s, 61u, or 61w of FIG. 6C, 6D, 6F, 6G, 6I, 6J, 6K, 6N, 6P, 6R, 6S, 6U, or 6W) that have been included into the augmented view based, at least in part, on the activity-inferring data (which may have been part of, for example, the visual data obtained through the visual data obtaining operation 902).

Figure 10:
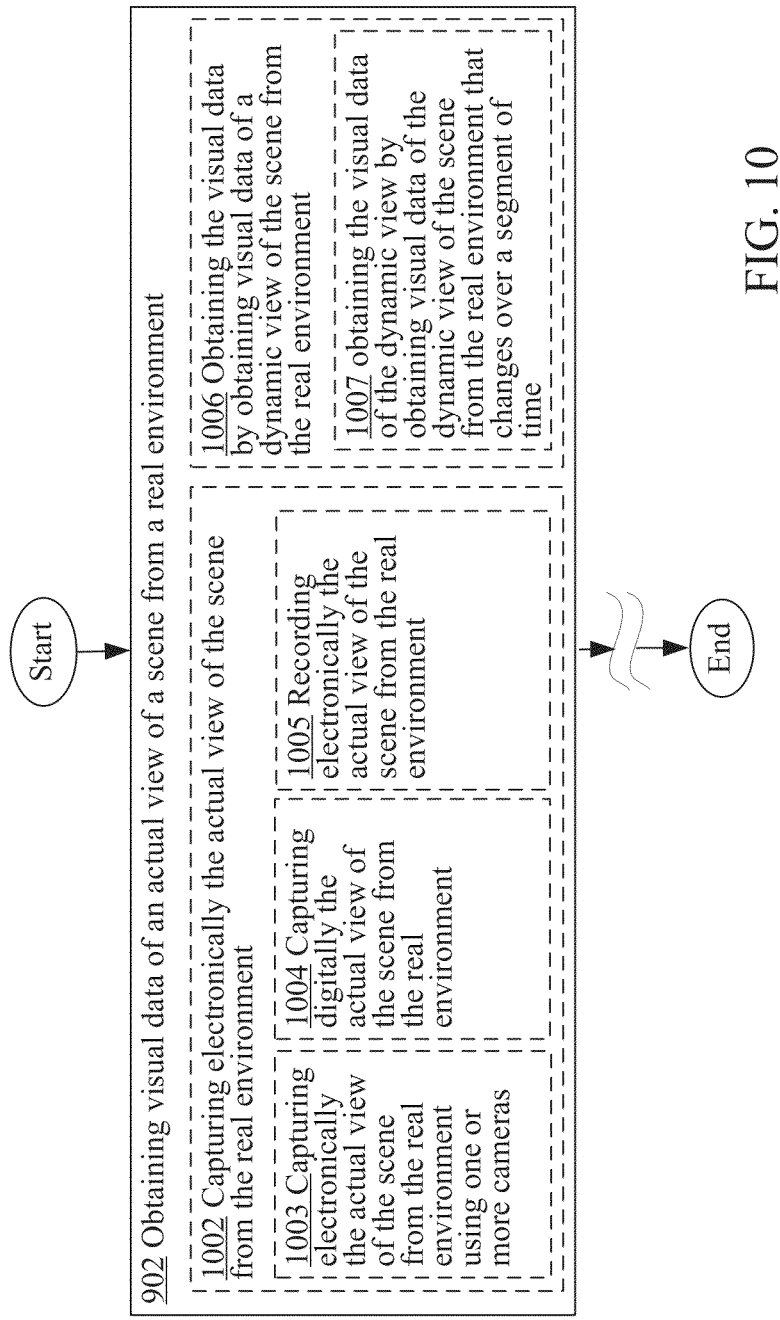
FIG. 10 is a high-level logic flowchart of a process depicting alternate implementations of the visual data obtaining operation 902 of FIG. 9.

As will be described below, the visual data obtaining operation 902, the activity-inferring data acquisition determining operation 904, and the augmented view presenting operation 906 of FIG. 9 may be executed in a variety of different ways in various alternative implementations. FIG. 10, for example, illustrates at least some of the alternative ways that the visual data obtaining operation 902 of FIG. 9 may be executed in various alternative implementations. For example, the visual data obtained through the visual data obtaining operation 902 of FIG. 9 may be obtained in a variety of different ways in various alternative implementations. In some cases, for example, the visual data obtaining operation 902 may include an operation 1002 for capturing electronically the actual view of the scene from the real environment as illustrated in FIG. 10. For instance, the electronic capturing module 802 (see FIG. 8A) of the AR device 70* (e.g., the AR device 70' of FIG. 7A or the AR device 70" of FIG. 7B) capturing electronically (e.g., using, for example, a web cam, a video camera, and/or a digital electronic camera) the actual view of the scene from the real environment.

As further illustrated in FIG. 10, operation 1002 may additionally include one or more operations including an operation 1003 for capturing electronically the actual view of the scene from the real environment using one or more cameras.

For instance, the electronic capturing module 802 capturing electronically (e.g., capturing in digital or analog form) the actual view of the scene from the real environment using one or more cameras 870. In some cases, the one or more cameras 870 that may be employed in order to electronically capture the view of the scene from the real environment may be one or more digital cameras, one or more webcams, one or more high resolution cameras, one or more high definition (HD cameras (e.g., video cameras that can take video images of more than 480 horizontal lines), and/or one or more other types of electronic cameras.

In the same or alternative implementations, operation 1002 may additionally or alternatively include an operation 1004 for capturing digitally the actual view of the scene from the real environment. For instance, the digital capturing module 804 capturing digitally (e.g., sensing, detecting, imaging, and/or recording digitally) the actual view (e.g., the actual view of the scene from the real environment 60a, 60e, 60m, or 60q, of FIG. 6A, 6E, 6M, or 6Q).

In the same or different implementations, operation 1002 may additionally or alternatively include an operation 1005 for recording electronically the actual view of the scene from the real environment. For instance, the electronic recording module 806 (see FIG. 8A) of the AR device 70* (e.g., the AR device 70' of FIG. 7A or the AR device 70" of FIG. 7B) recording electronically (e.g., recording to volatile or non-volatile memory and/or to registry) the actual view of the scene from the real environment.

In various implementations, the visual data obtaining operation 902 may additionally or alternatively include an operation 1006 for obtaining the visual data by obtaining visual data of a dynamic view of the scene from the real environment. For instance, the visual data obtaining module 102* of FIG. 7A or 7B obtaining the visual data by obtaining visual data of a dynamic view (e.g., a view that changes over time such as the actual view 51 of FIG. 5A) of the scene from the real environment.

In some cases, operation 1006 may further involve an operation 1007 for obtaining the visual data of the dynamic view by obtaining visual data of the dynamic view of the scene from the real environment that changes over a segment of time as further depicted in FIG. 10A. For instance, the visual data obtaining module 102* of FIG. 7A or 7B obtaining the visual data of the dynamic view by obtaining visual data of the dynamic view of the scene from the real environment that changes (e.g., evolves) over a segment of time (e.g., video images of a view that changes over time rather than a static digital image of a static view).

Figure 11A:
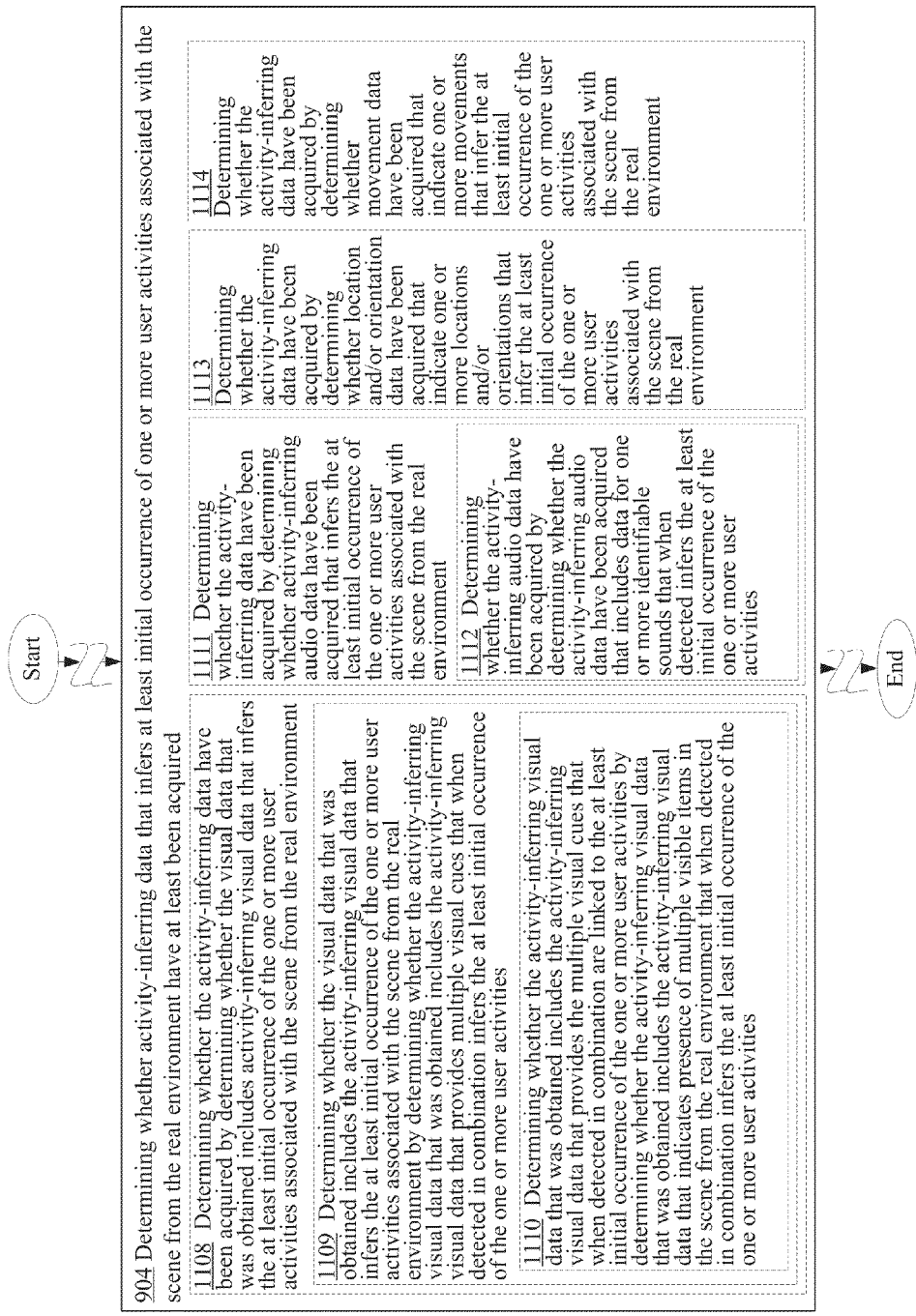
FIG. 11A is a high-level logic flowchart of a process depicting alternate implementations of the activity-inferring data acquisition determining operation 904 of FIG. 9.

Referring back to the activity-inferring data acquisition determining operation 904, the activity-inferring data acquisition determining operation 904 similar to the visual data obtaining operation 902 of FIG. 9 may be executed in a number of different ways in various alternative implementations as illustrated in FIGS. 11A, 11B, 11C, and 11D. For example, in some implementations, the activity-inferring data acquisition determining operation 904 may include an operation 1108 for determining whether the activity-inferring data have been acquired by determining whether the visual data that was obtained includes activity-inferring visual data that infers the at least initial occurrence of the one or more user activities associated with the scene from the real environment as illustrated in FIG. 11A. For instance, the activity-inferring data acquisition determining module 104* including the activity-inferring visual data acquisition determining module 808 (see FIG. 8B) of the AR device 70* determining whether the activity-inferring data have been acquired when the activity-inferring visual data acquisition determining module 808 determines whether the visual data that was obtained include activity-inferring visual data that when detected or processed infers the at least initial occurrence of the one or more user activities associated with the scene from the real environment.

As further illustrated in FIG. 11A, in some implementations operation 1108 may involve one or more operations including an operation 1109 for determining whether the visual data that was obtained includes the activity-inferring visual data that infers the at least initial occurrence of the one or more user activities associated with the scene from the real environment by determining whether the activity-inferring visual data that was obtained includes the activity-inferring visual data that provides multiple visual cues that when detected in combination infers the at least initial occurrence of the one or more user activities. For instance, the activity-inferring visual data acquisition determining module 808 including the visual cue determining module 810 (see FIG. 8B) of the AR device 70* determining whether the visual data that was obtained include the activity-inferring visual data that infers the at least initial occurrence of the one or more user activities associated with the scene from the real environment when the visual cue detecting module 810 determines whether the activity-inferring visual data that was obtained includes the activity-inferring visual data (e.g., visual data that indicates the presence in the scene from the real environment of certain items such as a desk, a desk photo frame, a computer monitor, a keyboard, a telephone, natural landscape items such as the ocean or beach, mountains, buildings, transportation interior items, household items, and so forth, bare stomach or legs, movements of items in the scene from the real environment that may suggest that the user is moving in a particular way, and so forth) that provides multiple visual cues that when detected in combination infers (suggests) the at least initial occurrence of the one or more user activities (e.g., working at an office, riding a bicycle, driving an automobile, sitting back at home, and so forth).

In some implementations, operation 1109 may further include an operation 1110 for determining whether the activity-inferring visual data that was obtained includes the activity-inferring visual data that provides the multiple visual cues that when detected in combination are linked to the at least initial occurrence of the one or more user activities by determining whether the activity-inferring visual data that was obtained includes the activity-inferring visual data that indicates presence of multiple visible items in the scene from the real environment that when detected in combination infers the at least initial occurrence of the one or more user activities. For instance, the activity-inferring visual data acquisition determining module 808 including the visual cue detecting module 810 of the AR device 70* determining whether the activity-inferring visual data that was obtained include the activity-inferring visual data that provides the multiple visual cues (e.g., steering wheel, speedometer, and so forth) that when detected in combination are linked to the at least initial occurrence of the one or more user activities when the visual cue detecting module 810 determines whether the activity-inferring visual data that was obtained includes the activity-inferring visual data that indicates presence of multiple visible items (e.g., steering wheel, speedometer, rear-view mirror, and so forth) in the scene from the real environment that when detected in combination infers the at least initial occurrence of the one or more user activities (e.g., driving or operating an automobile).

In the same or alternative implementations, the activity-inferring data acquisition determining operation 904 may additionally or alternatively include an operation 1111 for determining whether the activity-inferring data have been acquired by determining whether activity-inferring audio data have been acquired that infers the at least initial occurrence of the one or more user activities associated with the scene from the real environment as further illustrated in FIG. 10B. For instance, the activity-inferring data acquisition determining module 104* including the activity-inferring audio data acquisition determining module 812 (see FIG. 8B) of the AR device 70* determining whether the activity-inferring data have been acquired when the activity-inferring audio data acquisition determining module 812 determines whether activity-inferring audio data (e.g., audio data of waves crashing) have been acquired (e.g., via one or more audio sensors 872 such as one or more microphones) that infers (suggests) the at least initial occurrence of the one or more user activities (e.g., sun bathing or swimming in the ocean) associated with the scene (e.g., beach) from the real environment.

in some cases, operation 1111 may actually involve an operation 1112 for determining whether the activity-inferring audio data have been acquired by determining whether the activity-inferring audio data have been acquired that includes data for one or more identifiable sounds that when detected infers the at least initial occurrence of the one or more user activities. For instance, the activity-inferring audio data acquisition determining module 812 of the AR device 70* determining whether the activity-inferring audio data have been acquired by determining whether the activity-inferring audio data have been acquired that includes data for one or more identifiable sounds (e.g., a voice generated by a store intercom system indicating the name of a particular retail store such as a voice that says "Wal-Mart shoppers") that when detected infers (suggests) the at least initial occurrence of the one or more user activities (e.g., shopping).

In the same or alternative implementations, the activity-inferring data acquisition determining operation 904 may additionally or alternatively include an operation 1113 for determining whether the activity-inferring data have been acquired by determining whether location and/or orientation data have been acquired that indicate one or more locations and/or orientations that infer the at least initial occurrence of the one or more user activities associated with the scene from the real environment. For instance, the activity-inferring data acquisition determining module 104* including the location/orientation data acquisition determining module 814 (see FIG. 8B) of the AR device 70* determining whether the activity-inferring data have been acquired when the location/orientation data acquisition determining module 814 determines whether location and/or orientation data have been acquired that indicate one or more locations and/or orientations (e.g., national park) that when processed infer the at least initial occurrence of the one or more user activities (e.g., hiking) associated with the scene (e.g., hiking trail in a forest) from the real environment.

In the same or alternative implementations, the activity-inferring data acquisition determining operation 904 may additionally or alternatively include an operation 1114 for determining whether the activity-inferring data have been acquired by determining whether movement data have been acquired that indicate one or more movements that infer the at least initial occurrence of the one or more user activities associated with the scene from the real environment. For instance, the activity-inferring data acquisition determining module 104* including the movement data acquisition determining module 816 (see FIG. 8B) of the AR device 70* determining whether the activity-inferring data have been acquired when the movement data acquisition determining module 816 determines whether movement data (e.g., movement data as obtained through an accelerometer) have been acquired that indicate one or more movements (e.g., up and down type movements) that infer the at least initial occurrence of the one or more user activities (e.g., jogging) associated with the scene from the real environment.

Figure 11B:
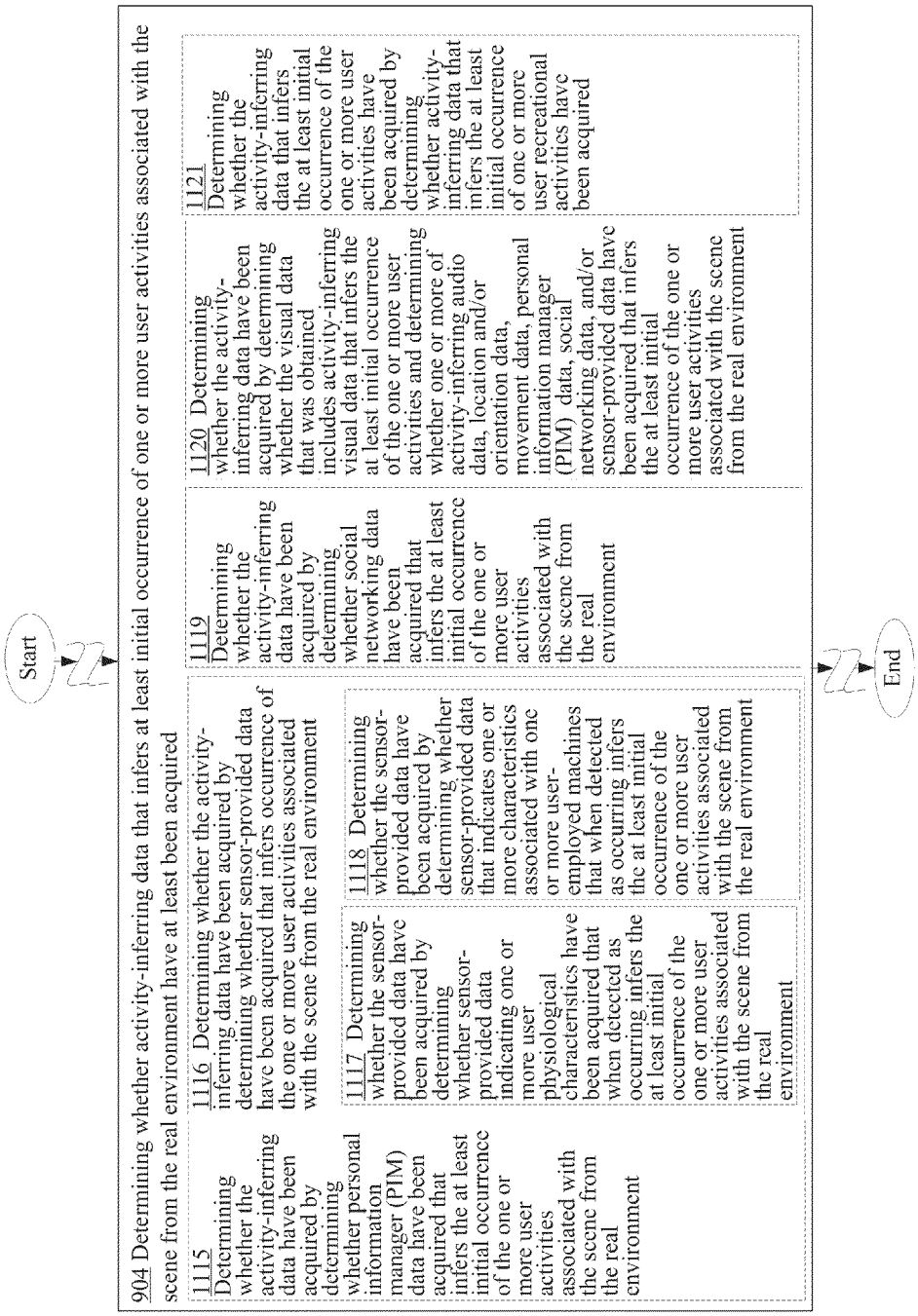
FIG. 11B is a high-level logic flowchart of a process depicting alternate implementations of the activity-inferring data acquisition determining operation 904 of FIG. 9.

Turning now to FIG. 11B, in the same or different implementations, the activity-inferring data acquisition determining operation 904 may additionally or alternatively include an operation 1115 for determining whether the activity-inferring data have been acquired by determining whether personal information manager (PIM) data have been acquired that infers the at least initial occurrence of the one or more user activities associated with the scene from the real environment. For instance, the activity-inferring data acquisition determining module 104* including the personal information manager (PIM) data acquisition determining module 818 (see FIG. 8B) of the AR device 70* determining whether the activity-inferring data have been acquired when the PIM data acquisition determining module 818 determines whether PIM data (e.g., data provided by a personal organizer application such as Microsoft Outlook that indicate user calendar/appointments) have been acquired that infers the at least initial occurrence of the one or more user activities (e.g., business meeting) associated with the scene (e.g., conference room) from the real environment.

In the same or different implementations, the activity-inferring data acquisition determining operation 904 may additionally or alternatively include an operation 1116 for determining whether the activity-inferring data have been acquired by determining whether sensor-provided data have been acquired that infers occurrence of the one or more user activities associated with the scene from the real environment. For instance, the activity-inferring data acquisition determining module 104* including the sensor-provided data acquisition determining module 820 (see FIG. 8B) of the AR device 70* determining whether the activity-inferring data have been acquired when the sensor-provided data acquisition determining module 820 determines whether sensor-provided data (e.g., galvanic skin sensor data or automobile speedometer) have been acquired that infers occurrence of the one or more user activities (e.g., jogging or driving an automobile) associated with the scene from the real environment.

As further illustrated in FIG. 11B, operation 1116 may actually involve or include one or more additional operations including an operation 1117 for determining whether the sensor-provided data have been acquired by determining whether sensor-provided data indicating one or more user physiological characteristics have been acquired that when detected as occurring infers the at least initial occurrence of the one or more user activities associated with the scene from the real environment. For instance, including the sensor-provided data acquisition determining module 820 of the AR device 70* determining whether the sensor-provided data have been acquired by determining whether sensor-provided data (e.g., data provided by a blood pressure sensor, galvanic skin sensor, blood glucose meter, heart monitor, and so forth) indicating one or more user physiological characteristics have been acquired that when detected as occurring infers the at least initial occurrence of the one or more user activities (e.g., rigorous exercise activity such as beach volleyball) associated with the scene (e.g., beach) from the real environment.

In the same or alternative implementations, operation 1116 may additionally or alternatively include an operation 1118 for determining whether the sensor-provided data have been acquired by determining whether sensor-provided data that indicates one or more characteristics associated with one or more user-employed machines that when detected as occurring infers the at least initial occurrence of the one or more user activities associated with the scene from the real environment. For instance, the sensor-provided data acquisition determining module 820 of the AR device 70* determining whether the sensor-provided data have been acquired by determining whether sensor-provided data that indicate one or more characteristics (e.g., velocity or acceleration) associated with one or more user-employed machines (e.g., a car, a boat, an exercise machine, etc. that indicates usage) that when detected as occurring infers the at least initial occurrence of the one or more user activities (e.g., user operating a vehicle) associated with the scene (e.g., interior compartment of an automobile including gauges and steering wheel) from the real environment.

In the same or different implementations, the activity-inferring data acquisition determining operation 904 may additionally or alternatively include an operation 1119 for determining whether the activity-inferring data have been acquired by determining whether social networking data have been acquired that infers the at least initial occurrence of the one or more user activities associated with the scene from the real environment. For instance, the activity-inferring data acquisition determining module 104* including the social networking data acquisition determining module 822 (see FIG. 8B) of the AR device 70* determining whether the activity-inferring data have been acquired when the social networking data acquisition determining module 822 determines whether social networking data (e.g., data as provided via microblogs or status reports) have been acquired that infers the at least initial occurrence of the one or more user activities (e.g., dinner engagement with a friend at a particular restaurant) associated with the scene from the real environment.

In the same or alternative implementations, the activity-inferring data acquisition determining operation 904 may additionally or alternatively include an operation 1120 for determining whether the activity-inferring data have been acquired by determining whether the visual data that was obtained includes activity-inferring visual data that infers the at least initial occurrence of the one or more user activities and determining whether one or more of activity-inferring audio data, location and/or orientation data, movement data, personal information manager (PIM) data, social networking data, and/or sensor-provided data have been acquired that infers the at least initial occurrence of the one or more user activities associated with the scene from the real environment. For instance, the activity-inferring data acquisition determining module 104* including the activity-inferring visual data acquisition determining module 808, the activity-inferring audio data acquisition determining module 812, the location/orientation data acquisition determining module 814, the movement data acquisition determining module 816, the PIM data acquisition determining module 818, the sensor-provided data acquisition determining module 820, and/or the social networking data acquisition determining module 822 of the AR device 70* determining whether the activity-inferring data have been acquired when the activity-inferring visual data acquisition determining module 808 determines whether the visual data that was obtained include activity-inferring visual data that infers the at least initial occurrence of the one or more user activities and when the activity-inferring audio data acquisition determining module 812 determines whether one or more of activity-inferring audio data that infers the at least initial occurrence of the one or more user activities have been acquired, when the location/orientation data acquisition determining module 814 determines that location and/or orientation data that infers the at least initial occurrence of the one or more user activities have been acquired, when the movement data acquisition determining module 816 determines that movement data that infers the at least initial occurrence of the one or more user activities have been acquired, when the PIM data acquisition determining module 818 determines that personal information manager (PIM) data that infers the at least initial occurrence of the one or more user activities have been acquired, when the social networking data acquisition determining module 822 determines that social networking data that infers the at least initial occurrence of the one or more user activities have been acquired, and/or when the sensor-provided data acquisition determining module 820 determines that sensor-provided data that infers the at least initial occurrence of the one or more user activities have been acquired.

Various types of user activities may be inferred by the activity-inferring data that is determined to have been acquired through the activity-inferring data acquisition determining operation 904. In the same or alternative implementations, the activity-inferring data acquisition determining operation 904 may additionally or alternatively include an operation 1121 for determining whether the activity-inferring data that infers the at least initial occurrence of the one or more user activities have been acquired by determining whether activity-inferring data that infers at least initial occurrence of one or more user recreational activities have been acquired. For instance, the activity-inferring data acquisition determining module 104\* of FIG. 7A or 7B determining whether the activity-inferring data that infers the at least initial occurrence of the one or more user activities have been acquired by determining whether activity-inferring data that infers at least initial occurrence of one or more user recreational activities (e g, hiking, golfing, watching a movie in a theater or at home, sunbathing, and so forth) have been acquired from, for example, a GPS device providing locational data and/or from an accelerometer device providing movement data.

Figure 11C:
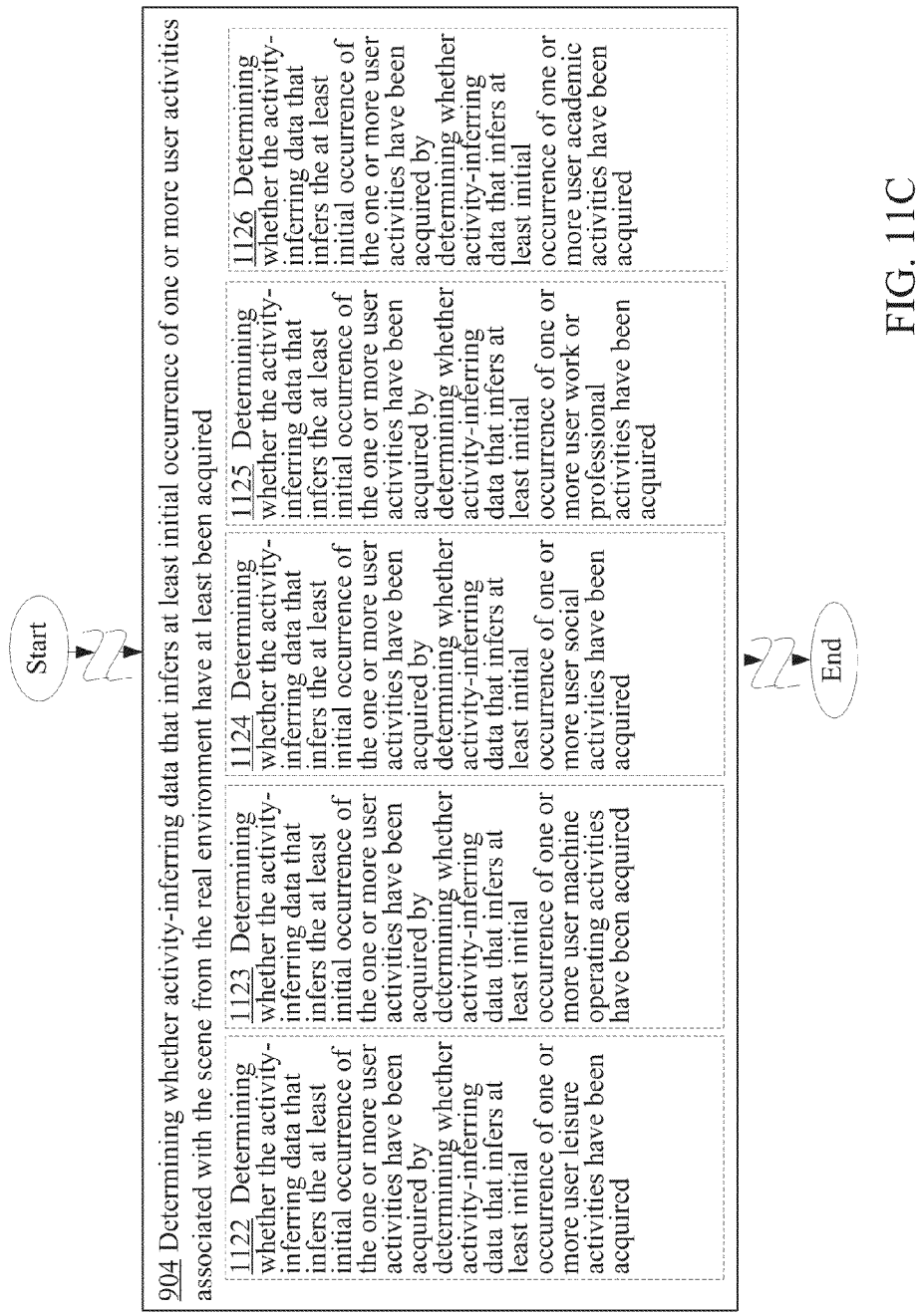
FIG. 11C is a high-level logic flowchart of a process depicting alternate implementations of the activity-inferring data acquisition determining operation 904 of FIG. 9.

Referring now to FIG. 11C, in some cases, the activity-inferring data acquisition determining operation 904 of FIG. 9 may involve an operation 1122 for determining whether the activity-inferring data that infers the at least initial occurrence of the one or more user activities have been acquired by determining whether activity-inferring data that infers at least initial occurrence of one or more user leisure activities have been acquired. For instance, the activity-inferring data acquisition determining module 104\* of FIG. 7A or 7B determining whether the activity-inferring data that infers the at least initial occurrence of the one or more user activities have been acquired by determining whether activity-inferring data that infers at least initial occurrence of one or more user leisure activities (e.g., a leisure stroll through a neighborhood, shopping, sailing or boating, dining out, watching TV or movie, etc.) have been acquired from, for example, microphone providing audio data and/or from a personal information manager (PIM) application (e.g., Microsoft Office) providing user calendar or scheduling information.

In the same or different implementations, the activity-inferring data acquisition determining operation 904 may additionally or alternatively include an operation 1123 for determining whether the activity-inferring data that infers the at least initial occurrence of the one or more user activities have been acquired by determining whether activity-inferring data that infers at least initial occurrence of one or more user machine operating activities have been acquired. For instance, the activity-inferring data acquisition determining module 104\* of FIG. 7A or 7B determining whether the activity-inferring data that infers the at least initial occurrence of the one or more user activities have been acquired by determining whether activity-inferring data that infers at least initial occurrence of one or more user machine operating activities (e.g., user driving or riding an automobile, piloting a plane or a boat, driving a snowmobile or a jet ski, and so forth) have been acquired from, for example, a machine-embedded sensor (e.g., a sensor integrated in an automobile) and/or a GPS providing locational or movement information.

In the same or different implementations, the activity-inferring data acquisition determining operation 904 may additionally or alternatively include an operation 1124 for determining whether the activity-inferring data that infers the at least initial occurrence of the one or more user activities have been acquired by determining whether activity-inferring data that infers at least initial occurrence of one or more user social activities have been acquired. For instance, the activity-inferring data acquisition determining module 104\* of FIG. 7A or 7B determining whether the activity-inferring data that infers the at least initial occurrence of the one or more user activities have been acquired by determining whether activity-inferring data that infers at least initial occurrence of one or more user social activities (e.g., attending a family fathering such as thanksgiving, a funeral, a wedding, and so forth) have been acquired by, for example, a social networking application (e.g., Twitter or Facebook) that provides user status information.

In the same or different implementations, the activity-inferring data acquisition determining operation 904 may additionally or alternatively include an operation 1125 for determining whether the activity-inferring data that infers the at least initial occurrence of the one or more user activities have been acquired by determining whether activity-inferring data that infers at least initial occurrence of one or more user work or professional activities have been acquired. For instance, the activity-inferring data acquisition determining module 104\* of FIG. 7A or 7B determining whether the activity-inferring data that infers the at least initial occurrence of the one or more user activities have been acquired by determining whether activity-inferring data that infers at least initial occurrence of one or more user work or professional activities (e.g., working in an office, attending a meeting or a conference, and so forth) have been acquired from, for example, a PIM application and/or from a camera providing one or more visual cues.

In the same or different implementations, the activity-inferring data acquisition determining operation 904 may additionally or alternatively include an operation 1126 for determining whether the activity-inferring data that infers the at least initial occurrence of the one or more user activities have been acquired by determining whether activity-inferring data that infers at least initial occurrence of one or more user academic activities have been acquired. For instance, the activity-inferring data acquisition determining module 104\* of FIG. 7A or 7B determining whether the activity-inferring data that infers the at least initial occurrence of the one or more user activities have been acquired by determining whether activity-inferring data that infers at least initial occurrence of one or more user academic activities (e.g., taking a test, sitting in a lecture or classroom, running an experiment in a lab, and so forth) have been acquired from, for example, a camera providing multiple visual indicators and/or from a PIM application providing user classroom schedule.

The activity-inferring data that may have been determined to have been acquired in the activity-inferring data acquisition determining operation 904 of FIG. 9 may have been provided from a variety of sources. For example, and turning now to FIG. 11D, in various implementations, the activity-inferring data acquisition determining operation 904 of FIG. 9 may in some cases include an operation 1127 for determining whether the activity-inferring data that infers the at least initial occurrence of the one or more user activities have been acquired by determining whether activity-inferring data provided from a combination of sources including one or more cameras and one or more other sources have been acquired. For instance, the activity-inferring data acquisition determining module 104* of FIG. 7A or 7B determining whether the activity-inferring data that infers the at least initial occurrence of the one or more user activities have been acquired by determining whether activity-inferring data provided from a combination of sources including one or more cameras 870 and one or more other sources (e.g., data provided by other sensors or by one or more third parties that may be associated with the scene from the real environment) have been acquired.

Figure 11D:
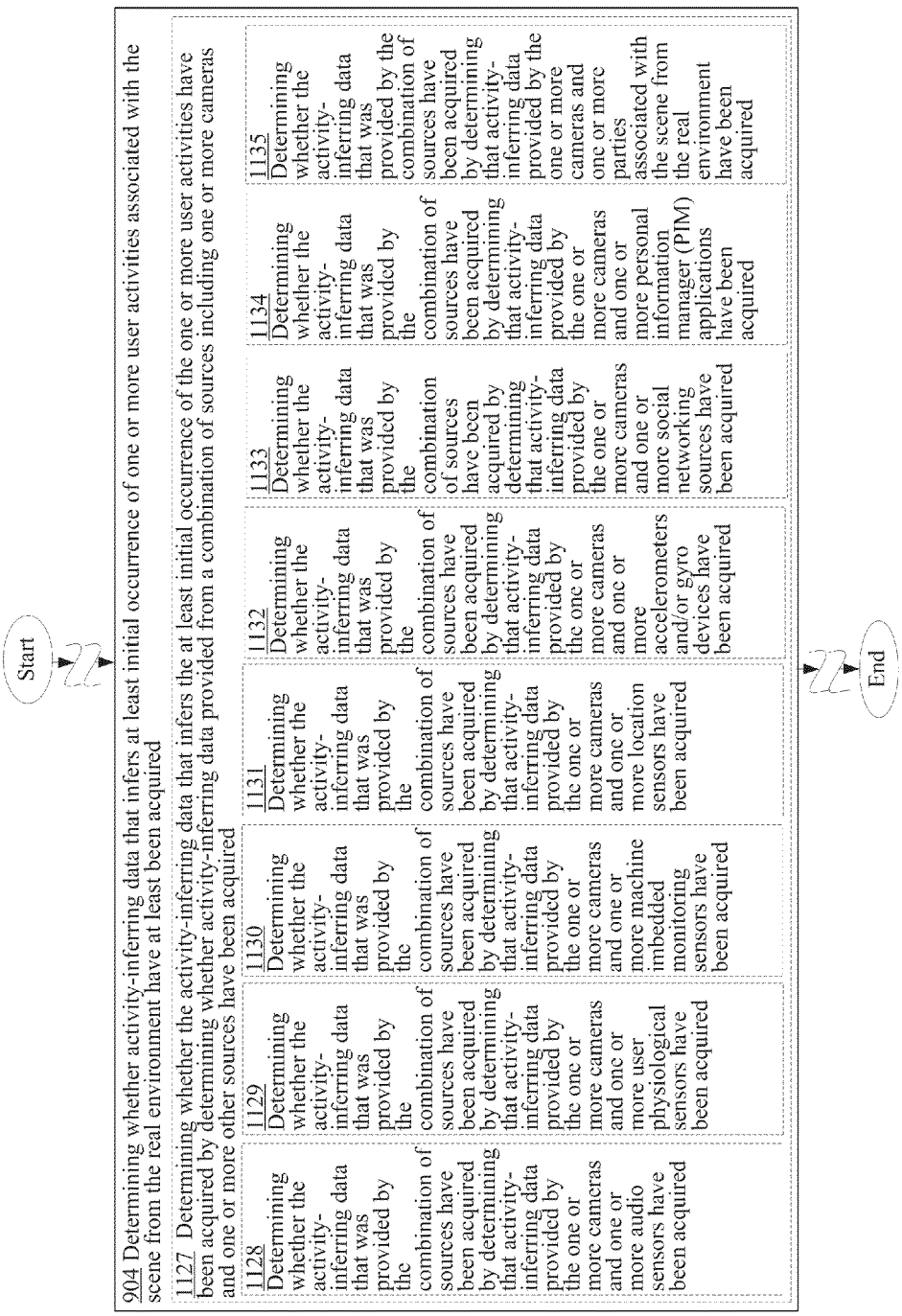
FIG. 11D is a high-level logic flowchart of a process depicting alternate implementations of the activity-inferring data acquisition determining operation 904 of FIG. 9.

As further illustrated in FIG. 11D, operation 1127 may actually involve, in some cases, an operation 1128 for determining whether the activity-inferring data that was provided by the combination of sources have been acquired by determining that activity-inferring data provided by the one or more cameras and one or more audio sensors have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more audio sensors 872 (e.g., microphones) have been acquired.

As further illustrated in FIG. 11D, in the same or different implementations, operation 1127 may additionally or alternatively include an operation 1129 for determining whether the activity-inferring data that was provided by the combination of sources have been acquired by determining that activity-inferring data provided by the one or more cameras and one or more user physiological sensors have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more user physiological sensors 882 (e.g., one or more of a blood pressure sensor 883, pulse/heart rate sensor 884, one or more blood sugar sensor 885, and/or other types of physiological sensors) have been acquired.

In the same or different implementations, operation 1127 may additionally or alternatively include an operation 1130 for determining whether the activity-inferring data that was provided by the combination of sources have been acquired by determining that activity-inferring data provided by the one or more cameras and one or more machine imbedded monitoring sensors have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more machine imbedded monitoring sensors (e.g. sensors integrated into an automobile or an exercise machine) have been acquired. In some cases, the one or more machine imbedded monitoring sensors may provide the activity-inferring data via, for example, a wireless network such as via a personal area network or PAN.

In the same or different implementations, operation 1127 may additionally or alternatively include an operation 1131 for determining whether the activity-inferring data that was provided by the combination of sources have been acquired by determining that activity-inferring data provided by the one or more cameras and one or more location sensors have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more location sensors 874 (e.g., GPS 875 and/or other types sensors for determining location) have been acquired.

In the same or different implementations, operation 1127 may additionally or alternatively include an operation 1132 for determining whether the activity-inferring data that was provided by the combination of sources have been acquired by determining that activity-inferring data provided by the one or more cameras and one or more accelerometers and/or gyro devices have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more accelerometers 877 and/or gyro devices 878 have been acquired.

In the same or different implementations, operation 1127 may additionally or alternatively include an operation 1133 for determining whether the activity-inferring data that was provided by the combination of sources have been acquired by determining that activity-inferring data provided by the one or more cameras and one or more social networking sources have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more social networking sources (e.g., data provided through a social networking application 163 such as Twitter and/or Facebook) have been acquired.

In the same or different implementations, operation 1127 may additionally or alternatively include an operation 1134 for determining whether the activity-inferring data that was provided by the combination of sources have been acquired by determining that activity-inferring data provided by the one or more cameras and one or more personal information manager (PIM) applications have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more personal information manager (PIM) applications 168 (e.g., Microsoft Outlook) have been acquired.

In the same or different implementations, operation 1127 may additionally or alternatively include an operation 1135 for determining whether the activity-inferring data that was provided by the combination of sources have been acquired by determining that activity-inferring data provided by the one or more cameras and one or more parties associated with the scene from the real environment have been acquired. For instance, the activity-inferring data acquisition determining module 104* of FIG. 7A or 7B determining whether the activity-inferring data that was provided by the combination of sources have been acquired by determining that activity-inferring data provided by the one or more cameras 870 and one or more parties associated with the scene from the real environment have been acquired. For example, if the scene from the real environment is a mall or a retail store, than a retail business that is associated with the store or mall may provide the activity-inferring data which may indicate a shopping activity and/or an augmentation such as a calculator augmentation that may be included into an augmented view of the scene from the real environment.

Figure 12A:
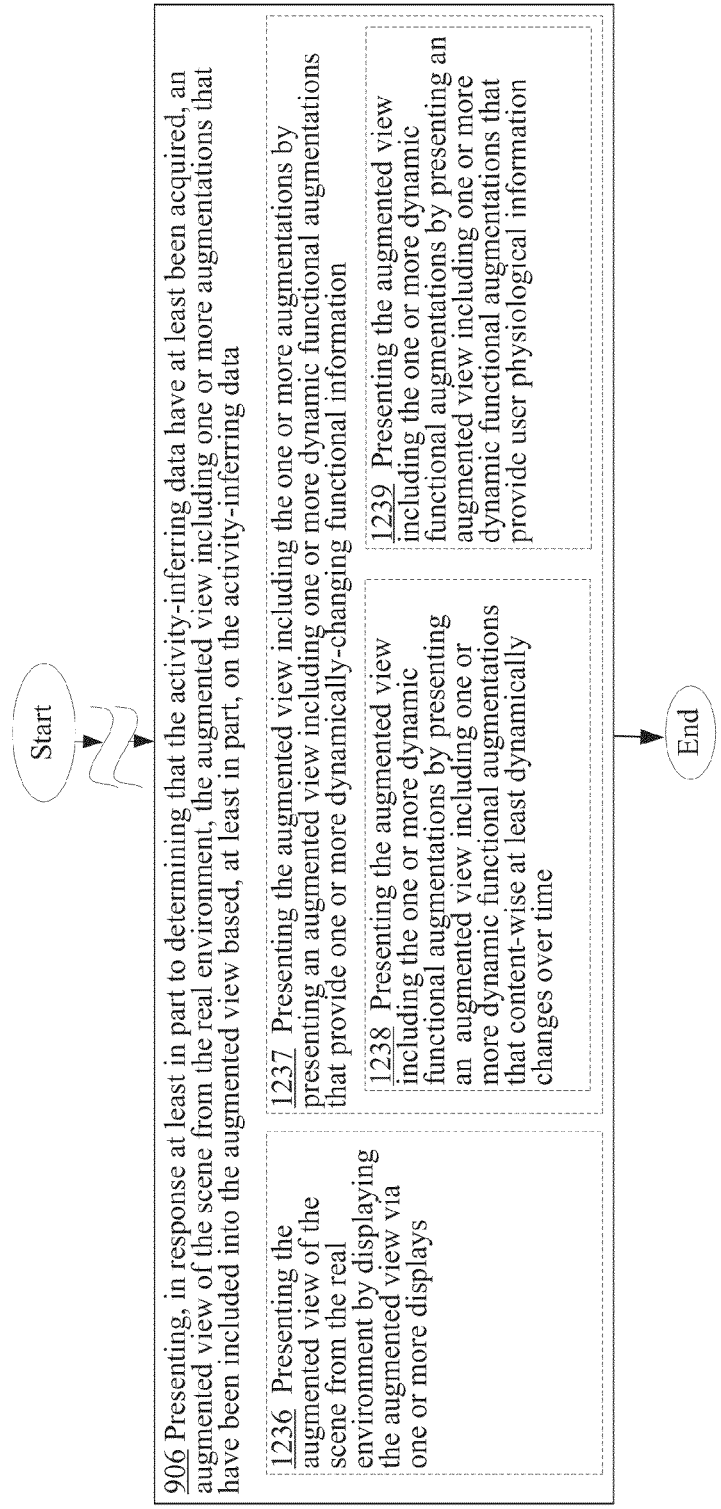
FIG. 12A is a high-level logic flowchart of a process depicting alternate implementations of the augmented view presenting operation 906 of FIG. 9.
Figure 12B:
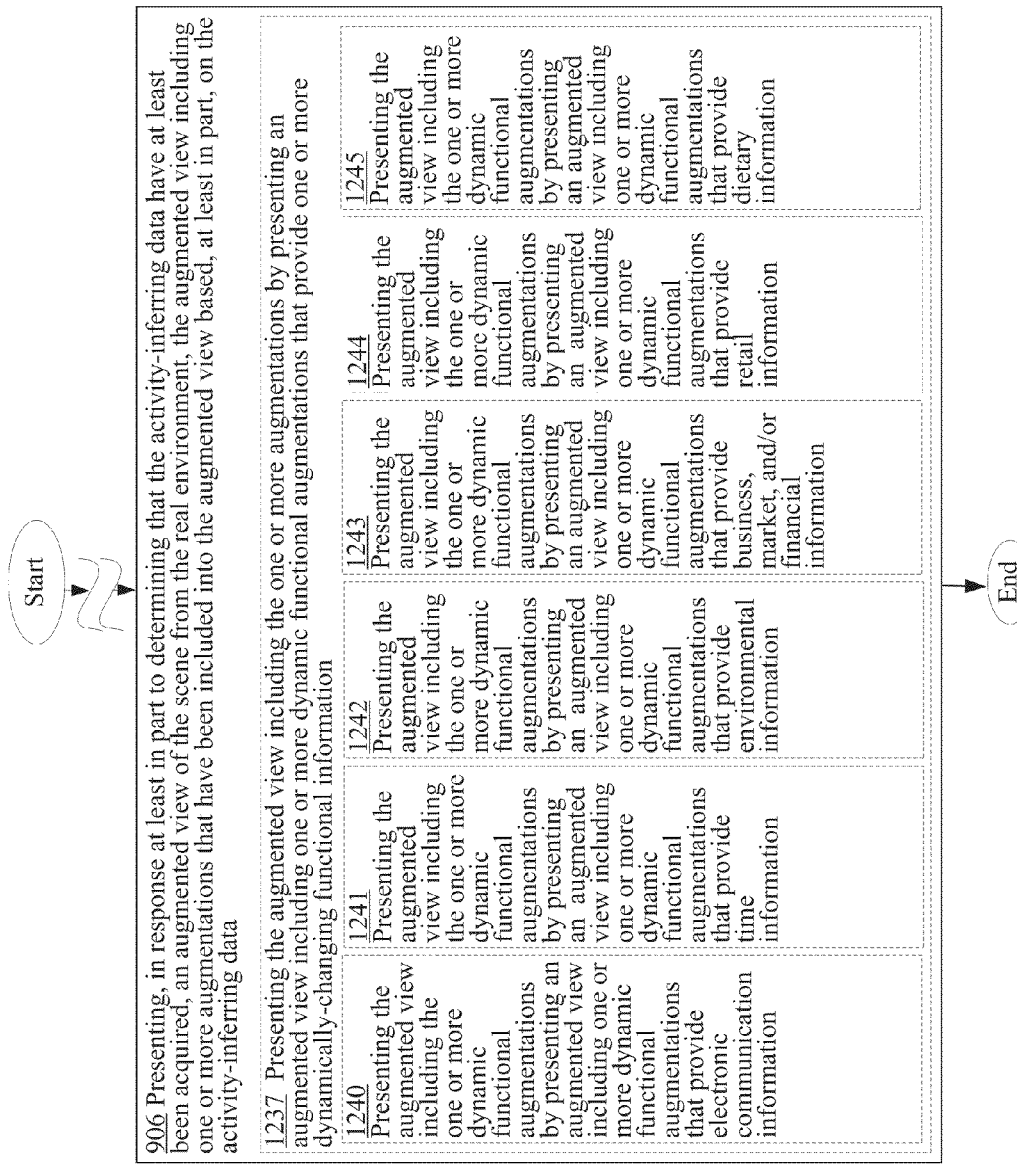
FIG. 12B is a high-level logic flowchart of a process depicting alternate implementations of the augmented view presenting operation 906 of FIG. 9.

Referring back to the augmented view presenting operation 906 of FIG. 9, the augmented view presenting operation 906 similar to the visual data obtaining operation 902 and the activity-inferring data acquisition determining operation 904 of FIG. 9 may be executed in a number of different ways in various alternative embodiments as illustrated in FIGS. 12A, 12B, 12C, and 12D. In some implementations, for example, the augmented view presenting operation 906 may include an operation 1236 for presenting the augmented view of the scene from the real environment by displaying the augmented view via one or more displays as illustrated in FIG. 12A. For instance, the augmented view presenting module 106* including the augmented view displaying module 824 (see FIG. 8C) of the AR device 70* presenting the augmented view of the scene from the real environment by having the augmented view displaying module 824 display the augmented view via one or more displays (e.g., a touchscreen or a liquid crystal display). In alternative implementations, the augmented view may be presented by being transmitted via a wireless network and/or a wired network.

Various types of augmentations may be included in the augmented view that is to be presented through the augmented view presenting operation 906 of FIG. 9. For example and as further illustrated in FIG. 12A, the augmented view presenting operation 906 may include an operation 1237 for presenting the augmented view including the one or more augmentations by presenting an augmented view including one or more dynamic functional augmentations that provide one or more dynamically-changing functional information. For instance, the augmented view presenting module 106* of FIG. 7A or 7B presenting the augmented view including the one or more augmentations by presenting an augmented view (e.g., augmented view 60b, 60c, 60d, 60f, 60g, 60i, 60j, 60k, 60n, 60p, 60r, 60s, or 60u of FIG. 6B, 6C, 6D, 6F, 6G, 6I, 6J, 6K, 6N, 6P, 6R, 6S, or 6U) including one or more dynamic functional augmentations that provide one or more dynamically-changing functional information (e.g., environmental information, user physiological information, business or financial information, time and/or date information, calculator information, retail information, dietary information, and so forth).

As further illustrated in FIG. 12A, operation 1237 may actually include or involve one or more additional operations in various implementations. For example, in certain implementations, operation 1237 include an operation 1238 for presenting the augmented view including the one or more dynamic functional augmentations by presenting an augmented view including one or more dynamic functional augmentations that content-wise at least dynamically changes over time. For instance the augmented view presenting module 106* of FIG. 7A or 7B presenting the augmented view including the one or more dynamic functional augmentations by presenting an augmented view 60b including one or more dynamic functional augmentations (see FIG. 6B which illustrates a time augmentation 61b) that content-wise at least dynamically changes over time.

In the same or alternative implementations, operation 1237 may additionally or alternatively include an operation 1239 for presenting the augmented view including the one or more dynamic functional augmentations by presenting an augmented view including one or more dynamic functional augmentations that provide user physiological information. For instance the augmented view presenting module 106* of FIG. 7A or 7B presenting the augmented view including the one or more dynamic functional augmentations by presenting an augmented view 60f (see FIG. 6F) including one or more dynamic functional augmentations (see for example, augmentations 61f) that provide user physiological information (e.g., pulse, blood pressure, blood glucose level, and so forth).

In the same or alternative implementations, operation 1237 may additionally or alternatively include an operation 1240 for presenting the augmented view including the one or more dynamic functional augmentations by presenting an augmented view including one or more dynamic functional augmentations that provide electronic communication information. For instance the augmented view presenting module 106* of FIG. 7A or 7B presenting the augmented view including the one or more dynamic functional augmentations by presenting an augmented view 60j (see FIG. 6J) including one or more dynamic functional augmentations (see, for example, augmentation 61j of FIG. 6J of a listing or a table) that provide electronic communication information (e.g., subject headings and source of received electronic messages such as emails, instant messages, text messages, and so forth).

In the same or alternative implementations, operation 1237 may additionally or alternatively include an operation 1241 for presenting the augmented view including the one or more dynamic functional augmentations by presenting an augmented view including one or more dynamic functional augmentations that provide time information. For instance the augmented view presenting module 106* of FIG. 7A or 7B presenting the augmented view including the one or more dynamic functional augmentations by presenting an augmented view 60c (see FIG. 6C) including one or more dynamic functional augmentations (see also, for example, augmentations 61b, 61g, or 61j of FIG. 6B, 6G, or 6J) that provide time information.

In the same or alternative implementations, operation 1237 may additionally or alternatively include an operation 1242 for presenting the augmented view including the one or more dynamic functional augmentations by presenting an augmented view including one or more dynamic functional augmentations that provide environmental information. For instance the augmented view presenting module 106* of FIG. 7A or 7B presenting the augmented view including the one or more dynamic functional augmentations by presenting an augmented view 60j (see FIG. 6J) including one or more dynamic functional augmentations (see, for example, augmentation 61j of FIG. 6J that provide environmental information such as temperature, UV level, humidity, pressure, pollen level, and so forth).

In the same or alternative implementations, operation 1237 may additionally or alternatively include an operation 1243 for presenting the augmented view including the one or more dynamic functional augmentations by presenting an augmented view including one or more dynamic functional augmentations that provide business, market, and/or financial information. For instance the augmented view presenting module 106* of FIG. 7A or 7B presenting the augmented view including the one or more dynamic functional augmentations by presenting an augmented view 60d (see FIG. 6D) including one or more dynamic functional augmentations (see, for example, augmentation 61d of FIG. 6D) that provide business, market, and/or financial information.

In the same or alternative implementations, operation 1237 may additionally or alternatively include an operation 1244 for presenting the augmented view including the one or more dynamic functional augmentations by presenting an augmented view including one or more dynamic functional augmentations that provide retail information. For instance the augmented view presenting module 106* of FIG. 7A or 7B presenting the augmented view including the one or more dynamic functional augmentations by presenting an augmented view 60w (see FIG. 6W) including one or more dynamic functional augmentations (see, for example, augmentation 61w of FIG. 6W) that provide retail information (e.g., advertising of a sale, comparable prices, and so forth).

In the same or alternative implementations, operation 1237 may additionally or alternatively include an operation 1245 for presenting the augmented view including the one or more dynamic functional augmentations by presenting an augmented view including one or more dynamic functional augmentations that provide dietary information. For instance the augmented view presenting module 106* of FIG. 7A or 7B presenting the augmented view including the one or more dynamic functional augmentations by presenting an augmented view including one or more dynamic functional augmentations that provide dietary information (e.g., calorie count of items found in the scene from the real environment).

Figure 12C:
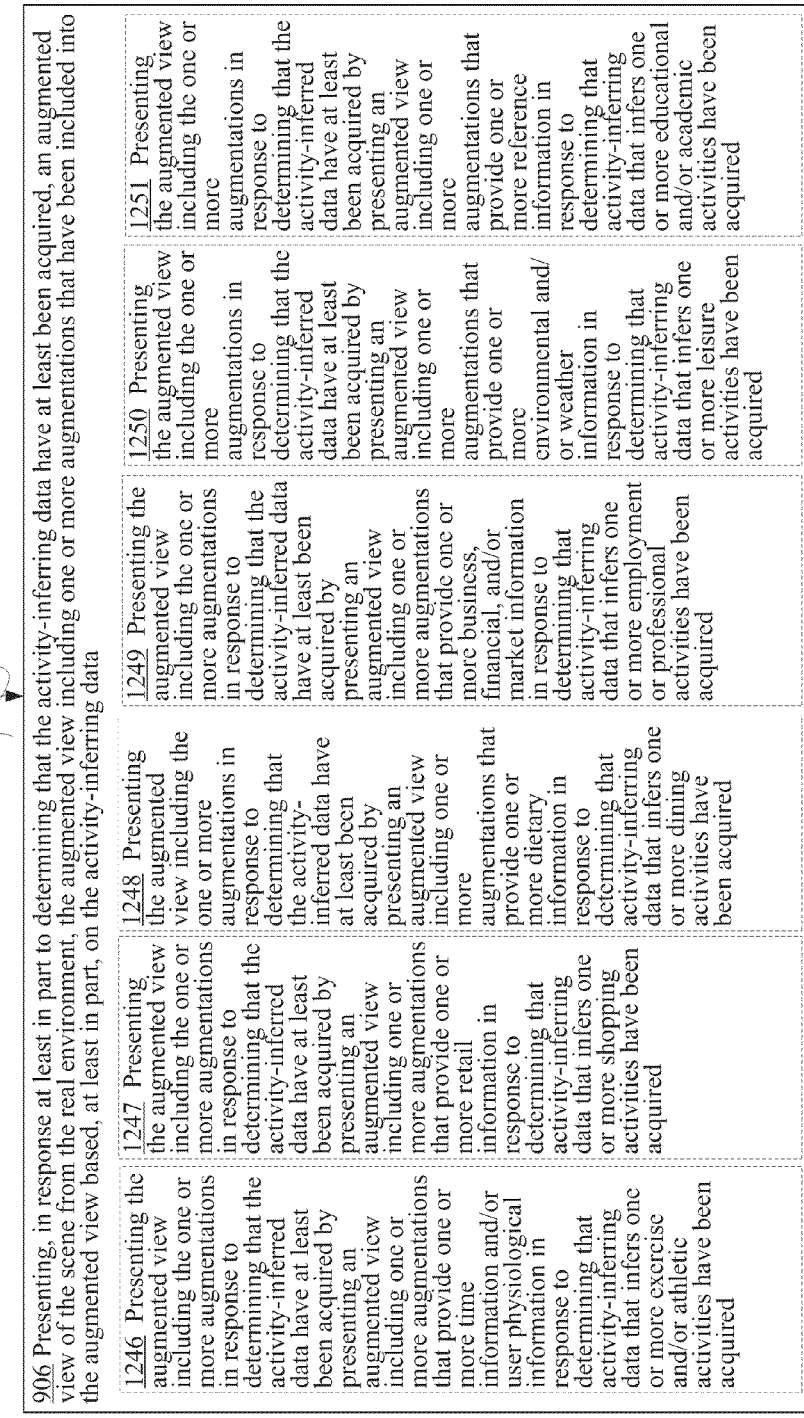
FIG. 12C is a high-level logic flowchart of a process depicting alternate implementations of the augmented view presenting operation 906 of FIG. 9.

Various types of augmentations may be presented through the augmented view presenting operation 906 in response to determining that specific type or types of activity-inferring data have been acquired. For example, FIG. 12C illustrates at least some of the various types of augmentations that may be presented through the augmented view presenting operation 906 in various implementations. In some cases, for example, the augmented view presenting operation 906 may include or may involve an operation 1246 for presenting the augmented view including the one or more augmentations in response to determining that the activity-inferred data have at least been acquired by presenting an augmented view including one or more augmentations that provide one or more time information and/or user physiological information in response to determining that activity-inferring data that infers one or more exercise and/or athletic activities have been acquired. For instance the augmented view presenting module 106* of the AR device 70* presenting the augmented view including the one or more augmentations in response to determining that the activity-inferred data have at least been acquired by presenting an augmented view (e.g., augmented view 60b or 60f of FIG. 6B or FIG. 6F) including one or more augmentations (e.g., augmentations 61b and/or 610 that provide one or more time information and/or user physiological information in response to determining by the activity-inferring data acquisition determining module 104* that activity-inferring data that infers one or more exercise and/or athletic activities (jogging, hiking, playing tennis, and so forth) have been acquired.

In the same or alternative implementations, the augmented view presenting operation 906 may additionally or alternatively include or involve an operation 1247 for presenting the augmented view including the one or more augmentations in response to determining that the activity-inferred data have at least been acquired by presenting an augmented view including one or more augmentations that provide one or more retail information in response to determining that activity-inferring data that infers one or more shopping activities have been acquired as further illustrated in FIG. 12C. For instance the augmented view presenting module 106* of the AR device 70*presenting the augmented view including the one or more augmentations in response to determining that the activity-inferred data have at least been acquired by presenting an augmented view including one or more augmentations that provide one or more retail information (e.g., pricing, in response to determining by the activity-inferring data acquisition determining module 104* that activity-inferring data that infers one or more shopping activities (e.g., data that indicate presence of one or more visual cues in the scene from the real environment that suggests a shopping activities such as presence of a store name in the scene and/or social networking data that indicate the intent to go shopping by a user) have been acquired.

In the same or alternative implementations, the augmented view presenting operation 906 may additionally or alternatively include or involve an operation 1248 for presenting the augmented view including the one or more augmentations in response to determining that the activity-inferred data have at least been acquired by presenting an augmented view including one or more augmentations that provide one or more dietary information in response to determining that activity-inferring data that infers one or more dining activities have been acquired. For instance the augmented view presenting module 106* of the AR device 70* presenting the augmented view including the one or more augmentations in response to determining that the activity-inferred data have at least been acquired by presenting an augmented view including one or more augmentations that provide one or more dietary information (e.g., user calorie total for the day, which may have been manually or automatically entered) in response to determining by the activity-inferring data acquisition determining module 104*that activity-inferring data that infers one or more dining activities (e.g. PIM data that indicate that a user have a scheduled diner or date) have been acquired.

In the same or alternative implementations, the augmented view presenting operation 906 may additionally or alternatively include or involve an operation 1249 for presenting the augmented view including the one or more augmentations in response to determining that the activity-inferred data have at least been acquired by presenting an augmented view including one or more augmentations that provide one or more business, financial, and/or market information in response to determining that activity-inferring data that infers one or more employment or professional activities have been acquired. For instance the augmented view presenting module 106* of the AR device 70* presenting the augmented view including the one or more augmentations in response by the activity-inferring data acquisition determining module 104* to determining that the activity-inferred data have at least been acquired by presenting an augmented view (e.g., augmented view 60d of FIG. 6D) including one or more augmentations (e.g., augmentation 61d of FIG. 6D) that provide one or more business, financial, and/or market information in response to determining by the activity-inferring data acquisition determining module 104* that activity-inferring data that infers one or more employment or professional activities (e.g., visual data that indicate presence of multiple items such as the face of one or more co-workers and/or office furniture items including signs and paintings in the scene from the real environment that suggests a business meeting) have been acquired.

In the same or alternative implementations, the augmented view presenting operation 906 may additionally or alternatively include or involve an operation 1250 for presenting the augmented view including the one or more augmentations in response to determining that the activity-inferred data have at least been acquired by presenting an augmented view including one or more augmentations that provide one or more environmental and/or weather information in response to determining that activity-inferring data that infers one or more leisure activities have been acquired. For instance the augmented view presenting module 106* of the AR device 70* presenting the augmented view including the one or more augmentations in response to determining that the activity-inferred data have at least been acquired by presenting an augmented view (e.g., augmented view 60*j* of FIG. 6J) including one or more augmentations (e.g., augmentation 61*j*) that provide one or more environmental and/or weather information in response to determining by the activity-inferring data acquisition determining module 104* that activity-inferring data that infers one or more leisure activities (e.g., visual data indicating presence of a beach in the scene from the real environment and the bare stomach of the user and social networking data that indicate planned activities of a user that in combination with the visual data suggests sunbathing activities of the user) have been acquired.

In the same or alternative implementations, the augmented view presenting operation 906 may additionally or alternatively include or involve an operation 1251 for presenting the augmented view including the one or more augmentations in response to determining that the activity-inferred data have at least been acquired by presenting an augmented view including one or more augmentations that provide one or more reference information in response to determining that activity-inferring data that infers one or more educational and/or academic activities have been acquired. For instance the augmented view presenting module 106* of the AR device 70* presenting the augmented view including the one or more augmentations in response to determining that the activity-inferred data have at least been acquired by presenting an augmented view (e.g., augmented view 60*u* of FIG. 6U) including one or more augmentations (e.g., augmentation 61*u* in FIG. 6U) that provide one or more reference information in response to determining by the activity-inferring data acquisition determining module 104* that activity-inferring data that infers one or more educational and/or academic activities (e.g., PIM data that indicate a scheduled test and wireless signals/data provided by a third party such as a school administrator that a test is being administered) have been acquired.

Figure 12D:
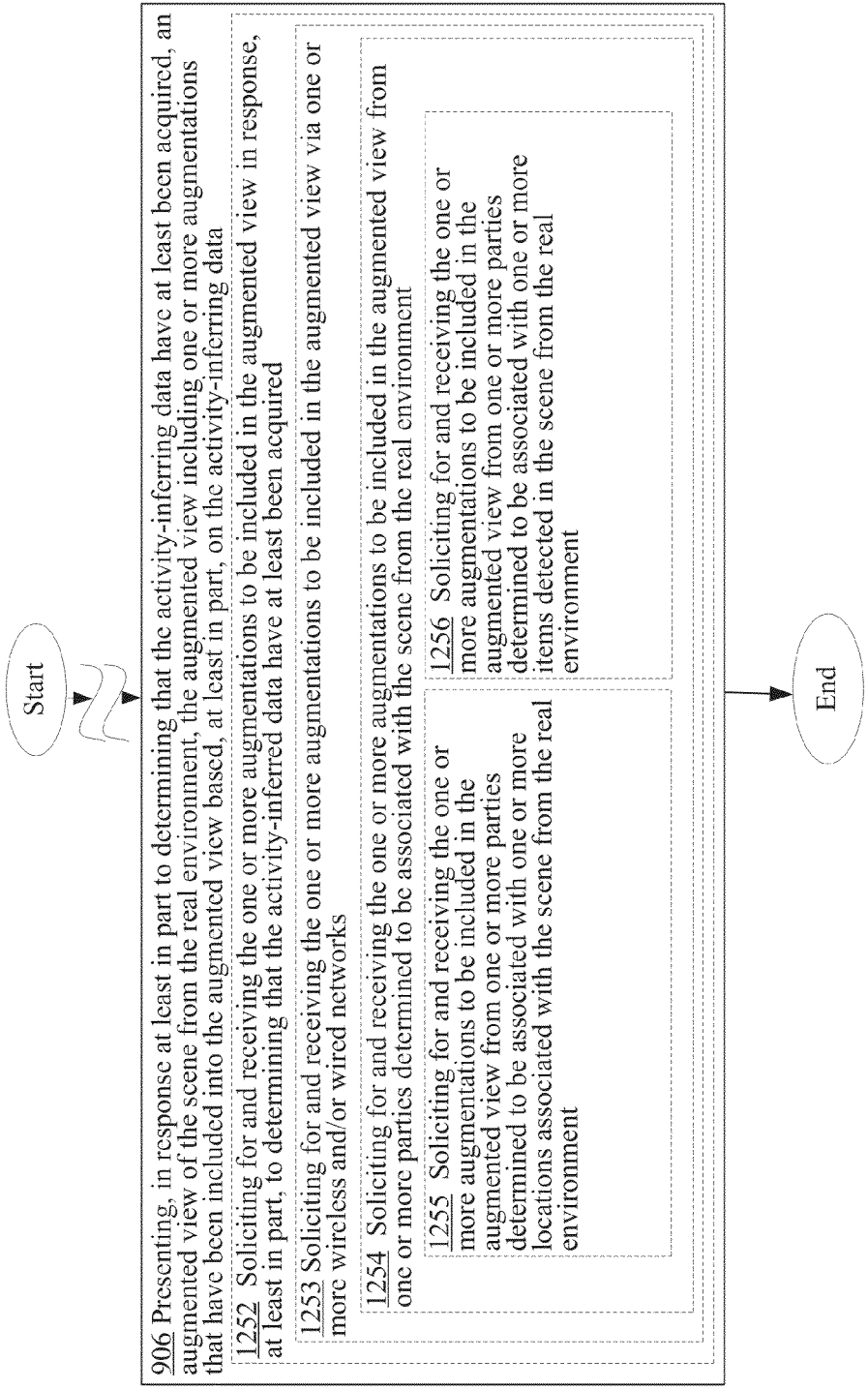
FIG. 12D is a high-level logic flowchart of a process depicting alternate implementations of the augmented view presenting operation 906 of FIG. 9.

In some cases, the one or more augmentations that may be presented through the augmented view presenting operation 906 of FIG. 9 may be solicited from a third party. For example and as illustrated in FIG. 12D, in some implementations, the augmented view presenting operation 906 may include or involve an operation 1252 for soliciting for and receiving the one or more augmentations to be included in the augmented view in response, at least in part, to determining that the activity-inferred data have at least been acquired. For instance, the augmentation soliciting and receiving module 826 (see FIG. 8C) of the AR device 70* of FIG. 7A or FIG. 7B soliciting for and receiving the one or more augmentations (e.g., augmentation 61*w* in FIG. 6W) to be included in the augmented view (e.g., augmented view 60*w* of FIG. 6W) in response, at least in part, to determining by the activity-inferring data acquisition determining module 104*that the activity-inferred data (e.g., visual data that indicate presence of multiple visual cues in the scene from the real environment that suggests that a user is shopping in a mall or shopping near a particular retail outlet such as JC Penney) have at least been acquired.

As further illustrated in FIG. 12D, in some implementations, operation 1252 may include or involve an operation 1253 for soliciting for and receiving the one or more augmentations to be included in the augmented view via one or more wireless and/or wired networks. For instance, the augmentation soliciting and receiving module 826 of the AR device 70* of FIG. 7A or FIG. 7B soliciting for and receiving the one or more augmentations to be included in the augmented view via one or more wireless and/or wired networks (e.g., a cellular telephone or data network, a wireless local area network (WLAN), a wireless wide area network or WAN, a public switched telephone network (PTSN), and/or other types of networks).

As further illustrated in FIG. 12D, in some implementations, operation 1253 may include or involve an operation 1254 for soliciting for and receiving the one or more augmentations to be included in the augmented view from one or more parties determined to be associated with the scene from the real environment. For instance, the augmentation soliciting and receiving module 826 of the AR device 70* of FIG. 7A or FIG. 7B soliciting for and receiving the one or more augmentations (e.g., augmentation 61*w* of FIG. 6W) to be included in the augmented view (e.g., augmented view 60*w* of FIG. 6W) from one or more parties (e.g., retail business) determined by the scene associated party determining module 828 (see FIG. 8C) to be associated with the scene from the real environment (e.g., shopping center or a retail business).

In some implementations, operation 1254 may include or involve one or more additional operations including an operation 1255 for soliciting for and receiving the one or more augmentations to be included in the augmented view from one or more parties determined to be associated with one or more locations associated with the scene from the real environment as further illustrated in FIG. 12D. For instance, the augmentation soliciting and receiving module 826 of the AR device 70* of FIG. 7A or FIG. 7B soliciting for and receiving the one or more augmentations to be included in the augmented view from one or more parties (e.g., operators of a mall) determined by the scene location associated party determining module 830 to be associated with one or more locations associated with the scene (e.g., interior of the mall) from the real environment.

In the same or different implementations, operation 1254 may additionally or alternatively include an operation 1256 for soliciting for and receiving the one or more augmentations to be included in the augmented view from one or more parties determined to be associated with one or more items detected in the scene from the real environment. For instance, the augmentation soliciting and receiving module 826 of the AR device 70* of FIG. 7A or FIG. 7B soliciting for and receiving the one or more augmentations to be included in the augmented view from one or more parties (e.g., businesses) determined to be associated with one or more items (e.g., store name, a particular identifiable product including an automobile, a logo, and so forth) detected in the scene from the real environment.

Figure 13:
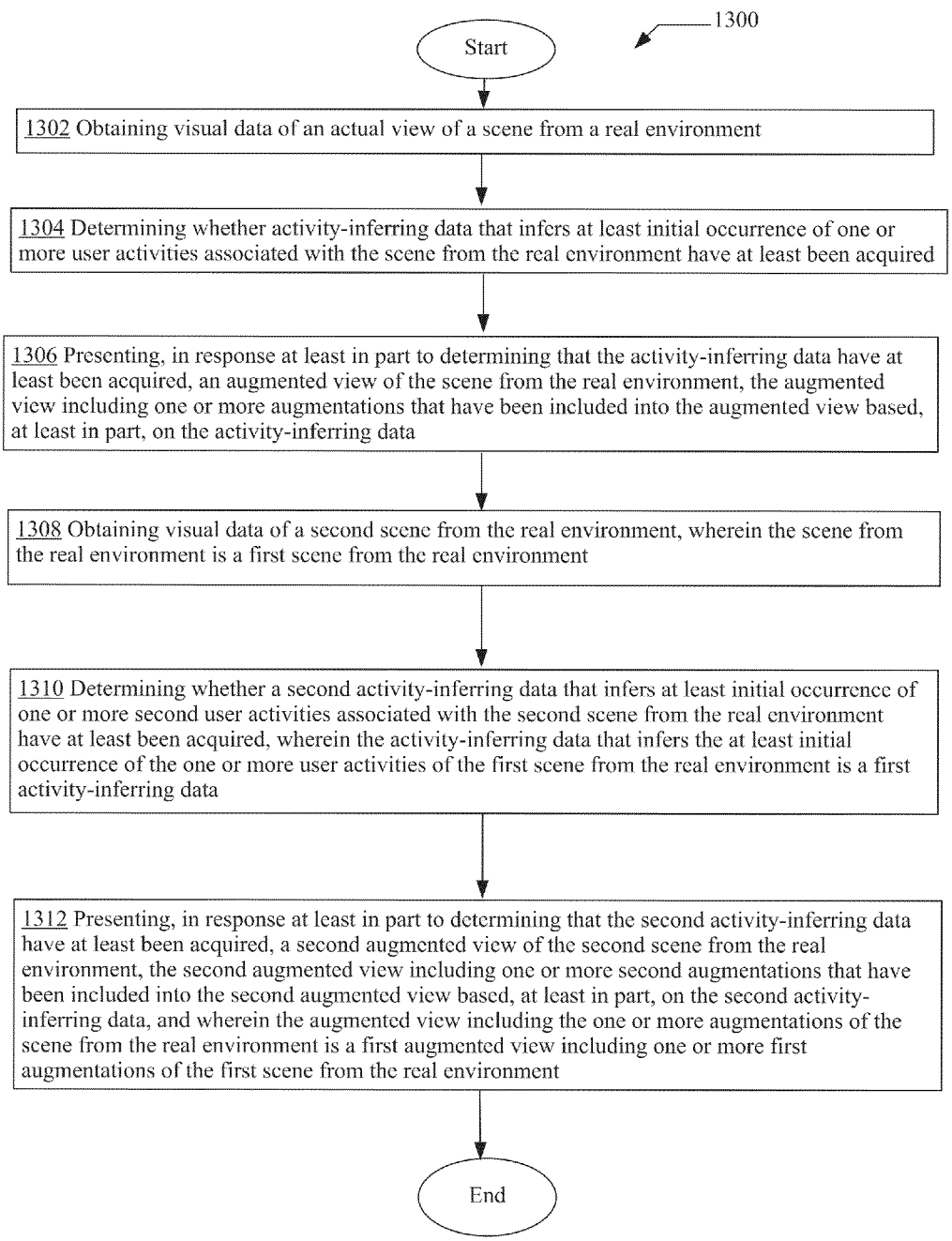
FIG. 13 is another high-level logic flowchart of a process, e.g., operational flow 1300, according to some embodiments.

Turning now to FIG. 13 illustrating another operational flow 1300. Operational flow 1300 includes certain operations that mirror the operations included in operational flow 900 of FIG. 9. These operations include a visual data obtaining operation 1302, a activity-inferring data acquisition determining operation 1304, and an augmented view presenting operation 1306 that corresponds to and mirror the visual data obtaining operation 902, the activity-inferring data acquisition determining operation 904, and the augmented view presenting operation 906, respectively, of FIG. 9.

In addition, operational flow 1300 may include another visual data obtaining operation 1308 for obtaining visual data of a second scene from the real environment, wherein the scene from the real environment is a first scene from the real environment. For instance, the visual data obtaining module 102* of the AR device 70* of FIG. 7A or FIG. 7B obtaining visual data of a second scene (see, for example, the actual view 60*h* of FIG. 6H) from the real environment, wherein the previous scene from the real environment (see, for example, the actual view 60*e* of FIG. 6E) is a first scene from the real environment.

As further illustrated in FIG. 13, operational flow 1300 may also include another activity-inferring data acquisition determining operation 1304 operation 1310 for determining whether a second activity-inferring data that infers at least initial occurrence of one or more second user activities associated with the second scene from the real environment have at least been acquired, wherein the activity-inferring data that infers the at least initial occurrence of the one or more user activities of the first scene from the real environment is a first activity-inferring data. For instance, the activity-inferring data acquisition determining module 104* of the AR device 70* of FIG. 7A or FIG. 7B determining whether a second activity-inferring data that infers at least initial occurrence of one or more second user activities (e.g., sunbathing) associated with the second scene (see, for example, the actual view 60h of FIG. 6H) from the real environment have at least been acquired, wherein the activity-inferring data that infers the at least initial occurrence of the one or more user activities (e.g., riding a bicycle) associated with the first scene (see, for example, the actual view 60e of FIG. 6E) from the real environment is a first activity-inferring data.

Operational flow 1300 may further include another augmented view presenting operation 1312 for presenting, in response at least in part to determining that the second activity-inferring data have at least been acquired, a second augmented view of the second scene from the real environment, the second augmented view including one or more second augmentations that have been included into the second augmented view based, at least in part, on the second activity-inferring data, and wherein the augmented view including the one or more augmentations of the scene from the real environment is a first augmented view including one or more first augmentations of the first scene from the real environment. For instance, the augmented view presenting module 106* of the AR device 70* of FIG. 7A or 7B presenting, in response at least in part to determining by the activity-inferring data acquisition determining module 104* that the second activity-inferring data have at least been acquired, a second augmented view (e.g., augmented view 60k of FIG. 6K) of the second scene from the real environment, the second augmented view (e.g., augmented view 60k of FIG. 6K) including one or more second augmentations (e.g., augmentation 61k) that have been included into the second augmented view e.g., augmented view 60k of FIG. 6K) based, at least in part, on the second activity-inferring data, and wherein the previous augmented view including the one or more augmentations of the scene from the real environment is a first augmented view including one or more first augmentations of the first scene from the real environment.

Figure 14:
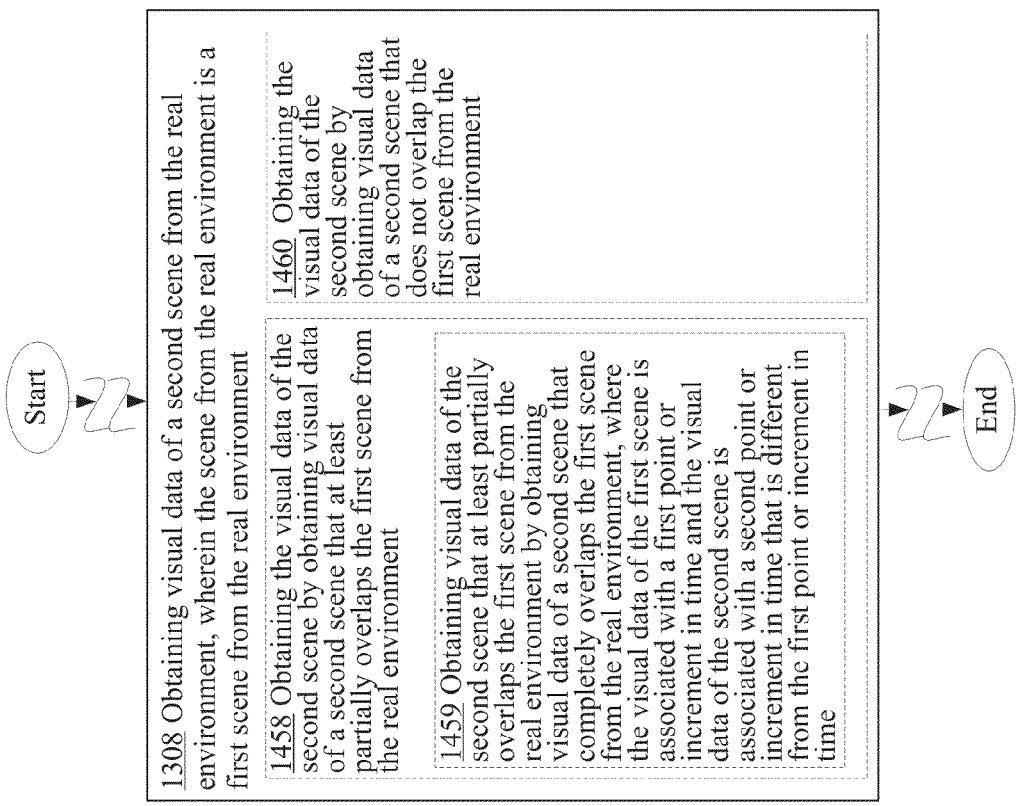
FIG. 14 is a high-level logic flowchart of a process depicting alternate implementations of the visual data obtaining operation 1308 of FIG. 13.

Turning now to FIG. 14, in some cases the visual data obtaining operation 1308 of FIG. 13 may include one or more additional operations including an operation 1458 for obtaining the visual data of the second scene by obtaining visual data of a second scene that at least partially overlaps the first scene from the real environment. For instance, the visual data obtaining module 102* of the AR device 70* of FIG. 7A or 7B obtaining the visual data of the second scene by obtaining visual data of a second scene (e.g., the actual view 53b of FIG. 5B) that at least partially overlaps the first scene (e.g., the actual view 53a of FIG. 5A).

In some cases, operation 1458 may further include or involve an operation 1459 for obtaining visual data of the second scene that at least partially overlaps the first scene from the real environment by obtaining visual data of a second scene that completely overlaps the first scene from the real environment, where the visual data of the first scene is associated with a first point or increment in time and the visual data of the second scene is associated with a second point or increment in time that is different from the first point or increment in time. For instance, the visual data obtaining module 102* of the AR device 70* of FIG. 7A or 7B obtaining visual data of the second scene that at least partially overlaps the first scene from the real environment by obtaining visual data of a second scene 50b (see FIG. 5A) that completely overlaps the first scene 50a (see FIG. 5A) from the real environment (see, for example, the above discussion related to FIG. 5A), where the visual data of the first scene is associated with a first point or increment in time and the visual data of the second scene is associated with a second point or increment in time that is different from the first point or increment in time.

As further illustrated in FIG. 14, the visual data obtaining operation 1308 of FIG. 13 may additionally or alternatively include an operation 1460 for obtaining the visual data of the second scene by obtaining visual data of a second scene that does not overlap the first scene from the real environment. For instance, the visual data obtaining module 102* of the AR device 70* of FIG. 7A or 7B obtaining the visual data of the second scene by obtaining visual data of a second scene (e.g., actual view 53d of FIG. 5C) that does not overlap the first scene (e.g., actual view 53c of FIG. 5C) from the real environment.

Figure 15A:
FIG. 15A is a high-level logic flowchart of a process depicting alternate implementations of the augmented view presenting operation 1312 of FIG. 13.
Figure 15B:
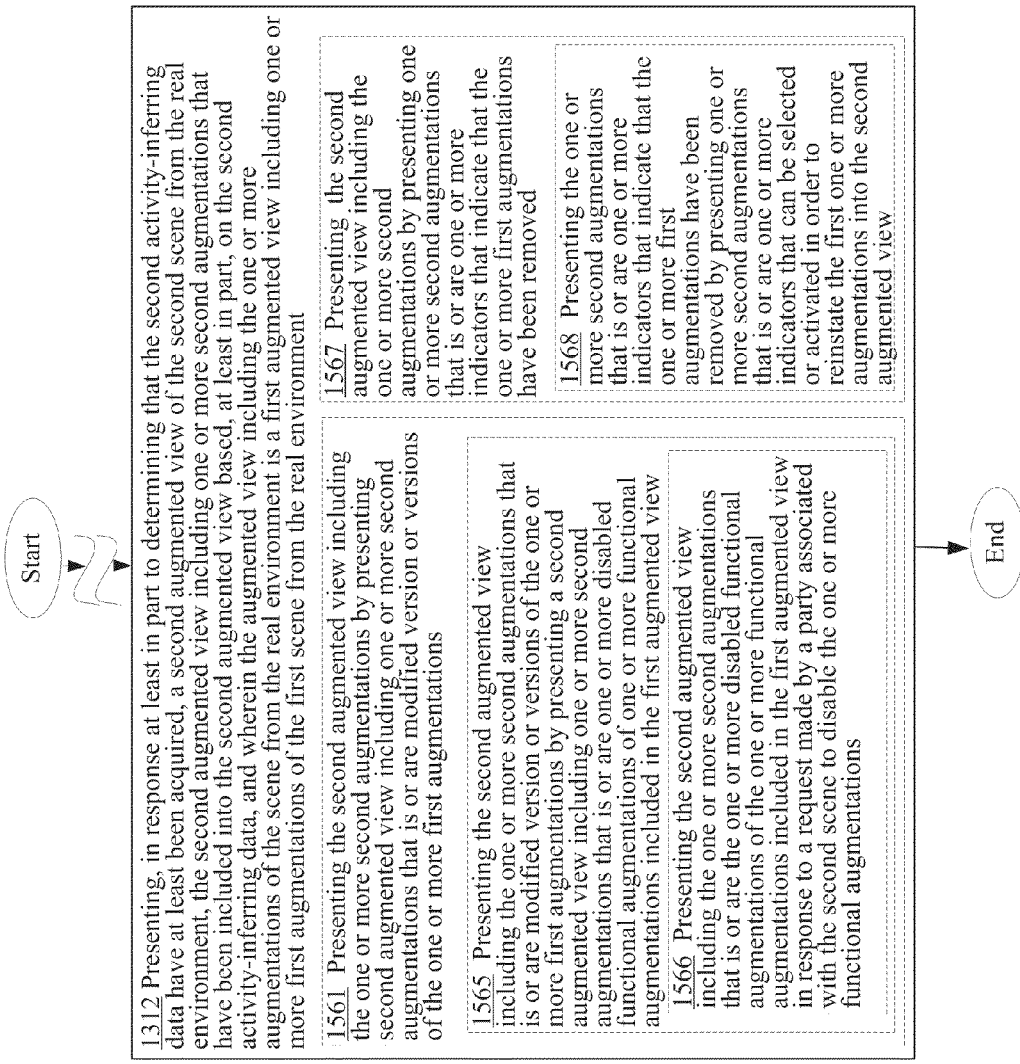
FIG. 15B is a high-level logic flowchart of a process depicting alternate implementations of the augmented view presenting operation 1312 of FIG. 13.

Turning now to FIGS. 15A and 15B, the augmented view presenting operation 1312 of FIG. 13 may actually include or involve one or more operations in various alternative implementations. For example, in some implementations, the augmented view presenting operation 1312 may involve or include an operation 1561 for presenting the second augmented view including the one or more second augmentations by presenting a second augmented view including one or more second augmentations that is or are modified version or versions of the one or more first augmentations as illustrated in FIG. 15A. For instance, the augmented view presenting module 106* of the AR device 70* of FIG. 7A or 7B presenting the second augmented view including the one or more second augmentations by presenting a second augmented view 60i (see FIG. 6I) including one or more second augmentations (e.g., augmentation 61i of FIG. 6I) that is or are modified version or versions of the one or more first augmentations (e.g., augmentation 61c of FIG. 6C). Note that augmentation 61c of FIG. 6C is a time augmentation in a table clock form and augmentation 61i of FIG. 6I is another time augmentation but in a sundial form.

As further illustrated in FIG. 15A, operation 1561 may include one or more additional operations in various alternative implementations. For example, in some implementations, operation 1561 may include an operation 1562 for presenting the second augmented view including the one or more second augmentations that is or are modified version or versions of the one or more first augmentations by presenting a second augmented view including one or more second augmentations that is or are same or similar as the one or more first augmentations except for location or locations of the one or more second augmentations in the second augmented view being different from location or locations of the one or more first augmentations in the first augmented view. For instance, the augmented view presenting module 106* of the AR device 70* of FIG. 7A or 7B presenting the second augmented view including the one or more second augmentations that is or are modified version or versions of the one or more first augmentations by presenting a second augmented view 60p (see FIG. 6P) including one or more second augmentations (e.g., augmentation 61p of FIG. 6P) that is or are same or similar as the one or more first augmentations (e.g., augmentation 61*b* of FIG. 6B) except for location or locations of the one or more second augmentations (e.g., augmentation 61*p* of FIG. 6P) in the second augmented view 60*p* being different from location or locations of the one or more first augmentations (e.g., augmentation 61*b* of FIG. 6B) in the first augmented view 60*b*.

In the same or different implementations, operation 1561 may additionally or alternatively include an operation 1563 for presenting the second augmented view including the one or more second augmentations that is or are modified version or versions of the one or more first augmentations by presenting a the second augmented view including one or more second augmentations that is or are same or similar as the one or more first augmentations except for the one or more second augmentations in the second augmented view being more transparent than the one or more first augmentations in the first augmented view. For instance, the augmented view presenting module 106* of the AR device 70* of FIG. 7A or 7B presenting the second augmented view including the one or more second augmentations that is or are modified version or versions of the one or more first augmentations by presenting a second augmented view 60*n* (see FIG. 6N) including one or more second augmentations (e.g., augmentation 61*n* of FIG. 6N) that is or are same or similar as the one or more first augmentations (e.g., augmentation 61*b* of FIG. 6B) except for the one or more second augmentations (e.g., augmentation 61*n* of FIG. 6N) in the second augmented view 60*n* being more transparent than the one or more first augmentations (e.g., augmentation 61*b* of FIG. 6B) in the first augmented view 60*b*.

In the same or different implementations, operation 1561 may additionally or alternatively include an operation 1564 for presenting the second augmented view including the one or more second augmentations that is or are modified version or versions of the one or more first augmentations by presenting a second augmented view including one or more second augmentations that is or are same or similar as the one or more first augmentations except for the one or more second augmentations in the second augmented view being less transparent than the one or more first augmentations in the first augmented view. For instance, the augmented view presenting module 106* of the AR device 70* of FIG. 7A or 7B presenting the second augmented view including the one or more second augmentations that is or are modified version or versions of the one or more first augmentations by presenting a second augmented view 60*b* (see FIG. 6B) including one or more second augmentations (e.g., augmentation 61*b* of FIG. 6B) that is or are same or similar as the one or more first augmentations (e.g., augmentation 61*n* of FIG. 6N) except for the one or more second augmentations (e.g., augmentation 61*b* of FIG. 6B) in the second augmented view 60*b* being less transparent than the one or more first augmentations (e.g., augmentation 61*n* of FIG. 6N) in the first augmented view 60*n*.

In the same or different implementations, operation 1561 may additionally or alternatively include an operation 1565 for presenting the second augmented view including the one or more second augmentations that is or are modified version or versions of the one or more first augmentations by presenting a second augmented view including one or more second augmentations that is or are one or more disabled functional augmentations of one or more functional augmentations included in the first augmented view as illustrated in FIG. 15B. For instance, the augmented view presenting module 106* of the AR device 70* of FIG. 7A or 7B presenting the second augmented view including the one or more second augmentations that is or are modified version or versions of the one or more first augmentations by presenting a second augmented view 60*s* including one or more second augmentations (e.g., augmentation 61*s* of FIG. 6S) that is or are one or more disabled functional augmentations (e.g., disable calculator) of one or more functional augmentations (e.g., augmentation 61*r* of FIG. 6R) included in the first augmented view 60*r* (see FIG. 6R).

As further illustrated in FIG. 15B, in some implementations, operation 1565 may further include an operation 1566 for presenting the second augmented view including the one or more second augmentations that is or are the one or more disabled functional augmentations of the one or more functional augmentations included in the first augmented view in response to a request made by a party associated with the second scene to disable the one or more functional augmentations. For instance, the augmented view presenting module 106* of the AR device 70* of FIG. 7A or 7B presenting the second view 60*s* (see FIG. 6S) including the one or more second augmentations (e.g., (e.g. augmentation 61*s* of FIG. 6S) that is or are the one or more disabled functional augmentations (e.g., disabled calculator) of the one or more functional augmentations included in the first augmented view in response to a request made (e.g., a request that is electronically transmitted or displayed in the scene from the real environment) by a party associated with the second scene to disable the one or more functional augmentations. For example, in the example school testing example scene illustrated in FIG. 6S, the school may post in the test room a visual signature or tag that may prompt the AR device 70* to disable the functional augmentation (e.g., calculator). Alternatively, the school may transmit an electronic signal that may request or command the AR device 70* to disable the calculator augmentation 61*s*.

In some cases, the augmented view presenting operation 1312 of FIG. 13 may include or involve an operation 1567 for presenting the second augmented view including the one or more second augmentations by presenting one or more second augmentations that is or are one or more indicators that indicate that the one or more first augmentations have been removed as illustrated in FIG. 15B. For instance, the augmented view presenting module 106* of the AR device 70* of FIG. 7A or 7B presenting the second augmented view including the one or more second augmentations by presenting one or more second augmentations (e.g., augmentation 61*u* of FIG. 6U) that is or are one or more indicators (e.g., a post or a tag) that indicate that the one or more first augmentations (e.g., the calculator augmentation 61*r* of FIG. 6R) have been removed.

As further illustrated in FIG. 15B, in some cases operation 1567 may include one or more additional operations including an operation 1568 for presenting the one or more second augmentations that is or are one or more indicators that indicate that the one or more first augmentations have been removed by presenting one or more second augmentations that is or are one or more indicators that can be selected or activated in order to reinstate the one or more first augmentations into the second augmented view. For instance, the augmented view presenting module 106* of the AR device 70* of FIG. 7A or 7B presenting the one or more second augmentations that is or are one or more indicators that indicate that the one or more first augmentations have been removed by presenting one or more second augmentations (e.g., the augmentation 61*u* of FIG. 6U, which can be selected by eye focus or by voice command) that is or are one or more indicators that can be selected or activated in order to reinstate the one or more first augmentations (e.g., the calculator augmentation 61*r* of FIG. 6R) into the second augmented view 60*u*.

Figure 16:
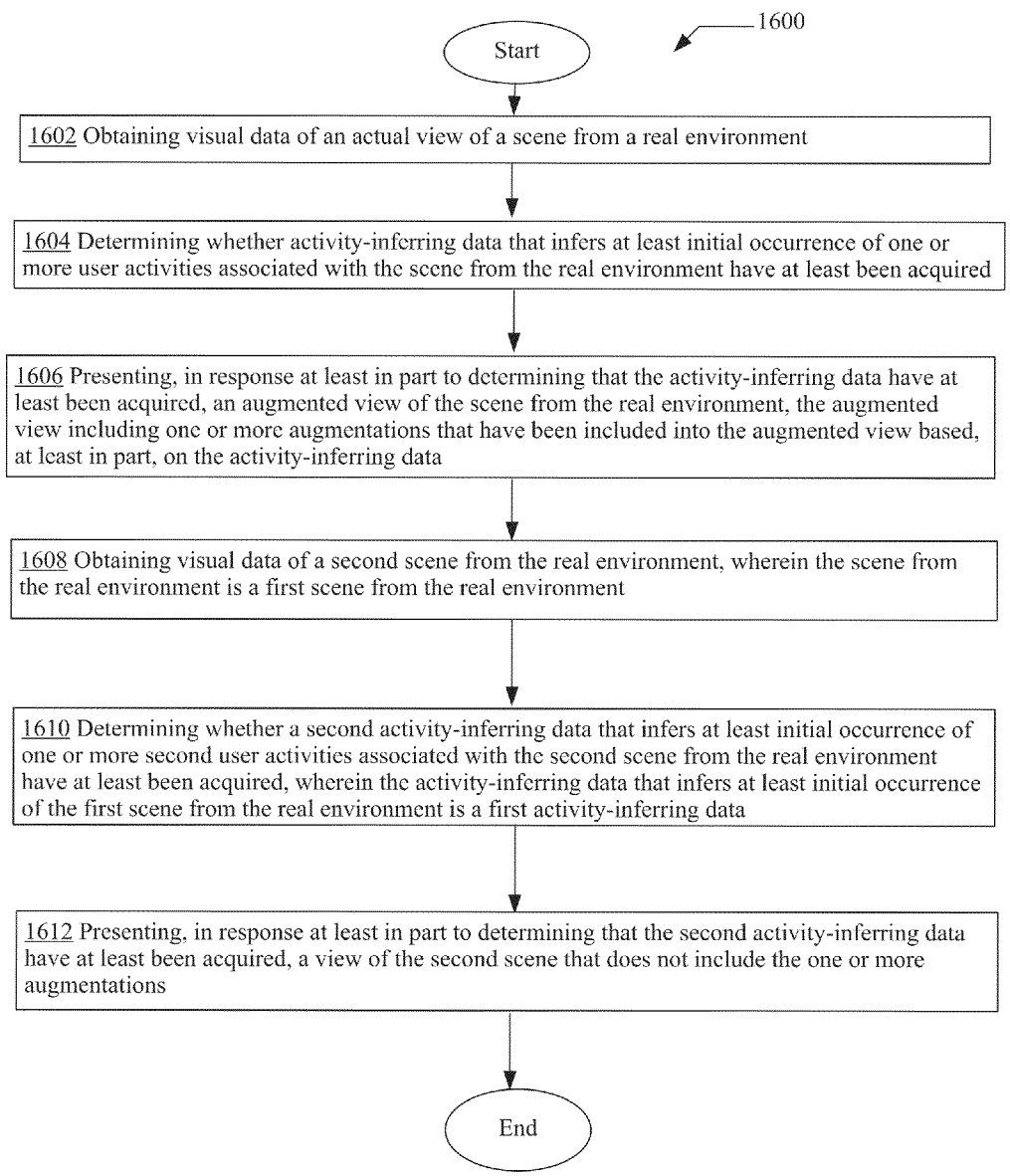
FIG. 16 is another high-level logic flowchart of a process, e.g., operational flow 1600, according to some embodiments.

Turning now to FIG. 16 illustrating another operational flow 1600. Operational flow 1600 includes certain operations that mirror the operations included in operational flow 1300 of FIG. 13. These operations include a visual data obtaining operation 1602, a activity-inferring data acquisition determining operation 1604, an augmented view presenting operation 1606, another visual data obtaining operation 1608, and another activity-inferring data acquisition determining operation 1610 that corresponds to and mirror the visual data obtaining operation 1302, the activity-inferring data acquisition determining operation 1304, the augmented view presenting operation 1306, the visual data obtaining operation 1308, and the activity-inferring data acquisition determining operation 1310, respectively, of FIG. 13.

In addition, operational flow 1600 may further include a presenting operation 1269 for presenting, in response at least in part to determining that the second activity-inferring data have at least been acquired, a view of the second scene that does not include the one or more augmentations as further illustrated in FIG. 16. For instance, the non-augmented view presenting module 107* of the AR device 70* of FIG. 7A or 7B presenting, in response at least in part to determining by the activity-inferring data acquisition determining module 104* that the second activity-inferring data have at least been acquired, a view of the second scene (e.g., actual view 60*t* of FIG. 6T) that does not include the one or more augmentations (e.g., the augmentation 61*r* of FIG. 6R or the augmentation 61*s* of FIG. 6S).

Figure 17:
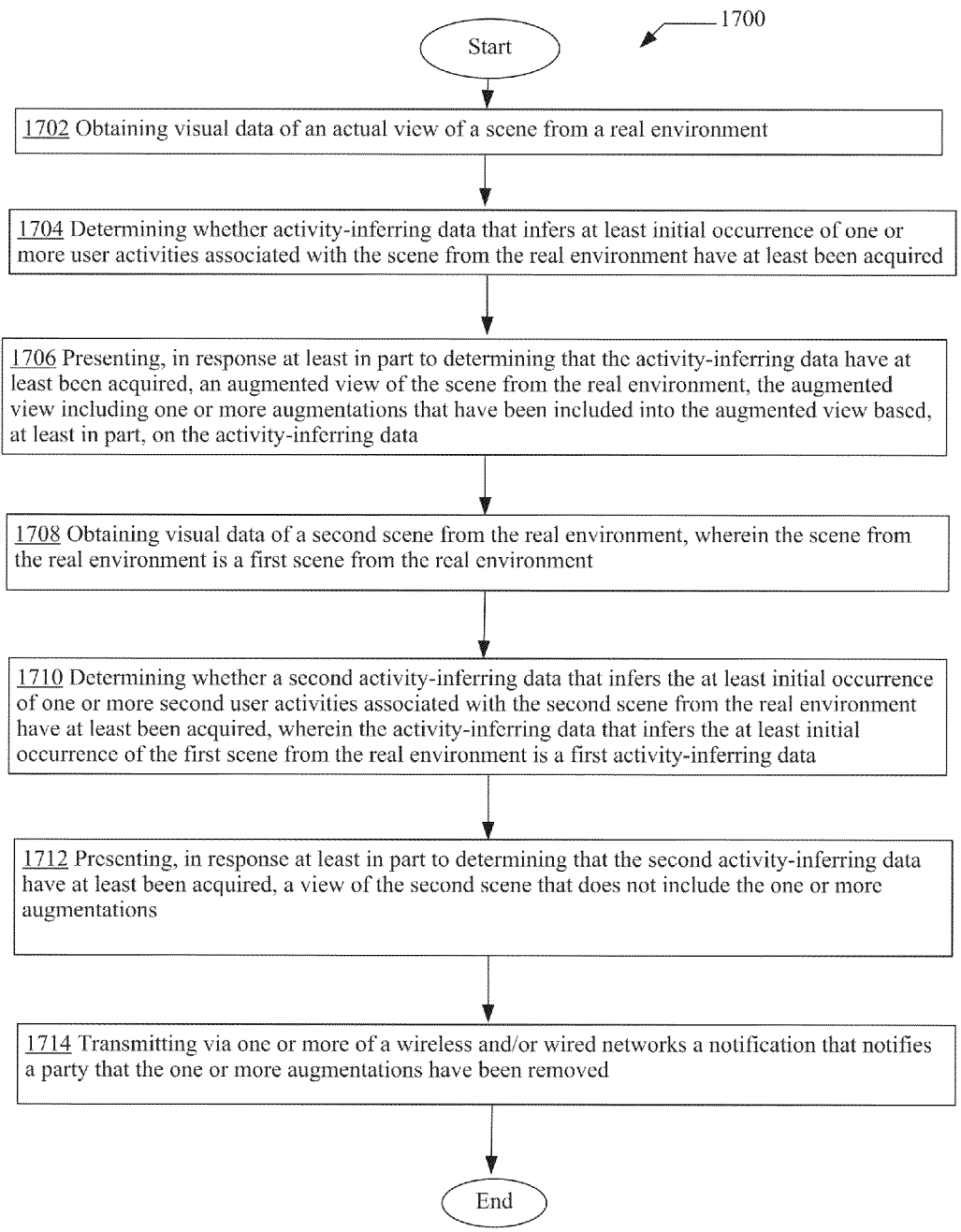
FIG. 17 is another high-level logic flowchart of a process, e.g., operational flow 1700, according to some embodiments.

Turning now to FIG. 17 illustrating another operational flow 1700. Operational flow 1700 includes certain operations that mirror the operations included in operational flow 1600 of FIG. 16. These operations include a visual data obtaining operation 1702, a activity-inferring data acquisition determining operation 1704, an augmented view presenting operation 1706, another visual data obtaining operation 1708, another activity-inferring data acquisition determining operation 1710, and the presenting operation 1712 that corresponds to and mirror the visual data obtaining operation 1302, the activity-inferring data acquisition determining operation 1304, the augmented view presenting operation 1306, the visual data obtaining operation 1308, the activity-inferring data acquisition determining operation 1310, and the presenting operation 1312, respectively, of FIG. 13.

In addition, operational flow 1700 may additionally include an operation 1714 for transmitting via one or more of a wireless and/or wired networks a notification that notifies a party that the one or more augmentations have been removed. For instance, the notification transmitting module 108* of the AR device 70* of FIG. 7A or 7B transmitting via one or more of a wireless and/or wired networks a notification that notifies a party (e.g., a third party who is may be interested in knowing what the user of the AR device 70* may be viewing including, for example, a school administrator interested in whether a user-student have access to a calculator augmentation) that the one or more augmentations have been removed.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow).

Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   obtaining visual data of an actual view of a scene from a real environment;
   determining whether activity-inferring data that infers at least initial occurrence of one or more user activities associated with the scene from the real environment have at least been acquired;
   presenting, in response at least in part to determining that the activity-inferring data have at least been acquired, an augmented view of the scene from the real environment, the augmented view including one or more augmentations that have been included into the augmented view based, at least in part, on the activity-inferring data;
   obtaining visual data of a second scene from the real environment, wherein a previous scene from the real environment is a first scene from the real environment;
   determining whether a second activity-inferring data that infers at least initial occurrence of one or more second user activities associated with the second scene from the real environment have at least been acquired, wherein the activity-inferring data that infers the at least initial occurrence of the one or more user activities of the first scene from the real environment is a first activity-inferring data; and
   presenting, in response at least in part to determining that the second activity-inferring data have at least been acquired, a second augmented view of the second scene from the real environment, the second augmented view including one or more second augmentations that have been included into the second augmented view based, at least in part, on the second activity-inferring data, and wherein a previous augmented view including the one or more augmentations of the scene from the real environment is a first augmented view including one or more first augmentations of the first scene from the real environment.

2. A computationally-implemented system, comprising:
means for obtaining visual data of an actual view of a scene from a real environment;
means for determining whether activity-inferring data that infers at least initial occurrence of one or more user activities associated with the scene from the real environment have at least been acquired;
means for presenting, in response at least in part to determining that the activity-inferring data have at least been acquired, an augmented view of the scene from the real environment, the augmented view including one or more augmentations that have been included into the augmented view based, at least in part, on the activity-inferring data;
means for obtaining visual data of a second scene from the real environment, wherein a previous scene from the real environment is a first scene from the real environment;
means for determining whether a second activity-inferring data that infers at least initial occurrence of one or more second user activities associated with the second scene from the real environment have at least been acquired, wherein the activity-inferring data that infers the at least initial occurrence of the one or more user activities of the first scene from the real environment is a first activity-inferring data; and
means for presenting, in response at least in part to determining that the second activity-inferring data have at least been acquired, a second augmented view of the second scene from the real environment, the second augmented view including one or more second augmentations that have been included into the second augmented view based, at least in part, on the second activity-inferring data, and wherein a previous augmented view including the one or more augmentations of the scene from the real environment is a first augmented view including one or more first augmentations of the first scene from the real environment.

3. The computationally-implemented system of claim 2, wherein said means for determining whether activity-inferring data that infers at least initial occurrence of one or more user activities associated with the scene from the real environment have at least been acquired comprises:
means for determining whether the visual data that was obtained includes activity-inferring visual data that infers the at least initial occurrence of the one or more user activities associated with the first scene from the real environment.

4. The computationally-implemented system of claim 3, wherein said means for determining whether the visual data that was obtained includes activity-inferring visual data that infers the at least initial occurrence of the one or more user activities associated with the first scene from the real environment comprises:
means for determining whether the activity-inferring visual data that was obtained includes the activity-inferring visual data that provides multiple visual cues that when detected in combination infers the at least initial occurrence of the one or more user activities associated with the first scene.

5. The computationally-implemented system of claim 4, wherein said means for determining whether the activity-inferring visual data that was obtained includes the activity-inferring visual data that provides multiple visual cues that when detected in combination infers the at least initial occurrence of the one or more user activities associated with the first scene comprises:
means for determining whether the activity-inferring visual data that was obtained includes the activity-inferring visual data that indicates presence of multiple visible items in the first scene from the real environment that when detected in combination infers the at least initial occurrence of the one or more user activities associated with the first scene.

6. The computationally-implemented system of claim 2, wherein said means for determining whether activity-inferring data that infers at least initial occurrence of one or more user activities associated with the scene from the real environment have at least been acquired comprises:
means for determining whether activity-inferring audio data have been acquired that infers the at least initial occurrence of the one or more user activities associated with the first scene from the real environment.

7. The computationally-implemented system of claim 6, wherein said means for determining whether activity-inferring audio data have been acquired that infers the at least initial occurrence of the one or more user activities associated with the first scene from the real environment comprises:
means for determining whether the activity-inferring audio data have been acquired that includes data for one or more identifiable sounds that when detected infers the at least initial occurrence of the one or more user activities.

8. The computationally-implemented system of claim 2, wherein said means for determining whether activity-inferring data that infers at least initial occurrence of one or more user activities associated with the scene from the real environment have at least been acquired comprises:
means for determining whether movement data have been acquired that indicate one or more movements that infer the at least initial occurrence of the one or more user activities associated with the first scene from the real environment.

9. The computationally-implemented system of claim 2, wherein said means for determining whether activity-inferring data that infers at least initial occurrence of one or more user activities associated with the scene from the real environment have at least been acquired comprises:
means for determining whether personal information manager (PIM) data have been acquired that infers the at least initial occurrence of the one or more user activities associated with the first scene from the real environment.

10. The computationally-implemented system of claim 2, wherein said means for determining whether activity-inferring data that infers at least initial occurrence of one or more user activities associated with the scene from the real environment have at least been acquired comprises:
means for determining whether sensor-provided data have been acquired that infers occurrence of the one or more user activities associated with the first scene from the real environment.

11. The computationally-implemented system of claim 10, wherein said means for determining whether sensor-provided data have been acquired that infers occurrence of the one or more user activities associated with the first scene from the real environment comprises:
means for determining whether sensor-provided data indicating one or more user physiological characteristics have been acquired that when detected as occurring infers the at least initial occurrence of the one or more user activities associated with the first scene from the real environment.

12. The computationally-implemented system of claim 10, wherein said means for determining whether sensor-provided data have been acquired that infers occurrence of the one or more user activities associated with the first scene from the real environment comprises:

means for determining whether sensor-provided data that indicates one or more characteristics associated with one or more user-employed machines that when detected as occurring infers the at least initial occurrence of the one or more user activities associated with the first scene from the real environment.

13. The computationally-implemented system of claim 2, wherein said means for determining whether activity-inferring data that infers at least initial occurrence of one or more user activities associated with the scene from the real environment have at least been acquired comprises:

means for determining whether social networking data have been acquired that infers the at least initial occurrence of the one or more user activities associated with the first scene from the real environment.

14. The computationally-implemented system of claim 2, wherein said means for determining whether activity-inferring data that infers at least initial occurrence of one or more user activities associated with the scene from the real environment have at least been acquired comprises:

means for determining whether the visual data that was obtained includes activity-inferring visual data that infers the at least initial occurrence of the one or more user activities associated with the first scene and determining whether one or more of activity-inferring audio data, location and/or orientation data, movement data, personal information manager (PIM) data, social networking data, and/or sensor-provided data have been acquired that infers the at least initial occurrence of the one or more user activities associated with the first scene from the real environment.

15. The computationally-implemented system of claim 2, wherein said means for determining whether activity-inferring data that infers at least initial occurrence of one or more user activities associated with the scene from the real environment have at least been acquired comprises:

means for determining whether activity-inferring data that infers at least initial occurrence of one or more user leisure activities have been acquired.

16. The computationally-implemented system of claim 2, wherein said means for determining whether activity-inferring data that infers at least initial occurrence of one or more user activities associated with the scene from the real environment have at least been acquired comprises:

means for determining whether activity-inferring data that infers at least initial occurrence of one or more user machine operating activities have been acquired.

17. The computationally-implemented system of claim 2, wherein said means for determining whether activity-inferring data that infers at least initial occurrence of one or more user activities associated with the scene from the real environment have at least been acquired comprises:

means for determining whether activity-inferring data that infers at least initial occurrence of one or more user work or professional activities have been acquired.

18. The computationally-implemented system of claim 2, wherein said means for determining whether activity-inferring data that infers at least initial occurrence of one or more user activities associated with the scene from the real environment have at least been acquired comprises:

means for determining whether activity-inferring data that infers at least initial occurrence of one or more user academic activities have been acquired.

19. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:

means for presenting a first augmented view including one or more dynamic functional augmentations that provide one or more dynamically-changing functional information.

20. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:

means for presenting a first augmented view including one or more first augmentations that provide one or more time information and/or user physiological information in response to determining that first activity-inferring data that infers one or more exercise and/or athletic activities have been acquired.

21. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:

means for presenting a first augmented view including one or more first augmentations that provide one or more retail information in response to determining that activity-inferring data that infers one or more shopping activities have been acquired.

22. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:

means for presenting a first augmented view including one or more first augmentations that provide one or more dietary information in response to determining that first activity-inferring data that infers one or more dining activities have been acquired.

23. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:

means for presenting a first augmented view including one or more first augmentations that provide one or more business, financial, and/or market information in response to determining that first activity-inferring data that infers one or more employment or professional activities have been acquired.

24. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:
  means for presenting a first augmented view including one or more first augmentations that provide one or more environmental and/or weather information in response to determining that first activity-inferring data that infers one or more leisure activities have been acquired.

25. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:
  means for presenting a first augmented view including one or more first augmentations that provide one or more reference information in response to determining that first activity-inferring data that infers one or more educational and/or academic activities have been acquired.

26. The computationally-implemented system of claim 2, wherein said means for presenting, in response at least in part to determining that the activity-inferring data have at least been acquired, an augmented view of the scene from the real environment, the augmented view including one or more augmentations that have been included into the augmented view based, at least in part, on the activity-inferring data comprises:
  means for soliciting for and receiving the one or more augmentations to be included in the augmented view in response, at least in part, to determining that the first activity-inferred data have at least been acquired.

27. The computationally-implemented system of claim 26, wherein said means for soliciting for and receiving the one or more augmentations to be included in the augmented view in response, at least in part, to determining that the first activity-inferred data have at least been acquired comprises:
  means for soliciting for and receiving the one or more first augmentations to be included in the first augmented view via one or more wireless and/or wired networks.

28. The computationally-implemented system of claim 27, wherein said means for soliciting for and receiving the one or more first augmentations to be included in the first augmented view via one or more wireless and/or wired networks comprises:
  means for soliciting for and receiving the one or more first augmentations to be included in the first augmented view from one or more parties determined to be associated with the first scene from the real environment.

29. The computationally-implemented system of claim 28, wherein said means for soliciting for and receiving the one or more augmentations to be included in the first augmented view from one or more parties determined to be associated with the first scene from the real environment comprises:
  means for soliciting for and receiving the one or more first augmentations to be included in the first augmented view from one or more parties determined to be associated with one or more locations associated with the first scene from the real environment.

30. The computationally-implemented system of claim 28, wherein said means for soliciting for and receiving the one or more augmentations to be included in the first augmented view from one or more parties determined to be associated with the first scene from the real environment comprises:
  means for soliciting for and receiving the one or more first augmentations to be included in the first augmented view from one or more parties determined to be associated with one or more items detected in the first scene from the real environment.

31. The computationally-implemented system of claim 2, wherein said means for presenting, in response at least in part to determining that the second activity-inferring data have at least been acquired, a second augmented view of the second scene from the real environment, the second augmented view including one or more second augmentations that have been included into the second augmented view based, at least in part, on the second activity-inferring data, and wherein a previous augmented view including the one or more augmentations of the scene from the real environment is a first augmented view including one or more first augmentations of the first scene from the real environment comprises:
  means for presenting a second augmented view including one or more second augmentations that is or are modified version or versions of the one or more first augmentations.

32. The computationally-implemented system of claim 31, wherein said means for presenting a second augmented view including one or more second augmentations that is or are modified version or versions of the one or more first augmentations comprises:
  means for presenting a second augmented view including one or more second augmentations that is or are same or similar as the one or more first augmentations except for location or locations of the one or more second augmentations in the second augmented view being different from location or locations of the one or more first augmentations in the first augmented view.

33. The computationally-implemented system of claim 31, wherein said means for presenting a second augmented view including one or more second augmentations that is or are modified version or versions of the one or more first augmentations comprises:
  means for presenting a the second augmented view including one or more second augmentations that is or are same or similar as the one or more first augmentations except for the one or more second augmentations in the second augmented view being more transparent than the one or more first augmentations in the first augmented view.

34. The computationally-implemented system of claim 31, wherein said means for presenting a second augmented view including one or more second augmentations that is or are modified version or versions of the one or more first augmentations comprises:
  means for presenting a second augmented view including one or more second augmentations that is or are same or similar as the one or more first augmentations except for the one or more second augmentations in the second augmented view being less transparent than the one or more first augmentations in the first augmented view.

35. The computationally-implemented system of claim 31, wherein said means for presenting a second augmented view including one or more second augmentations that is or are modified version or versions of the one or more first augmentations comprises:
  means for presenting a second augmented view including one or more second augmentations that is or are one or more disabled functional augmentations of one or more functional augmentations included in the first augmented view.

36. The computationally-implemented system of claim 35, wherein said means for presenting a second augmented view including one or more second augmentations that is or are one or more disabled functional augmentations of one or more functional augmentations included in the first augmented view comprises:
  means for presenting the second augmented view including the one or more second augmentations that is or are the one or more disabled functional augmentations of the one or more functional augmentations included in the first augmented view in response to a request made by a party associated with the second scene to disable the one or more functional augmentations.

37. The computationally-implemented system of claim 2, wherein said means for presenting, in response at least in part to determining that the second activity-inferring data have at least been acquired, a second augmented view of the second scene from the real environment, the second augmented view including one or more second augmentations that have been included into the second augmented view based, at least in part, on the second activity-inferring data, and wherein a previous augmented view including the one or more augmentations of the scene from the real environment is a first augmented view including one or more first augmentations of the first scene from the real environment comprises:
  means for presenting one or more second augmentations that is or are one or more indicators that indicate that the one or more first augmentations have been removed.

38. The computationally-implemented system of claim 37, wherein said means for presenting one or more second augmentations that is or are one or more indicators that indicate that the one or more first augmentations have been removed comprises:
  means for presenting one or more second augmentations that is or are one or more indicators that can be selected or activated in order to reinstate the one or more first augmentations into the second augmented view.

39. A computationally-implemented system, comprising:
  means for obtaining visual data of an actual view of a scene from a real environment;
  means for determining whether activity-inferring data that infers at least initial occurrence of one or more user activities associated with the scene from the real environment have at least been acquired;
  means for presenting, in response at least in part to determining that the activity-inferring data have at least been acquired, an augmented view of the scene from the real environment, the augmented view including one or more augmentations that have been included into the augmented view based, at least in part, on the activity-inferring data;
  means for obtaining visual data of a second scene from the real environment, wherein a previous scene from the real environment is a first scene from the real environment;
  means for determining whether a second activity-inferring data that infers at least initial occurrence of one or more second user activities associated with the second scene from the real environment have at least been acquired, wherein the activity-inferring data that infers at least initial occurrence of the first scene from the real environment is a first activity-inferring data; and
  means for presenting, in response at least in part to determining that the second activity-inferring data have at least been acquired, a view of the second scene that does not include the one or more augmentations.

40. The computationally-implemented system of claim 39, further comprising:
  means for transmitting via one or more of a wireless and/or wired networks a notification that notifies a party that the one or more augmentations have been removed.

41. A system, comprising:
  circuitry for obtaining visual data of an actual view of a scene from a real environment;
  circuitry for determining whether activity-inferring data that infers at least initial occurrence of one or more user activities associated with the scene from the real environment have at least been acquired;
  circuitry for presenting, in response at least in part to determining that the activity-inferring data have at least been acquired, an augmented view of the scene from the real environment, the augmented view including one or more augmentations that have been included into the augmented view based, at least in part, on the activity-inferring data;
  circuitry for obtaining visual data of a second scene from the real environment, wherein a previous scene from the real environment is a first scene from the real environment;
  circuitry for determining whether a second activity-inferring data that infers at least initial occurrence of one or more second user activities associated with the second scene from the real environment have at least been acquired, wherein the activity-inferring data that infers the at least initial occurrence of the one or more user activities of the first scene from the real environment is a first activity-inferring data; and
  circuitry for presenting, in response at least in part to determining that the second activity-inferring data have at least been acquired, a second augmented view of the second scene from the real environment, the second augmented view including one or more second augmentations that have been included into the second augmented view based, at least in part, on the second activity-inferring data, and wherein a previous augmented view including the one or more augmentations of the scene from the real environment is a first augmented view including one or more first augmentations of the first scene from the real environment.

\* \* \* \* \*